(12) United States Patent
Mette et al.

(10) Patent No.: US 12,546,792 B2
(45) Date of Patent: Feb. 10, 2026

(54) PATHOLOGY SLIDE AUTOMATION SYSTEM AND METHOD

(71) Applicant: Ventana Medical Systems, Inc., Tucson, AZ (US)

(72) Inventors: Matthew D. Mette, Marana, AZ (US); Clayton Reynolds, Tucson, AZ (US); Curtis C. Rose, Chicago, IL (US); Franklin R. Ventura, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/902,437

(22) Filed: Sep. 30, 2024

(65) Prior Publication Data

US 2025/0020677 A1    Jan. 16, 2025

Related U.S. Application Data

(63) Continuation of application No. PCT/US2023/017333, filed on Apr. 3, 2023.

(60) Provisional application No. 63/456,345, filed on Mar. 31, 2023, provisional application No. 63/327,744, filed on Apr. 5, 2022.

(51) Int. Cl.
| | |
|---|---|
| *G01N 1/00* | (2006.01) |
| *B01L 9/00* | (2006.01) |
| *B25J 15/00* | (2006.01) |
| *G01N 1/30* | (2006.01) |
| *G01N 1/31* | (2006.01) |
| *G01N 35/00* | (2006.01) |

(52) U.S. Cl.
CPC .......... *G01N 35/00029* (2013.01); *B01L 9/52* (2013.01); *B25J 15/0033* (2013.01); *G01N 1/30* (2013.01); *G01N 1/31* (2013.01); *G01N 35/0099* (2013.01); *B01L 2300/0822* (2013.01); *G01N 2035/00039* (2013.01); *G01N 2035/00138* (2013.01); *G01N 2035/00168* (2013.01)

(58) Field of Classification Search
None
See application file for complete search history.

(56) References Cited

U.S. PATENT DOCUMENTS

2019/0204350 A1 *   7/2019   Qdaisat ................. G01N 1/312

* cited by examiner

*Primary Examiner* — Jyoti Nagpaul
(74) *Attorney, Agent, or Firm* — Womble Bond Dickinson (US) LLP

(57) ABSTRACT

A slide carrier includes: a base support; and a slide platform having a surface that is parallel to a first plane defined by a first vector and a second vector, wherein a vector extending in a direction opposite to the direction of gravity is normal with respect to a second plane defined by a third vector and a fourth vector, an angle between the first vector and the third vector is greater than zero degrees and less than 90 degrees, and an angle between the second vector and the fourth vector is greater than zero degrees and less than 90 degrees.

11 Claims, 60 Drawing Sheets

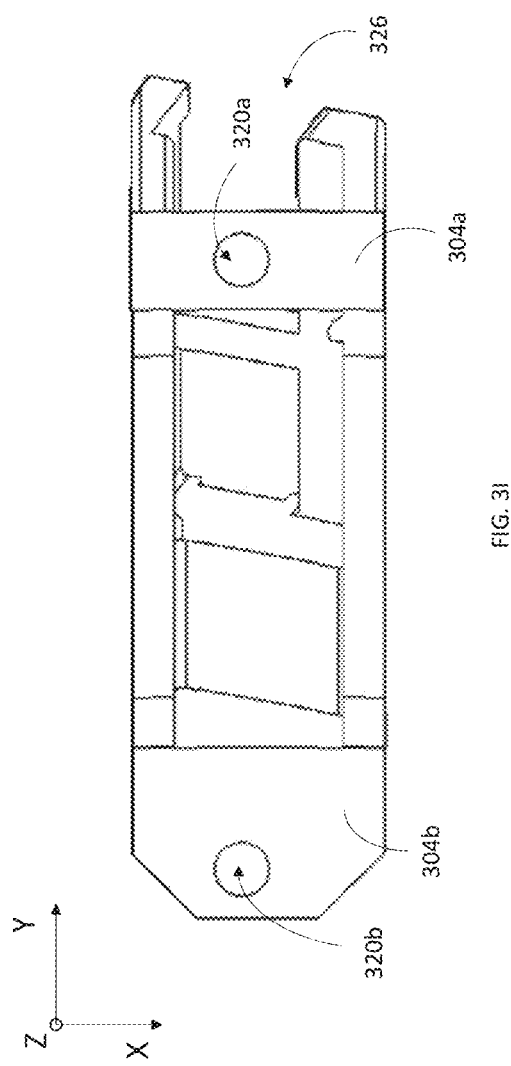

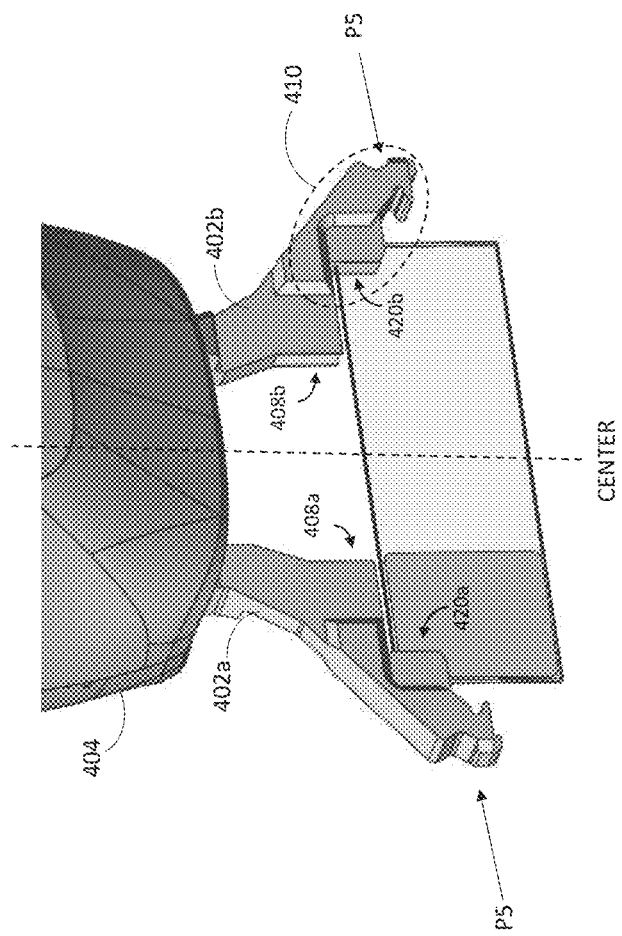

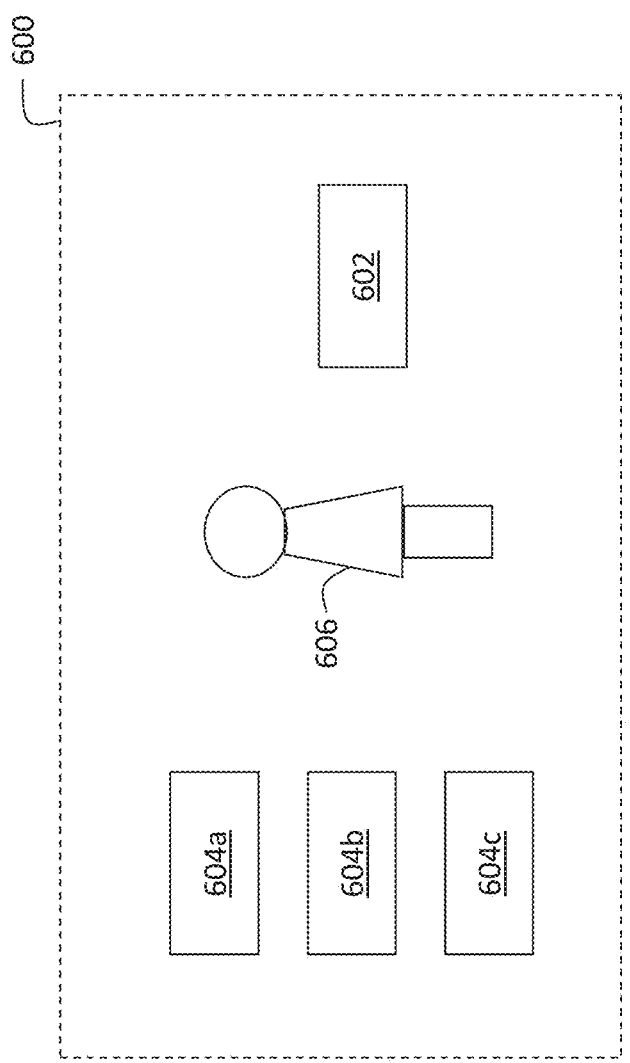

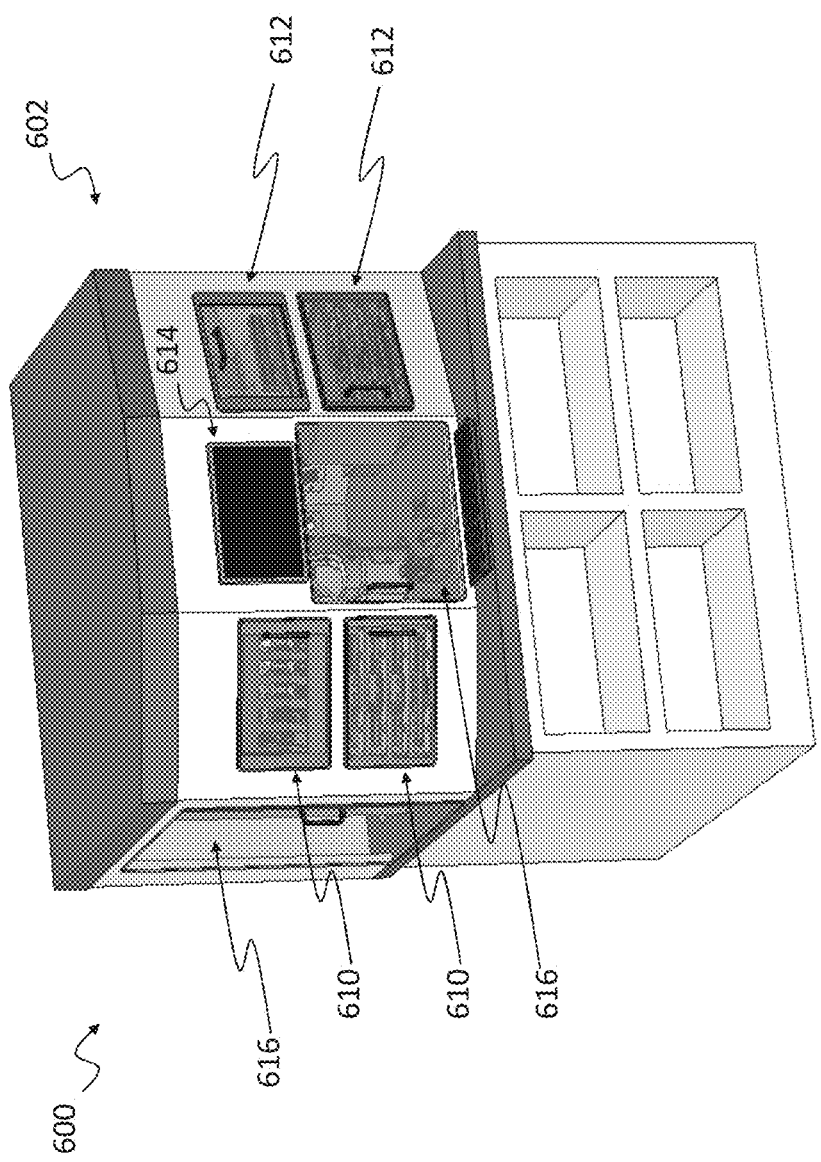

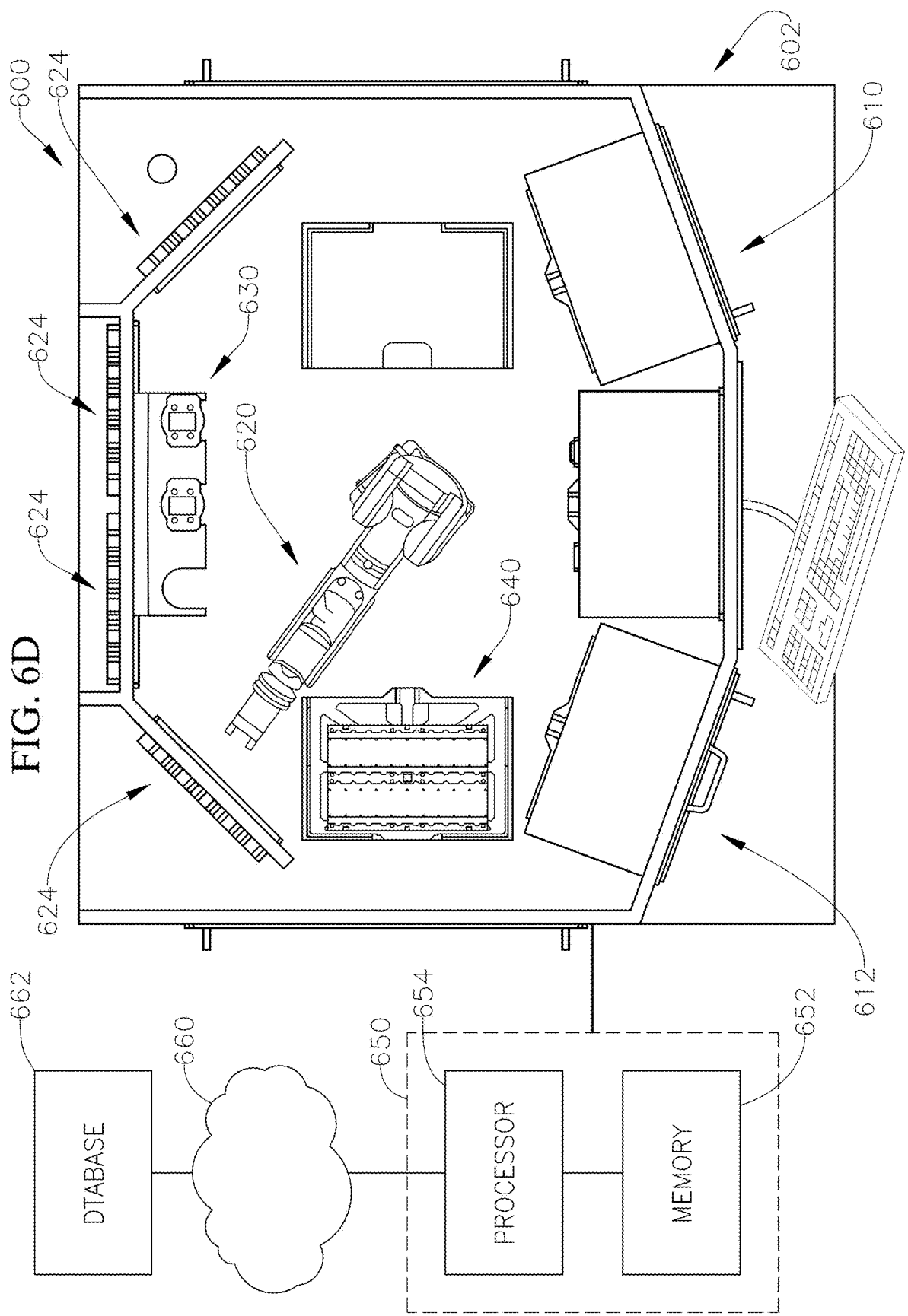

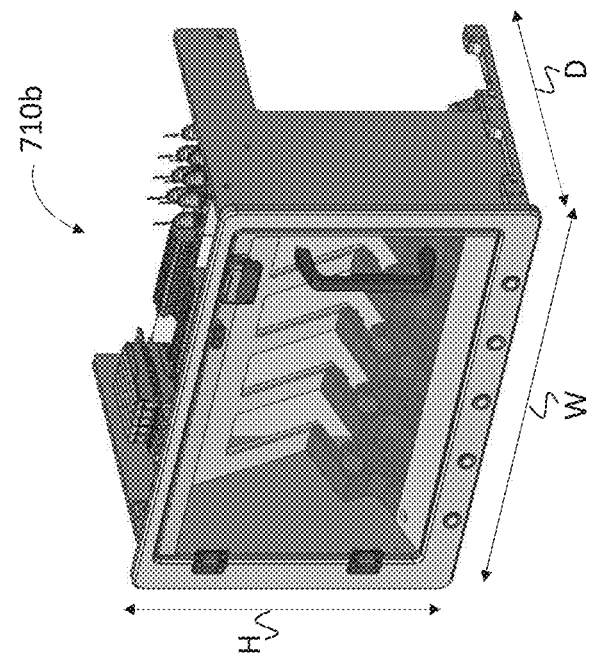
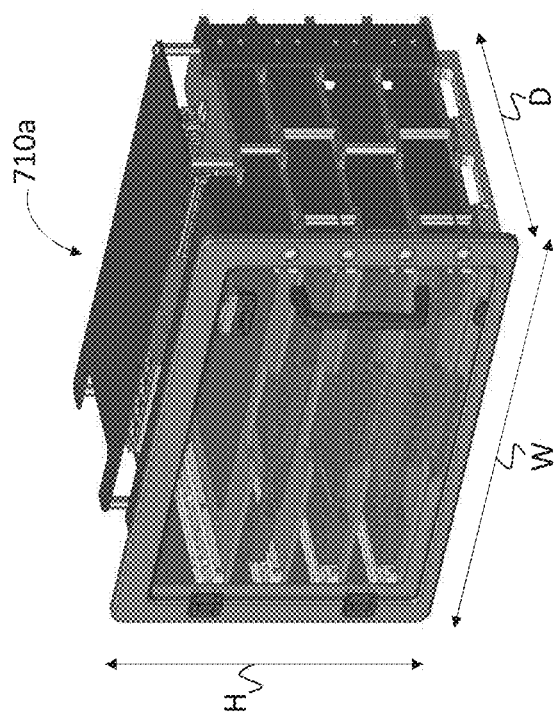
FIG. 7C

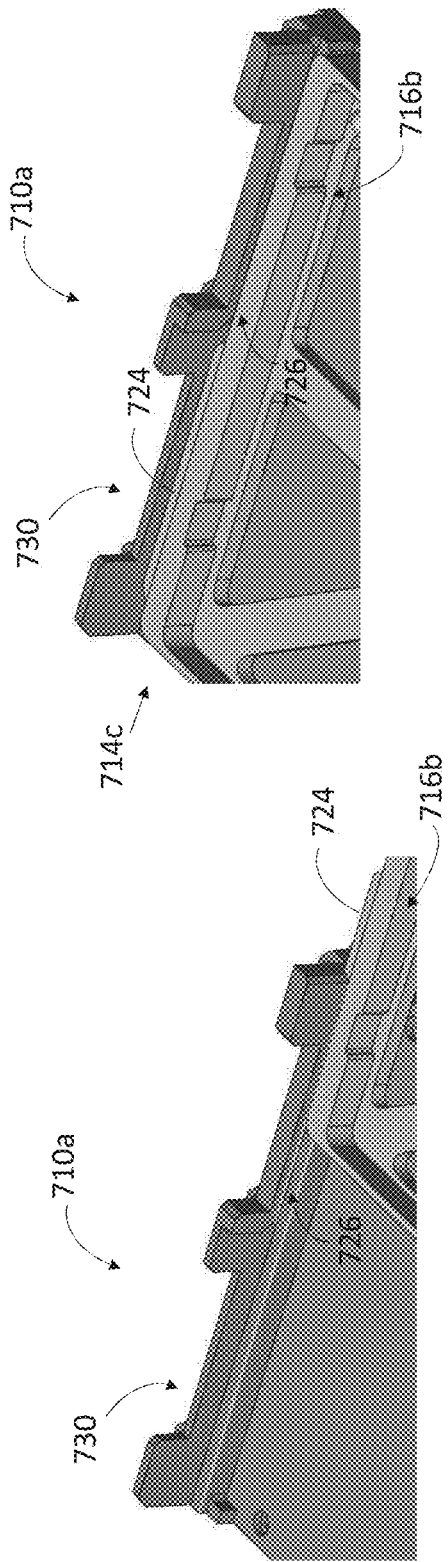

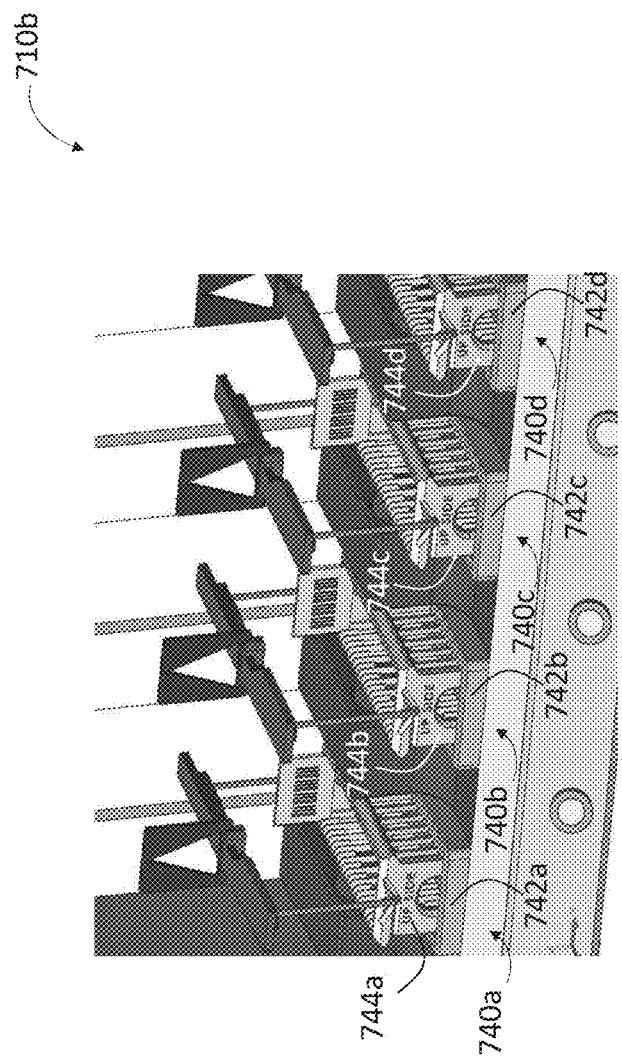

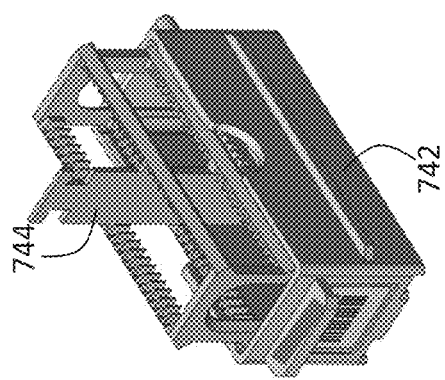
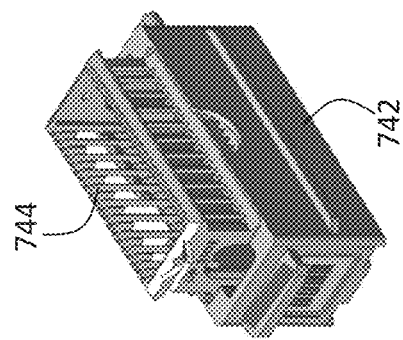
FIG. 7L

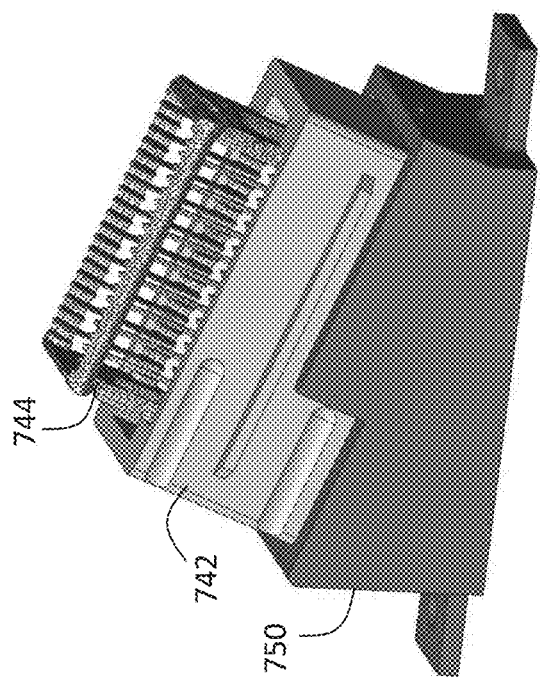
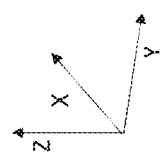
FIG. 7M

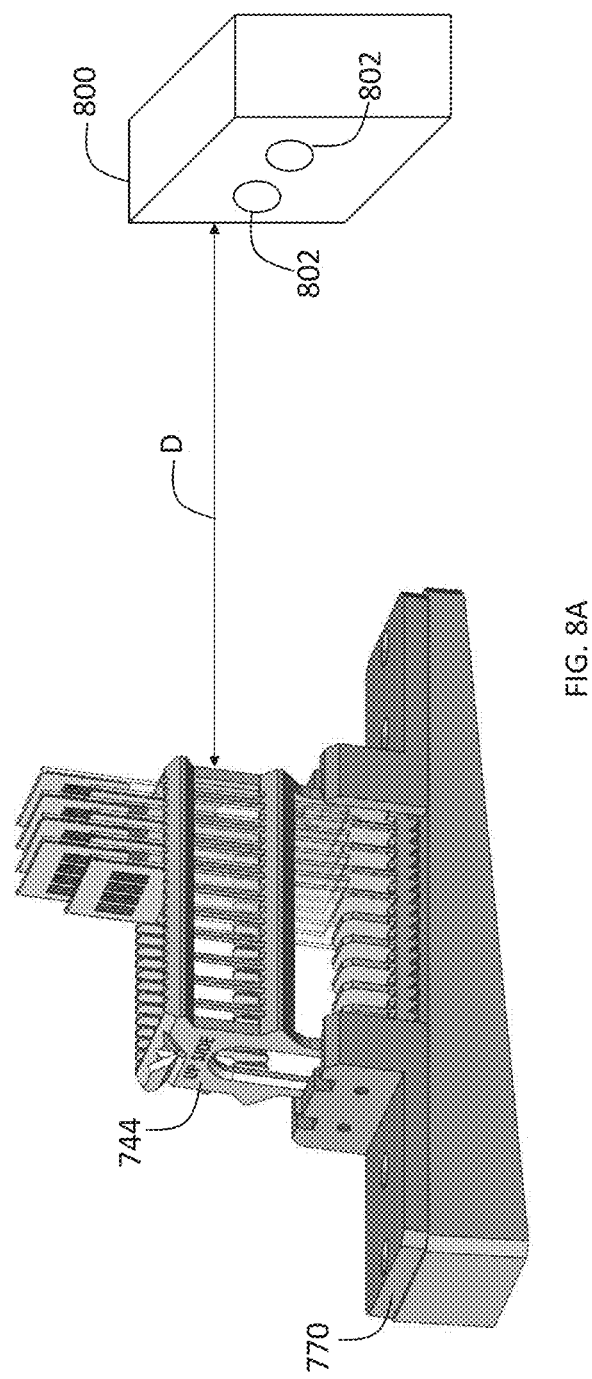

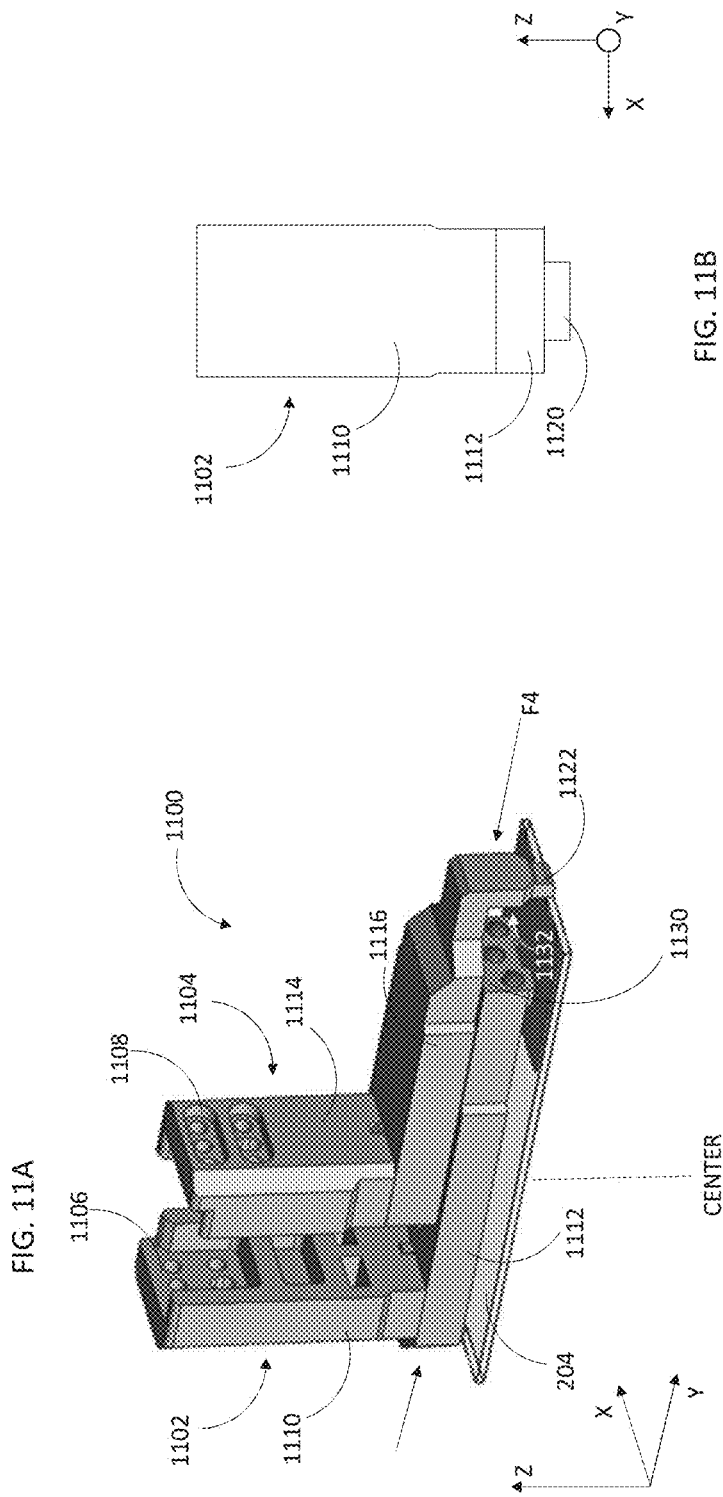

PATHOLOGY SLIDE AUTOMATION SYSTEM AND METHOD

CROSS-REFERENCE TO RELATED APPLICATIONS

This application is a bypass continuation application of International Application PCT/US2023/017333, filed Apr. 3, 2023, which claims priority to and the benefit of U.S. Provisional Patent Application No. 63/327,744, filed on Apr. 5, 2022, and further claims priority to and the benefit of U.S. Provisional Patent Application No. 63/456,345, filed on Mar. 31, 2023, the entire contents of each of which are incorporated herein by reference.

FIELD

One or more aspects of some embodiments according to the present disclosure relate to a pathology slide manufacturing system and method.

BACKGROUND

In the field of pathology, the process of manufacturing individual slides having tissue or fluid samples may be complex and time consuming. Various steps and operations may be involved from when the sample is collected to when the final slide is ready to be reviewed by a pathologist. Additionally, when attempting to manufacture multiple slides, for multiple tissue or fluid samples, and from multiple patients, the process becomes even more complex.

The above information disclosed in this Background section is only for enhancement of understanding of the background and therefore the information discussed in this Background section does not necessarily constitute prior art.

SUMMARY

According to some embodiments of the present disclosure, a slide carrier includes: a base support; and a slide platform having a surface that is parallel to a first plane defined by a first vector and a second vector, wherein a vector extending in a direction opposite to the direction of gravity is normal with respect to a second plane defined by a third vector and a fourth vector, an angle between the first vector and the third vector is greater than zero degrees and less than 90 degrees, and an angle between the second vector and the fourth vector is greater than zero degrees and less than 90 degrees.

According to some embodiments, the slide platform comprises a first long edge and a second long edge, wherein an elevation of the first long edge is higher than an elevation of the second long edge.

According to some embodiments, the slide carrier further includes a barrier protruding from the slide platform at the second long edge.

According to some embodiments, the slide carrier further includes a protrusion extending from the barrier.

According to some embodiments, the slide platform comprises a first elongated support portion extending in a length direction of the slide platform and a second elongated support portion extending in the length direction of the slide platform, wherein the first elongated support portion and the second elongated support portion are separated from each other by a gap.

According to some embodiments, the slide carrier further includes a crossmember support portion extending between and connecting the first elongated support portion and the second elongated support portion.

According to some embodiments, the slide carrier further includes a first narrow support portion connected to a top of the first elongated support portion, wherein a top surface of the first narrow support portion is coplanar with a top surface of the first elongated support portion; and a second narrow support portion connected to a top of the second elongated support portion, wherein a top surface of the second narrow support portion is coplanar with a top surface of the second elongated support portion, and a width between the first narrow support portion and the second narrow support portion is less than a width between the first elongated support portion and the second elongated support portion.

According to some embodiments of the present disclosure, pathology slide manufacturing system includes: a mechanical arm; a gripper connected to the mechanical arm; and a slide carrier within reaching proximity of the gripper, the slide carrier comprising a slide platform having a surface that is parallel to a first plane defined by a first vector and a second vector, wherein a vector extending in a direction opposite to the direction of gravity is normal with respect to a second plane defined by a third vector and a fourth vector, an angle between the first vector and the third vector is greater than zero degrees and less than 90 degrees, and an angle between the second vector and the fourth vector is greater than zero degrees and less than 90 degrees.

According to some embodiments, the slide platform comprises a first long edge and a second long edge, wherein an elevation of the first long edge is higher than an elevation of the second long edge.

According to some embodiments, the pathology slide manufacturing system further includes a barrier protruding from the slide platform at the second long edge.

According to some embodiments, the pathology slide manufacturing system further includes a protrusion extending from the barrier.

According to some embodiments, the slide platform comprises a first elongated support portion extending in a length direction of the slide platform and a second elongated support portion extending in the length direction of the slide platform, wherein the first elongated support portion and the second elongated support portion are separated from each other by a gap.

According to some embodiments, the pathology slide manufacturing system further includes a crossmember support portion extending between and connecting the first elongated support portion and the second elongated support portion.

According to some embodiments, the pathology slide manufacturing system further includes a first narrow support portion connected to a top of the first elongated support portion, wherein a top surface of the first narrow support portion is coplanar with a top surface of the first elongated support portion; and a second narrow support portion connected to a top of the second elongated support portion, wherein a top surface of the second narrow support portion is coplanar with a top surface of the second elongated support portion, and a width between the first narrow support portion and the second narrow support portion is less than a width between the first elongated support portion and the second elongated support portion.

According to some embodiments of the present disclosure, in a method of manufacturing a pathology slide in a slide processing system, the slide processing system includes: a mechanical arm; a gripper connected to the mechanical arm; and a slide carrier within reaching proximity of the gripper, and the method includes: gripping a slide with the gripper in a first orientation; placing, by the gripper, the slide on a slide platform of the slide carrier; allowing the slide to shift locations on the slide platform to register at a predetermined location on the slide platform; gripping the slide with the gripper in a second orientation corresponding to a component of the slide processing system; and placing, by the gripper, the slide in the component of the slide processing system using the gripper with the slide in the second orientation to enable a slide processing operation that corresponds to the component to be performed on the slide by the slide processing system.

According to some embodiments, the slide platform has a surface that is parallel to a first plane defined by a first vector and a second vector, wherein a vector extending in a direction opposite to the direction of gravity is normal with respect to a second plane defined by a third vector and a fourth vector, an angle between the first vector and the third vector is greater than zero degrees and less than 90 degrees, and an angle between the second vector and the fourth vector is greater than zero degrees and less than 90 degrees.

According to some embodiments, the slide platform comprises a first long edge and a second long edge, wherein an elevation of the first long edge is higher than an elevation of the second long edge.

According to some embodiments, the slide carrier comprises a barrier protruding from the slide platform at the second long edge, and the predetermined location corresponds to the barrier.

According to some embodiments, a protrusion extends from the barrier.

According to some embodiments, at least one of the first orientation or the second orientation involves a widthwise grip in which the gripper applies a compression force against opposing edges of the slide in a width direction.

According to some embodiments, at least one of the first orientation or the second orientation involves a lengthwise grip in which the gripper applies a compression force against opposing edges of the slide in a length direction.

According to some embodiments, at least one of the first orientation or the second orientation involves a thickness grip in which the gripper applies a compression force against opposing faces of the slide.

According to some embodiments, the slide platform comprises a first elongated support portion extending in a length direction of the slide platform and a second elongated support portion extending in the length direction of the slide platform, wherein the first elongated support portion and the second elongated support portion are separated from each other by a gap.

According to some embodiments, a crossmember support portion extends between and connects the first elongated support portion and the second elongated support portion.

According to some embodiments, the slide platform further includes: a first narrow support portion connected to a top of the first elongated support portion, wherein a top surface of the first narrow support portion is coplanar with a top surface of the first elongated support portion; and a second narrow support portion connected to a top of the second elongated support portion, wherein a top surface of the second narrow support portion is coplanar with a top surface of the second elongated support portion, and a width between the first narrow support portion and the second narrow support portion is less than a width between the first elongated support portion and the second elongated support portion.

According to some embodiments of the present disclosure, a gripper includes: a first gripper finger having a first groove and a second groove at an internal edge of the first gripper finger; and a second gripper finger having a first groove and a second groove at an internal edge of the second gripper finger, wherein the first groove of the first gripper finger faces the first groove of the second gripper finger such that the gripper is configured to apply a first compression force against length edges of a slide in a widthwise direction at the first grooves, and the second groove of the first gripper finger faces the second groove of the second gripper finger such that the gripper is configured to apply a second compression force against width edges of the slide in a lengthwise direction at the second grooves.

According to some embodiments, a distance between the first groove of the first gripper finger and the first groove of the second gripper finger is less than a distance between the second groove of the first gripper finger and the second groove of the second gripper finger.

According to some embodiments, the first groove of the first gripper finger is at a first portion of the first gripper finger that extends from an actuator in a direction parallel to a center line between the first and second gripper fingers.

According to some embodiments, the second groove of the first gripper finger is at a second portion of the gripper finger that extends from the first portion in a direction that is at an angle less than 90 degrees and greater than zero degrees relative to the center line.

According to some embodiments, the second groove of the first gripper finger is defined by a space between: a protrusion extending from the first gripper finger toward a center line that bisects a space between the first and second gripper fingers; and a main body of the first gripper finger.

According to some embodiments, the first gripper finger and the second gripper finger each comprise a protrusion at an end of the first gripper finger and the second gripper finger, respectively, which extend in a direction parallel to a center line that bisects the first and second gripper fingers, a distance between the protrusion of the first gripper finger and the protrusion of the second gripper finger is greater than a distance between the second groove of the first gripper finger and the second groove of the second gripper finger, and the gripper is configured to apply a third compression force against the width edges of the slide in the lengthwise direction.

According to some embodiments, the first gripper finger comprises a third groove at an exterior edge of the first gripper finger, the third groove extending perpendicular to a center line that bisects a space between the first and second gripper fingers.

According to some embodiments, the first gripper finger has a third groove extending in a direction parallel to the first groove of the first gripper finger, and the second gripper finger has a third groove facing the third groove of the first gripper finger and extending in the direction parallel to the first groove of the first gripper finger, wherein a distance between the third groove of the first gripper finger and the third groove of the second gripper finger is greater than a distance between the first groove of the first gripper finger and the first groove of the second gripper finger.

According to some embodiments, the gripper is configured to apply a third compression force against the width edges of the slide in the lengthwise direction with an orientation in which the slide is rotated 90 degrees about an axis running parallel to a length of the slide compared to an orientation corresponding to a gripping position of the second grooves.

According to some embodiments of the present disclosure, a pathology slide manufacturing system includes: a mechanical arm; and a gripper connected to the mechanical arm, the gripper comprising: a first gripper finger having a first groove and a second groove at an internal edge of the first gripper finger; and a second gripper finger having a first groove and a second groove at an internal edge of the second gripper finger, wherein the first groove of the first gripper finger faces the first groove of the second gripper finger such that the gripper is configured to apply a compression force against length edges of a slide in a widthwise direction at the first grooves, and the second groove of the first gripper finger faces the second groove of the second gripper finger such that the gripper is configured to apply a compression force against width edges of the slide in a lengthwise direction at the second grooves.

According to some embodiments, a distance between the first groove of the first gripper finger and the first groove of the second gripper finger is less than a distance between the second groove of the first gripper finger and the second groove of the second gripper finger.

According to some embodiments, the first groove of the first gripper finger is at a first portion of the first gripper finger that extends from an actuator in a direction parallel to a center line between the first and second gripper fingers.

According to some embodiments, the second groove of the first gripper finger is at a second portion of the gripper finger that extends from the first portion in a direction that is at an angle less than 90 degrees and greater than zero degrees relative to the center line.

According to some embodiments, the second groove of the first gripper finger is defined by a space between: a protrusion extending from the first gripper finger toward a center line that bisects a space between the first and second gripper fingers; and a main body of the first gripper finger.

According to some embodiments, the first gripper finger and the second gripper finger each comprise a protrusion at an end of the first gripper finger and the second gripper finger, respectively, which extend in a direction parallel to a center line that bisects the first and second gripper fingers, a distance between the protrusion of the first gripper finger and the protrusion of the second gripper finger is greater than a distance between the second groove of the first gripper finger and the second groove of the second gripper finger, and the gripper is configured to apply a third compression force against the width edges of the slide in the lengthwise direction.

According to some embodiments, the first gripper finger comprises a third groove at an exterior edge of the first gripper finger, the third groove extending perpendicular to a center line that bisects a space between the first and second gripper fingers.

According to some embodiments, the first gripper finger has a third groove extending in a direction parallel to the first groove of the first gripper finger, and the second gripper finger has a third groove facing the third groove of the first gripper finger and extending in the direction parallel to the first groove of the first gripper finger, wherein a distance between the third groove of the first gripper finger and the third groove of the second gripper finger is greater than a distance between the first groove of the first gripper finger and the first groove of the second gripper finger.

According to some embodiments, the gripper is configured to apply a third compression force against the width edges of the slide in the lengthwise direction with an orientation in which the slide is rotated 90 degrees about an axis running parallel to a length of the slide compared to an orientation corresponding to a gripping position of the second grooves.

According to some embodiments of the present disclosure, in a method of manufacturing a slide in a slide processing system, the slide processing system includes: a mechanical arm; and a gripper connected to the mechanical arm, the gripper comprising: a first gripper finger having a first groove and a second groove at an internal edge of the first gripper finger; and a second gripper finger having a first groove and a second groove at an internal edge of the second gripper finger, wherein the first groove of the first gripper finger faces the first groove of the second gripper finger such that the gripper is configured to apply a first compression force against length edges of a slide in a widthwise direction at the first grooves, and the second groove of the first gripper finger faces the second groove of the second gripper finger such that the gripper is configured to apply a second compression force against width edges of the slide in a lengthwise direction at the second grooves, and the method includes: gripping the slide in a first orientation using the first groove of the first gripper finger and the first groove of the second gripper finger; placing the slide in a first component of the slide processing system in the first orientation; gripping the slide in a second orientation using the second groove of the first gripper finger and the second groove of the second gripper finger; and placing the slide in a second component of the slide processing system in the second orientation.

According to some embodiments, a distance between the first groove of the first gripper finger and the first groove of the second gripper finger is less than a distance between the second groove of the first gripper finger and the second groove of the second gripper finger.

According to some embodiments, the first groove of the first gripper finger is at a first portion of the first gripper finger that extends from an actuator in a direction parallel to a center line between the first and second gripper fingers.

According to some embodiments, the second groove of the first gripper finger is at a second portion of the gripper finger that extends from the first portion in a direction that is at an angle less than 90 degrees and greater than zero degrees relative to the center line.

According to some embodiments, the second groove of the first gripper finger is defined by a space between: a protrusion extending from the first gripper finger toward a center line that bisects a space between the first and second gripper fingers; and a main body of the first gripper finger.

According to some embodiments, the first gripper finger comprises a protrusion at an end of the gripper finger and extending in a direction parallel to a center line that bisects the first and second gripper fingers.

According to some embodiments, wherein the first gripper finger comprises a third groove at an exterior edge of the first gripper finger, the third groove extending perpendicular to a center line that bisects a space between the first and second gripper fingers.

According to some embodiments, the method further includes: aligning the third groove with an edge of the slide; and applying a horizontal or vertical force, relative to a face of the slide, against the edge of the slide.

According to some embodiments, the first gripper finger has a third groove extending in a direction parallel to the first groove of the first gripper finger, and the second gripper finger has a third groove facing the third groove of the first gripper finger and extending in the direction parallel to the first groove of the first gripper finger, wherein a distance between the third groove of the first gripper finger and the third groove of the second gripper finger is greater than a distance between the first groove of the first gripper finger and the first groove of the second gripper finger.

According to some embodiments, the method further includes applying a third compression force against the width edges of the slide in the lengthwise direction with an orientation in which the slide is rotated 90 degrees about an axis running parallel to a length of the slide compared to an orientation corresponding to a gripping position of the second grooves.

According to some embodiments of the present disclosure, a slide carrier cassette system includes: a slide carrier cassette having a main body; and a plurality of slots in the main body and aligned along an alignment direction, wherein each slot has an opening at a top side of the main body and is configured to receive a slide, and each slot is at an angle less than 90 degrees and greater than 0 degrees relative to the alignment direction.

According to some embodiments, each slot comprises a first portion having a thickness corresponding to a thickness of the slide, and a second portion having a thickness that is greater than the thickness of the first portion.

According to some embodiments, the slide carrier cassette system further includes: a spring at an exterior side of the main body and configured to engage with a cavity of a slide carrier cassette queue to retain the slide carrier cassette in the cavity.

According to some embodiments, the slide carrier cassette system further includes: a storage queue having a plurality of cavities having a shape such that each cavity is configured to receive a slide carrier cassette.

According to some embodiments, the cavities are arranged in a matrix of rows and columns.

According to some embodiments, the queue has a cylindrical shape and the cavities are arranged around a central axis.

According to some embodiments, each cavity is rotated clockwise or counterclockwise relative to a vertical line at an angle less than 90 degrees and greater than 0 degrees.

According to some embodiments, the slide carrier cassette further comprises a tab handle at a top side of the slide carrier cassette adjacent to the openings of the slots.

According to some embodiments of the present disclosure, a pathology slide manufacturing system includes: a mechanical arm; a gripper connected to the mechanical arm; and a slide carrier cassette system within reaching proximity of the gripper, the slide carrier cassette system comprising: a slide carrier cassette having a main body; and a plurality of slots in the main body and aligned along an alignment direction, wherein each slot has an opening at a top side of the main body and is configured to receive a slide, and each slot is at an angle less than 90 degrees and greater than 0 degrees relative to the alignment direction.

According to some embodiments, each slot comprises a first portion having a thickness corresponding to a thickness of the slide, and a second portion having a thickness that is greater than the thickness of the first portion.

According to some embodiments, the pathology slide manufacturing system further includes a spring at an exterior side of the main body and configured to engage with a cavity of a slide carrier cassette queue to retain the slide carrier cassette in the cavity.

According to some embodiments, the pathology slide manufacturing system further includes a storage queue having a plurality of cavities having a shape such that each cavity is configured to receive a slide carrier cassette.

According to some embodiments, the cavities are arranged in a matrix of rows and columns.

According to some embodiments, the queue has a cylindrical shape and the cavities are arranged around a central axis.

According to some embodiments, each cavity is rotated clockwise or counterclockwise relative to a vertical line at an angle less than 90 degrees and greater than 0 degrees.

According to some embodiments, the slide carrier cassette further comprises a tab handle at a top side of the slide carrier cassette adjacent to the openings of the slots.

According to some embodiments of the present disclosure, in a method of manufacturing a pathology slide in a slide processing system, the slide processing system comprising: a mechanical arm; and a gripper connected to the mechanical arm; and a slide carrier cassette within reaching proximity of the gripper, and the method includes: gripping a slide with the gripper; inserting, with the gripper, the slide into a slot of the slide carrier cassette; placing, with the gripper, the slide carrier cassette into a queue having a cavity corresponding to a shape of the slide carrier cassette; removing, with the gripper, the slide from the slide carrier cassette; and placing, with the gripper, the slide into a component of the slide processing system to enable a slide manufacturing operation to be performed on the slide.

According to some embodiments, the slide carrier cassette comprises: a main body; and a plurality of slots in the main body and aligned along an alignment direction, wherein each slot has an opening at a top side of the main body and is configured to receive a slide, and each slot is at an angle less than 90 degrees and greater than 0 degrees relative to the alignment direction.

According to some embodiments, each slot comprises a first portion having a thickness corresponding to a thickness of the slide, and a second portion having a thickness that is greater than the thickness of the first portion.

According to some embodiments, the slide carrier cassette further includes a spring at an exterior side of the main body and configured to engage with a cavity of a slide carrier cassette queue to retain the slide carrier cassette in the cavity.

According to some embodiments, the cavities are arranged in a matrix of rows and columns.

According to some embodiments, the queue has a cylindrical shape and the cavities are arranged around a central axis.

According to some embodiments, each cavity is rotated clockwise or counterclockwise relative to a vertical line at an angle less than 90 degrees and greater than 0 degrees.

According to some embodiments, the slide carrier cassette further includes a tab handle at a top side of the slide carrier cassette adjacent to the openings of the slots.

According to some embodiments of the present disclosure, a slide processing system includes: a mechanical arm; a slide portal comprising a plurality of portal slots; a processor in communication with the mechanical arm and the slide portal; a memory in communication with the processor, the memory storing instructions that, when executed by the processor, cause the processor to: receive slide information; identify a portal slot from among the portal slots for receiving slides corresponding to the slide information; transmit a signal to the mechanical arm to insert a carriage into the portal slot, wherein the carriage has an internal cavity that corresponds to the slide information; transmit a signal to the mechanical arm to retrieve the carriage from the portal slot; and transmit a signal to the mechanical arm to remove the slides from the carriage and store the slides in a storage location.

According to some embodiments, the slide information comprises information indicating whether the slide is located in a slide tray or a slide rack and information indicating a form factor of the slide tray or slide rack.

According to some embodiments, the instructions further cause the processor to transmit a signal indicating a slide tray or slide rack is inserted into the carriage prior to transmission of the signal to the mechanical arm to retrieve the carriage from the portal slot.

According to some embodiments, the instructions further cause the processor to transmit a signal to the mechanical arm to transfer the slides to a slide carrier cassette and to transfer the slide carrier cassette to a slide carrier queue as the storage location.

According to some embodiments, the instructions further cause the processor to transmit a signal to the mechanical arm to return the carriage to the portal slot after all of the slides are removed.

According to some embodiments, the slide processing system further comprises a user interface comprising a display panel, and the instructions further cause the processor to receive the slide information as user input at the user interface.

According to some embodiments, the slide processing system further includes a slide position sensor, wherein the instructions further cause the processor to transmit a signal to the slide position sensor to detect a slide position of the slides before removing the slides from the carriage.

According to some embodiments, the instructions further cause the processor to: transmit a signal to the slide position sensor to initiate slide position detection; transmit a signal to the slide position sensor to capture one or more images; identify a position of a slide from among the slides based on the one or more images; and transmit a signal to the mechanical arm to remove the slide after the position of the slide is identified.

According to some embodiments of the present disclosure, in a method of processing slides, the method includes: receiving, by a processor, slide information; identifying, by the processor, a portal slot from among the portal slots for receiving a slide corresponding to the slide information; transmitting, by the processor, a signal to the mechanical arm to insert a carriage into the portal slot, wherein the carriage has an internal cavity that corresponds to the slide information; transmitting, by the processor, a signal to the mechanical arm to retrieve the carriage from the portal slot; and transmitting, by the processor, a signal to the mechanical arm to remove the slides from the carriage and store the slides in a storage location.

According to some embodiments, the slide information comprises information indicating whether the slide is located in a slide tray or a slide rack and information indicating a form factor of the slide tray or slide rack.

According to some embodiments, the method further includes transmitting, by the processor, a signal indicating a slide tray or slide rack is inserted into the carriage prior to transmission of the signal to the mechanical arm to retrieve the carriage from the portal slot.

According to some embodiments, the method further includes transmitting, by the processor, a signal to the mechanical arm to transfer the slides to a slide carrier cassette and to transfer the slide carrier cassette to a slide carrier queue as the storage location.

According to some embodiments, the method further includes transmitting, by the processor, a signal to the mechanical arm to return the carriage to the portal slot after all of the slides are removed.

According to some embodiments, the method further includes receiving, by the processor, the slide information as user input at a user interface, the user interface comprising a display panel.

According to some embodiments, the method further includes transmitting, by the processor, a signal to a slide position sensor to detect a slide position of the slides before removing the slides from the carriage.

According to some embodiments, the method further includes: transmitting, by the processor, a signal to the slide position sensor to initiate slide position detection; transmitting, by the processor, a signal to the slide position sensor to capture one or more images; identifying, by the processor, a position of a slide from among the slides based on the one or more images; and transmitting, by the processor, a signal to the mechanical arm to remove the slide after the position of the slide is identified.

According to some embodiments of the present disclosure, a slide processing system includes: a mechanical arm; a slide portal comprising a plurality of portal slots; a processor in communication with the mechanical arm and the slide portal; a memory in communication with the processor, the memory storing instructions that, when executed by the processor, cause the processor to: receive slide information; identify a portal slot from among the portal slots for depositing slides corresponding to the slide information; transmit a signal to the mechanical arm to retrieve the slides corresponding to the slide information; transmit a signal to the mechanical arm to insert the slides corresponding to the slide information into a tray or rack; and transmit a signal to the mechanical arm to transfer the tray or rack having the slides to the portal slot.

According to some embodiments, the instructions further cause the processor to transmit a signal to a user interface, the user interface comprising a display panel, to display a prompt to insert the tray or rack corresponding to the slide information into the portal slot.

According to some embodiments, the instructions further cause the processor to transmit a signal to the mechanical arm to remove the tray or rack from the portal slot and transfer the tray or rack to a nest.

According to some embodiments, the instructions further cause the processor to transmit a signal to the mechanical arm to insert the slides corresponding to the slide information into the tray or rack in the nest.

According to some embodiments, the instructions further cause the processor to identify the slides in a slide storage system corresponding to the slide information.

According to some embodiments, the slide processing system further includes a user interface comprising a display panel, wherein the instructions further cause the processor to receive the slide information as user input at the user interface.

According to some embodiments of the present disclosure, in a method of processing slides, the method includes: receiving, by a processor, slide information; identifying, by the processor, a portal slot from among the portal slots for depositing slides corresponding to the slide information; transmitting, by the processor, a signal to the mechanical arm to retrieve the slides corresponding to the slide information; transmitting, by the processor, a signal to the mechanical arm to insert the slides corresponding to the slide information into a tray or rack; and transmitting, by the processor, a signal to the mechanical arm to transfer the tray or rack having the slides to the portal slot.

According to some embodiments, the method further includes: transmitting, by the processor, a signal to a user interface, the user interface comprising a display panel, to display a prompt to insert the tray or rack corresponding to the slide information into the portal slot.

According to some embodiments, the method further includes: transmitting, by the processor, a signal to the mechanical arm to remove the tray or rack from the portal slot and transfer the tray or rack to a nest.

According to some embodiments, the method further includes: transmitting, by the processor, a signal to the mechanical arm to insert the slides corresponding to the slide information into the tray or rack in the nest.

According to some embodiments, the method further includes: identifying, by the processor, the slides in a slide storage system corresponding to the slide information.

According to some embodiments, the method further includes: receiving, by the processor, the slide information as user input at a user interface.

According to some embodiments of the present disclosure, a gripper includes: an actuator; a first gripper finger coupled to the actuator, the first gripper finger having a first groove at an internal edge of a main body of the first gripper finger and a first protrusion extending from the main body of the first gripper finger with a second groove between the first protrusion and the main body of the first gripper finger; a second gripper finger coupled to the actuator, the second gripper finger having a second groove at an internal edge of a main body of the second gripper finger and a second protrusion extending from the main body of the second gripper finger with a second groove between the second protrusion and the main body of the second gripper finger, wherein the first gripper finger and the second gripper finger are configured to apply a first compression force against length edges of a slide in a widthwise direction at the first grooves in a first gripping mode, and the first gripper finger and the second gripper finger are configured to apply a second compression force against width edges of the slide in a lengthwise direction at the second grooves in a second gripping mode.

According to some embodiments, the first gripper finger and the second gripper finger are equidistant from a center line between the first gripper finger and the second gripper finger and are configured to move toward and away from the center line in coordination with each other.

According to some embodiments, a distance between the first groove of the first and second gripper fingers is less than a distance between the second groove of the first and second gripper fingers.

According to some embodiments, the gripper further includes a gripper bracket coupled between the actuator and the first gripper finger, wherein the first gripper finger is configured to be connected and disconnected from the bracket.

According to some embodiments of the present disclosure, a slide processing system includes: a slide carriage having a first channel on a first side of the slide carriage and a second channel of the slide carriage; an actuator; a first gripper rod coupled to the actuator; and a second gripper rod coupled to the actuator, wherein the first gripper rod and the second gripper rod are configured to fit within the first channel and the second channel respectively.

According to some embodiments, the first gripper rod comprises a plurality of segments separated by a flared portion.

According to some embodiments, the flared portion comprises an O-ring.

According to some embodiments, the slide processing system further includes a bracket coupled between the actuator and the first gripper rod.

According to some embodiments, the slide carriage is a tray carriage.

According to some embodiments, the slide carriage is a rack carriage.

According to some embodiments, the slide carriage comprises a plurality of slide carriages, wherein a first slide carriage from among the slide carriages has an internal cavity with a first interior form factor corresponding to a first type of slide tray and a second slide carriage from among the slide carriages has an internal cavity with a second interior form factor corresponding to a second type of slide tray, wherein the first interior form factor is different from the second interior form factor, and wherein the first slide carriage and the second slide carriage have a same exterior form factor.

According to some embodiments, the slide carriage comprises a plurality of slide carriages, wherein a first slide carriage from among the slide carriages has an internal cavity with a first interior form factor corresponding to a first type of slide rack and a second slide carriage from among the slide carriages has an internal cavity with a second interior form factor corresponding to a second type of slide rack, wherein the first interior form factor is different from the second interior form factor, and wherein the first slide carriage and the second slide carriage have a same exterior form factor.

BRIEF DESCRIPTION OF THE DRAWINGS

Non-limiting and non-exhaustive embodiments according to the present disclosure are described with reference to the following figures, wherein like reference numerals refer to like parts throughout the various views unless otherwise specified.

FIG. 3I is a bottom view of the slide carrier, according to some embodiments;

FIG. 4C illustrates the gripper holding a slide in a third gripping mode, according to some embodiments;

FIG. 5I shows an example of a slide processing environment, according to some embodiments;

FIG. 6A illustrates aspects of an example automated histology storage system and environment, according to some embodiments;

FIG. 6B illustrates an example automated histology storage system, according to some embodiments;

FIG. 6D shows an example top view of the automated histology storage system, according to some embodiments;

FIG. 7C shows example input or output portals, according to some embodiments;

FIG. 7I shows a close-up view of a portion of the internal structure of a tray portal slot when a carrier tray is in an extended or pulled-out position, according to some embodiments;

FIG. 7J shows a close-up view of the portion of the internal structure of the portal slot when the carrier tray is in a retracted or pushed-in position, according to some embodiments;

FIG. 7K illustrates further details of internal components of a rack portal, according to some embodiments;

FIG. 7L shows further details of example rack carriages, according to some embodiments;

FIG. 7M shows an example rack carriage nest, according to some embodiments;

FIG. 8A shows an example slide position detection system, according to some embodiments;

FIG. 11A illustrates an example of a gripper, according to some embodiments;

FIG. 11B illustrates a rear view of a gripper, according to some embodiments;

DETAILED DESCRIPTION

Figure 1:
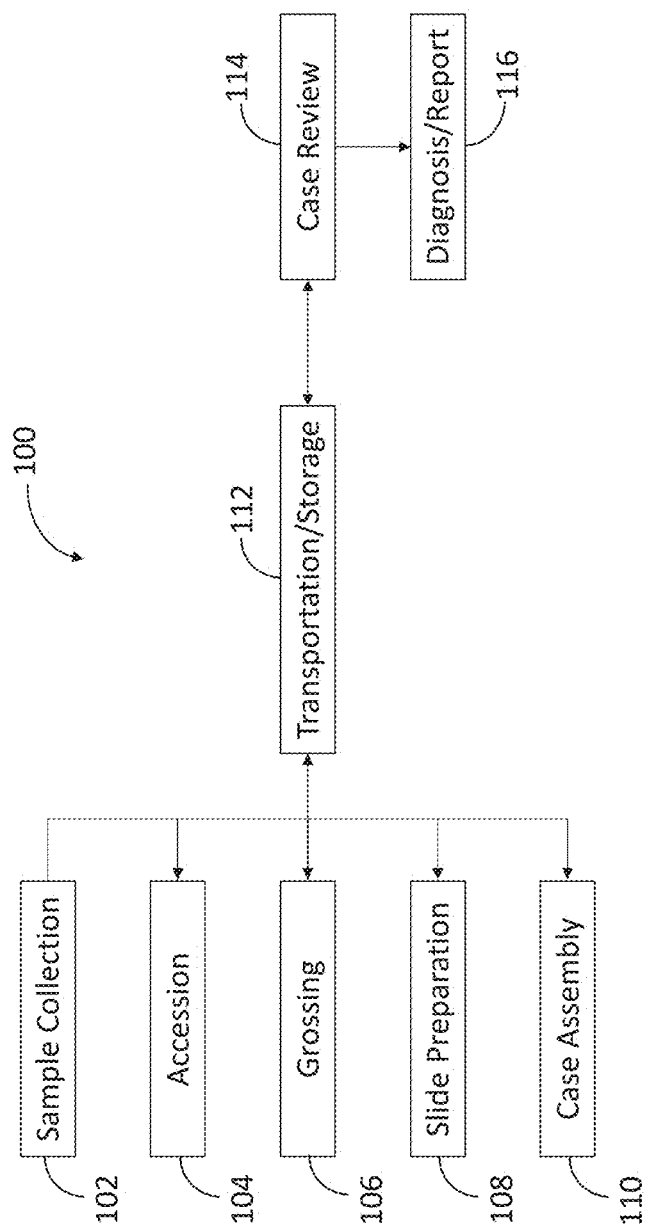
FIG. 1 is a flow diagram illustrating various operations that may occur in a pathology context or pathology environment, according to some embodiments.

Hereinafter, aspects of some example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Pathology is the medical discipline, which attempts to facilitate the diagnosis and treatment of diseases, by studying tissue, cell, and fluid samples of patients. In many applications, tissue samples may be collected from patients, and processed into a form that can be analyzed by physicians (e.g., Pathologists), often under magnification, by physicians to diagnose and characterize relevant medical conditions based on the tissue sample.

FIG. 1 is a flow diagram illustrating various operations that may occur in a pathology environment or pathology system 100. For example, when a treating physician or medical provider identifies a patient for whom an analysis of a tissue or fluid sample may be beneficial for diagnosing or treating a medical condition, a tissue or fluid sample may be collected at operation 102. The patient's identity may be collected and matched with the patent's sample, and the sample may be placed in a sterile container and/or collection medium for further processing.

The sample may then be transported to a pathology accessioning laboratory at operation 104, where the sample may be received, sorted, organized, and labeled along with other samples from other patients, for further processing.

At operation 106, the sample may be further processed as part of a grossing operation. For example, an individual tissue sample or specimen may be sliced into smaller sections for embedding and subsequent cutting for assembly onto slides.

Then, at operation 108, the sample or specimen may be mounted or deposited on one or more glass slides. The preparation of slides may involve applying one or more reagents or stains to the sample, for example, in order to improve the visibility of, or contrast between, different parts of the sample.

In some instances, at operation 110, several slides, either during the reagent or staining processing, or after the processing is completed, may be assembled or collected in a case or folio. The case may, for example, be carefully labeled with the individual patient's identifying information.

Between each of the operations 102 and 110, at operation 112, the sample, specimen, slide(s), may be transported within the medical facility, or between medical facilities (e.g., between a physician's office and a laboratory), or may be stored between processing operations.

Once the processing of the samples and slides is completed, and a pathologist is ready to review the sample, the slides and/or the case(s) holding multiple slides corresponding to the patient may again be transported, at operation 112, to the pathologist. At operation 114, the pathologist may review the slides, for example, under magnification using a microscope. An individual slide may be placed under the objective lens of the microscope, and the microscope and the slide may be manipulated and adjusted as the pathologist reviews the tissue or fluid.

Once the pathologist case completed the review of the slide, the pathologist may attempt, at operation 116, to form a medical opinion or diagnosis. Meanwhile, the sample or slides may once again be transported, at operation 112, to a longer term storage facility. In some instances, the sample or slides may be again transported, either before or after some storage period, to other physicians for further analysis, second opinions, and the like.

Thus, as can be appreciated based on the pathology process flow described above, the pathology system 100 involves a wide variety of processing operations. At each operation, there is an opportunity for tissue samples to be damaged or contaminated, or for information to be lost. Additionally, the processing of individual slides can be quite time consuming and complicated, and it can be difficult for laboratories to manage processing a high volume of patient samples simultaneously. Often times, there are also time constraints, since earlier diagnosis of disease may lead to better patient outcomes, yet each operation in the pathology system 100 presents an opportunity for delay.

Thus, embodiments according to the present disclosure may improve the efficiency and productivity of the pathology system 100.

Figure 2A:
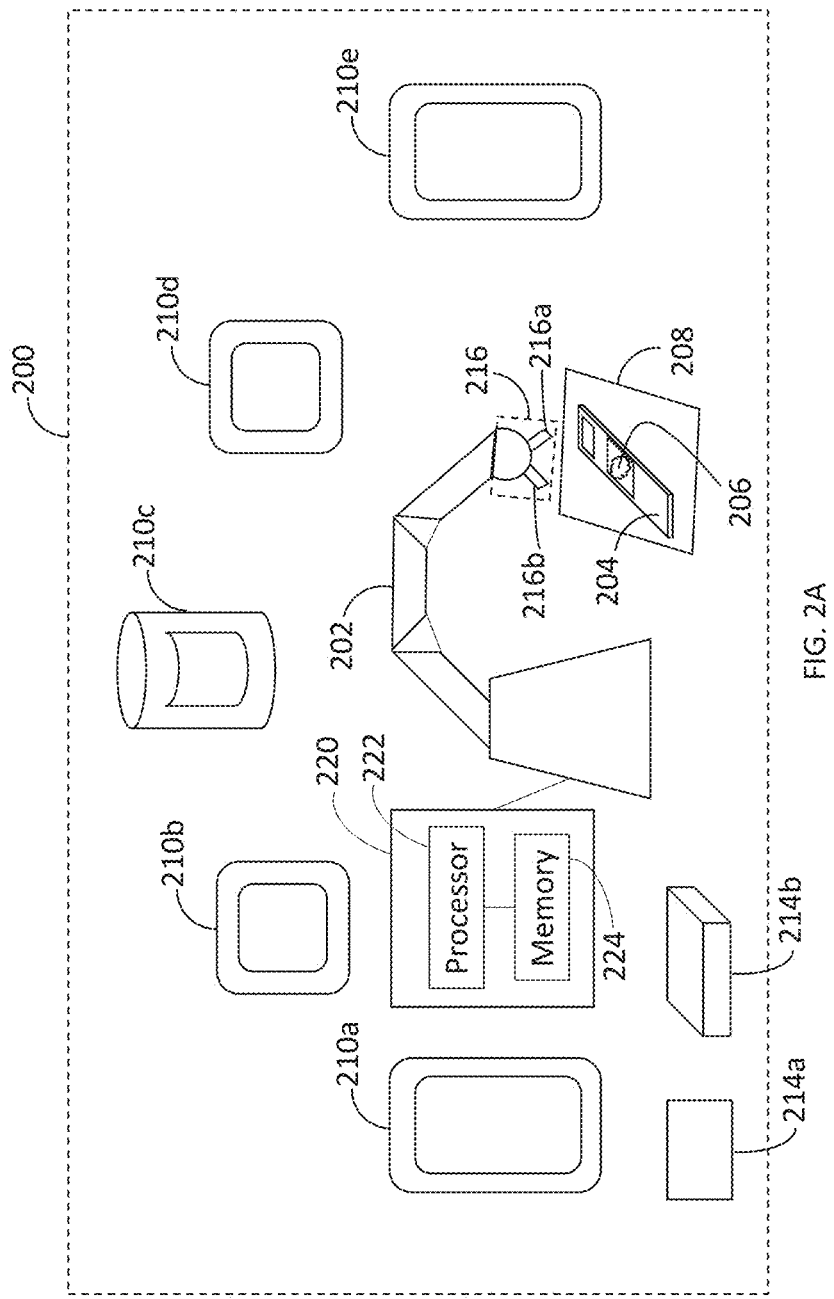
FIG. 2A illustrates slide processing or manufacturing environment, according to some embodiments.

FIG. 2A illustrates slide processing or manufacturing system 200. According to some embodiments the slide processing system 200 may exist as part of the pathology system 100 illustrated in FIG. 1 (for example, as part of operations 108 and 110).

As shown in FIG. 2A, the slide processing system 200 may include one or more mechanical arms 202. The mechanical arm 202 may be utilized to transfer a slide 204, having a specimen 206 deposited thereon, from a slide carrier 208 to one or more slide processing stations 210a-210e. Although FIG. 2A illustrates the slide processing system 200 includes five slide processing stations 210a-210e, embodiments according to the present disclosure are not limited thereto, and the slide processing environment may include fewer slide processing stations or additional slide processing stations without departing from the spirit and scope of embodiments according to the present disclosure. Each of the slide processing stations 210a-210e may be a mechanical apparatus configured to perform one or more specific processing operations during a process of manufacturing a slide. For example, the slide processing stations 210a-210e may be configured to apply different and unique reagents or stains to the specimen 206.

In some embodiments, the slide carrier 208 may operate as a temporary platform or storage area between processing operations and/or between transfers from one of the slide processing stations 210a-210e to another one of the slide processing stations 210a-210e and may be configured to accept one or more slides at a time.

Additionally, various other slide carriers 214a-214b may be utilized in one or more processing operations. Although two slide carriers 214a-214b are illustrated in FIG. 2A for the purpose of illustration, embodiments according to the present disclosure are not limited thereto, and the number and types of slide carriers that are utilized in any given manufacturing process may vary according to various embodiments depending on the slide processing stations 210a-210e and the particular processing operations involved. For example, in some instances, different slide processing stations 210a-210e may be designed to accommodate slide carriers with specific shapes or designs that are a function of the processing operation to be performed, the size and shape of the slide processing station, and the chemicals or treatments to be applied to the slide.

As discussed above, between each processing operation, the mechanical arm 202 may be configured to transfer the slide 204 between different components within the slide processing system 200. For example, the mechanical arm 202 may be configured to pick up the slide 204 from the slide carrier 208, by using a gripper 216, and transfer the slide 204 directly to one of the slide processing stations 210a-210e to be inserted therein. The corresponding slide processing station 210a-210e may then perform a processing operation on the slide 204 (for example, by applying a reagent or stain to the specimen 206). After the processing operation is completed, the mechanical arm 202 may remove the slide 204 from the slide processing station 210a-210e, and transfer the slide back to the slide carrier 208, or transfer the slide 204 to another one of the slide processing stations 210a-210e or to one of the slide carriers 214a-214b. The slide manufacturing process may continue on in this manner, with the mechanical arm 202 transferring the slide 204 between different components or stations within the slide processing system 200, until all of the manufacturing operations have been completed and the slide is ready to be stored or transferred out of the slide processing system 200 for subsequent pathology operations.

In order to physically pick up, maneuver, and/or manipulate the slide 204 during the various transferring operations, the mechanical arm 202 may include one or more grippers 216. Although FIG. 2A illustrates two opposing gripper fingers 216a and 216b (which may be collectively referred to as a gripper 216 herein), embodiments according to the present invention are not limited thereto, and some embodiments may include various gripper configurations or designs. Further details of an example structure of the gripper 216 according to some embodiments is illustrated and described in more detail below.

According to some embodiments, the mechanical arm 202 may be in electronic communication with a controller system 220 that is configured to control the movement and operation of the mechanical arm 202 and the gripper 216, in order to move the slide 204 between different locations and components within the slide processing system 200.

The controller system 220 may include a processor 222 and a memory 224, where the memory 224 stores instructions thereon, which, when executed by the processor 222, cause the processor 222 to send and receive electronic (e.g., data) signals to and from the mechanical arm 202 and the gripper 216, in order to control the movement and operation of the mechanical arm 202 (e.g., one or more actuators and motors of the mechanical arm 202) and the gripper 216 (e.g., one or more gripper fingers of the gripper 216). The instructions stored in the memory 224 may include, for example, instructions corresponding to one or more slide processing operations described herein, which may include, for example, placing a slide into or onto a slide carrier or processing machine or station, adjusting the gripping orientation of the gripper, and any other operations involved with manipulating and maneuvering a slide as part of the slide processing system 200, in order to manufacture a pathology slide, as described in more detail below.

Figure 2B:
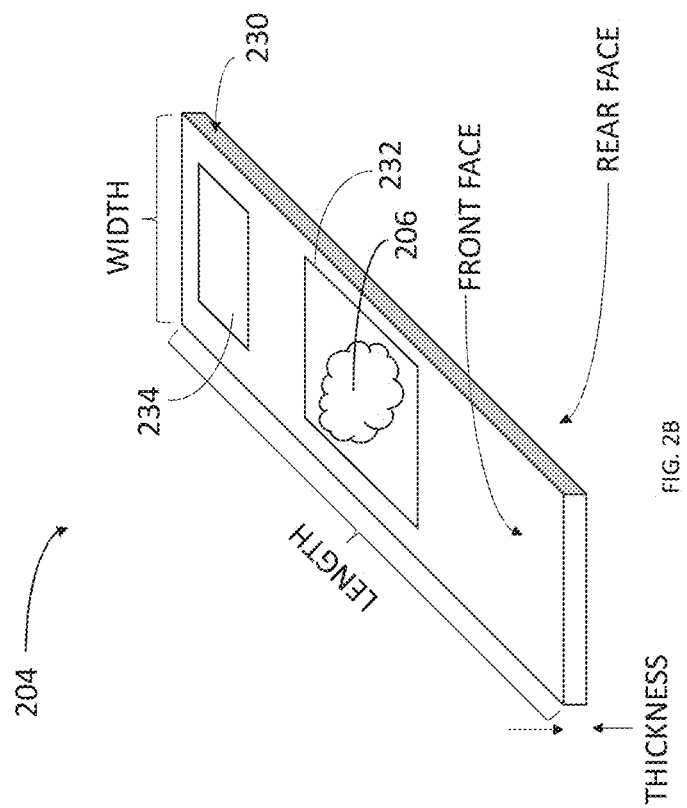
FIG. 2B illustrates an example of a slide after being manufactured, according to some embodiments.

FIG. 2B illustrates an example of a slide after being manufactured according to some embodiments. In some embodiments, the slide 204 includes a substrate 230 that may be formed of any suitable transparent material, such as glass. The sample or specimen (e.g., a slice of tissue, bodily fluid, cavity swap, etc.) 206 may be deposited on a front face of the slide 204, which is opposite a rear face of the slide 204. After depositing the specimen 206 onto the front face of the slide 204, the specimen may be treated with various manufacturing processes or operations, for example, by applying one or more reagents and/or stains to the specimen 206. A slip 232 may be placed over the specimen 206 to protect the integrity of the specimen 206 and prevent or reduce physical impact or contact with the specimen 206, and prevent or reduce contamination by foreign contaminants. Hereinafter, a slide having a tissue sample or specimen with a slip covering the specimen may be referred to as a "coverslipped" slide.

Additionally, a label 234 may be affixed to the front face of the slide at a location adjacent to the specimen and the slip. The label 234 may include various information that includes unique identifying information about the slide, to enable the content of the specimen, the patient, etc., to be identified. For example, the label 234 may include a barcode or other alphanumeric characters operating as an identification for the slide.

The slip 232 may be relatively thin compared to the thickness of the substrate 230. The substrate 230 may have a relatively thin thickness relative to a length and a width of the substrate 230. In the present application, the width of a slide refers to the shorter distance across the front face of the slide, and the length of a slide refers to the longer distance across the front face of the slide. A width or narrow edge of a slide refers to an edge or side of the slide, not including the front face or the rear face, along the width direction. A length or long edge of a slide refers to an edge or side of the slide, not including the front face or the rear face, along the length direction. A top end of the slide refers to the end corresponding to the label 234, and the bottom end refers to the end opposite the top end.

FIGS. 3A-3J illustrate an example slide carrier 300 according to some embodiments of the present disclosure. The slide carrier 300 may be utilized (or may be the same as), for example, as the slide carrier 208 illustrated in FIG. 2A. According to some embodiments, the slide carrier 300 may be utilized as a temporary or intermediate slide carrier, upon which a slide (e.g., the slide 204) may be temporarily placed in a slide processing environment (e.g., the slide processing system 200), for example, between operations of a slide manufacturing process.

The slide carrier 300 may be formed of any suitable material that is solid enough to support a glass slide 204, without substantial friction between the glass and the material of the slide carrier 300. For example, in some embodiments, the slide carrier 300 may be formed of a plastic or polymer material, but embodiments according to the present disclosure are not limited thereto.

Figure 3A:
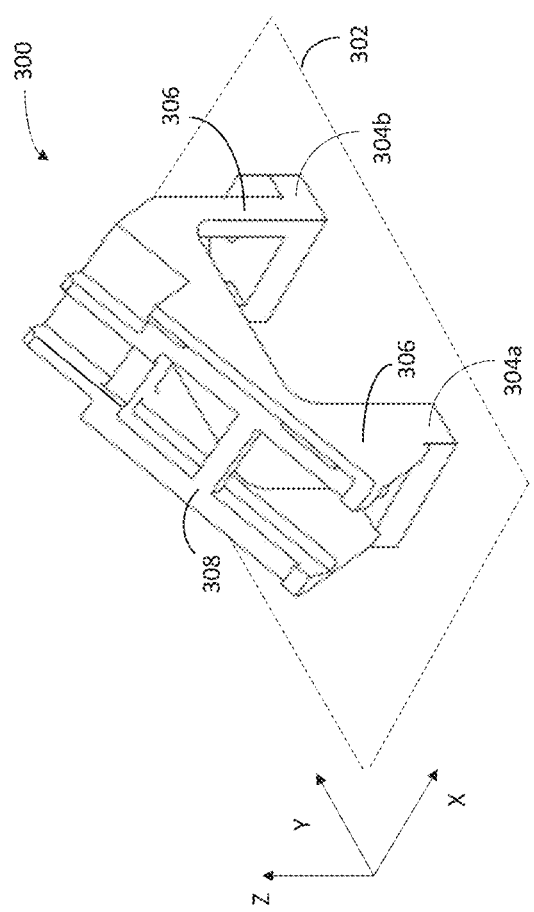
FIG. 3A is a right front perspective view of a slide carrier, according to some embodiments.

According to some embodiments, as illustrated in FIG. 3A, the slide carrier 300 may be mounted on a surface or plane 302. The surface 302 may be, for example, a work bench or table configured to hold one or more slide carriers 300 during the manufacturing process of one or more slides. In some embodiments, the surface 302 may be a planar surface parallel to a plane defined by an x-direction vector and a y-direction vector (i.e., an x-y plane). The plane defined by the x-direction vector and the y-direction vector may be perpendicular to the direction of gravity. In other words, a z-direction vector, which is normal or perpendicular to the surface 302 and/or the plane that is defined by the x-direction vector and the y-direction vector, may extend in a direction opposite to the force of gravity.

As illustrated in FIG. 3A, according to some embodiments, the slide carrier may have one or more base supports 304, which are configured to be mechanically connected and secured to the surface 302. Although FIG. 3A illustrates two base supports 304a and 304b, embodiments according to the present disclosure are not limited thereto, and in some embodiments the slide carrier 300 may include a single base support 304, or may include more than two base supports, without departing from the spirit and scope of embodiments according to the present disclosure. Additionally, in some embodiments the bottom of each base support 304 may be coplanar with the bottom of each other base support 304, but embodiments according to the present disclosure are not limited thereto. For example, in some embodiments, the height (measured, for example, from the ground level, or the x-y plane) of the bottom of one base support 304 may be higher or lower than the height of another base support 304.

In addition to providing a mechanical structure for securing the slide carrier 300 to the surface 302, the base supports 304 provide a platform or structure to support one or more pillars or vertical supports 306, which provide vertical support in the z-direction for a slide platform 308, configured to accommodate a slide (e.g., the slide 204). According to some embodiments, the slide platform 308 may be a planar surface that is parallel to a plane that is rotated along both the x-direction and the y-direction relative to the x-y plane and/or the surface 302.

Figure 3B:
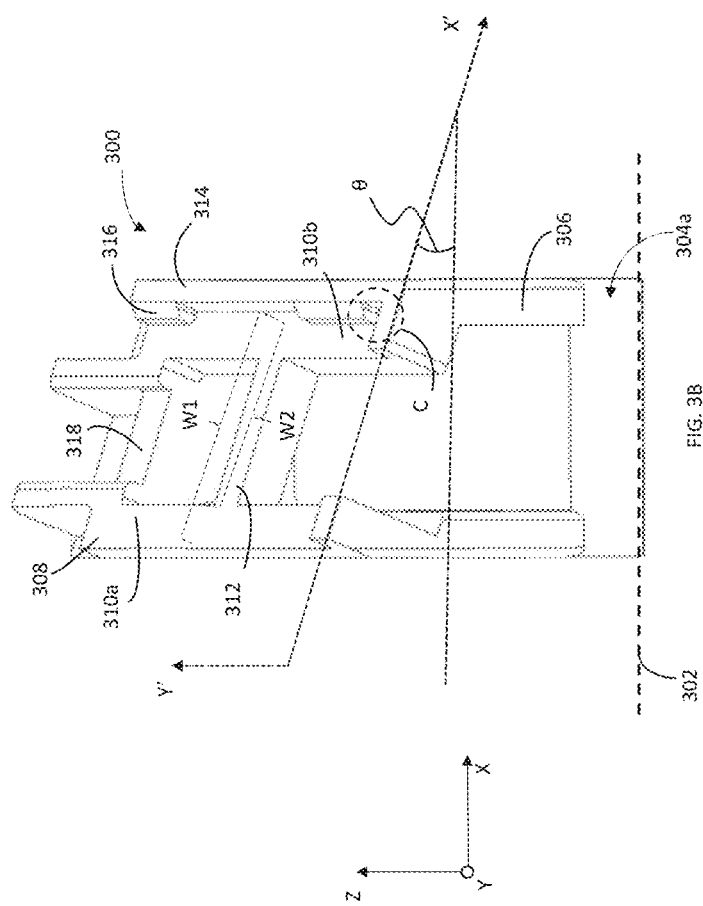
FIG. 3B is a front view of the slide carrier, according to some embodiments.
Figure 3C:
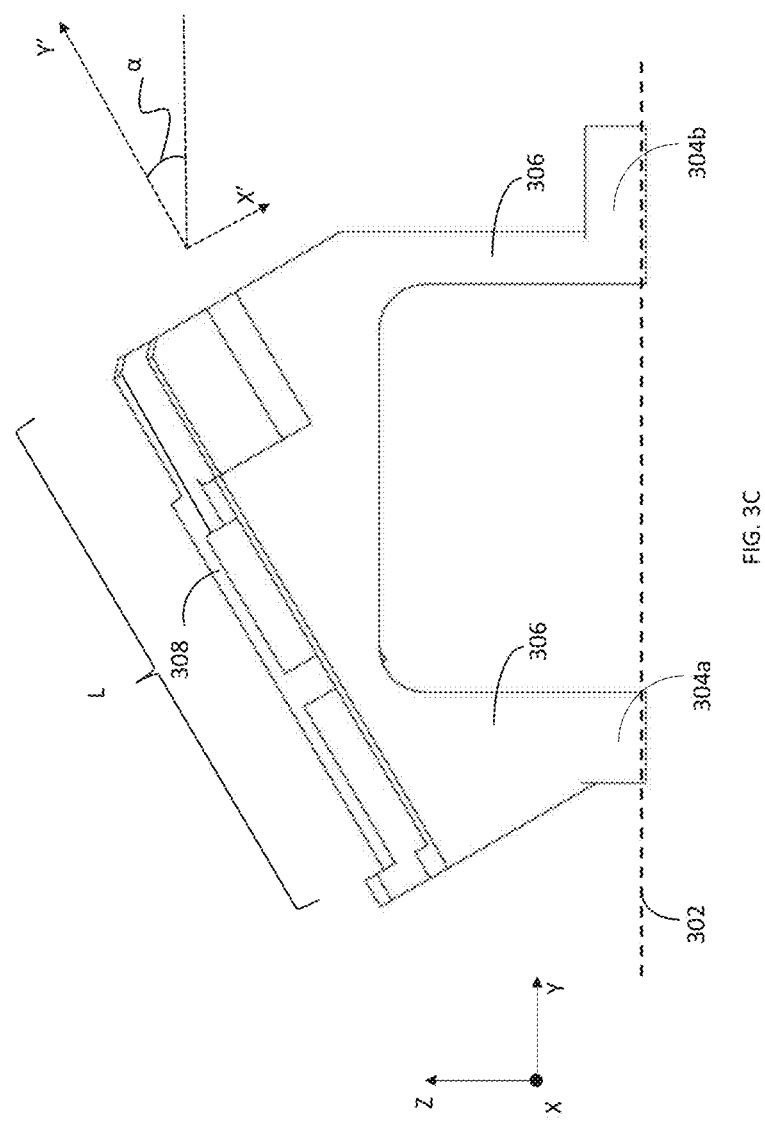
FIG. 3C is a right side view of the slide carrier, according to some embodiments.

Further details of the relative orientation of the plane of the slide platform 308 are described with respect to FIGS. 3B and 3C. FIG. 3B shows a front view (when viewed in the y-direction of FIG. 3A) of the slide carrier 300 according to some embodiments. As illustrated in FIG. 3B, the plane of the slide platform 308 may be rotated about an axis that is parallel to the y-direction. For example, the plane of the slide platform 308 may be parallel to a plane (an X'-Y' plane) defined by a vector or direction X' and a vector or direction Y'. The X' direction may be at an angle relative to an axis that is parallel to the x-direction, such that the plane of the slide platform 308 is rotated at an angle $\theta$, about an axis parallel to the y-direction, relative to the x-direction. According to some embodiments, the angle $\theta$ may be greater than 0 degrees and less than 90 degrees, but the angle $\theta$ may vary in different embodiments. According to some embodiments, the angle $\theta$ is greater than a first predetermined minimum angle and less than a first predetermined maximum angle. In some embodiments the first predetermined minimum angle may be an angle at which a value equal to or larger than the first predetermined minimum angle will cause a slide (e.g., the slide 204) to move in the x-direction (and the X' direction) in view of the forces of gravity and friction, when the slide is placed on the slide platform 308. The first predetermined maximum angle may be an angle at which a value that is equal to or less than the predetermined maximum angle, a slide (e.g., the slide 204) will not have stability issues, or risk falling off of the slide platform 308.

FIG. 3C shows a right side view (when viewed in a direction opposite the x-direction of FIG. 3A) of the slide carrier 300 according to some embodiments. As illustrated in FIG. 3C, the plane X'-Y' plane of the slide platform 308 may be rotate about an axis that is parallel to the x-direction.

For example, Y' direction may be at an angle relative to an axis that is parallel to the y-direction, such that the X'-Y' plane of the slide platform 308 is rotated at an angle α, about an axis that is parallel to the x-direction, relative to the y-direction. According to some embodiments, the angle α may be greater than 0 degrees and less than 90 degrees, but the angle α may vary in different embodiments. According to some embodiments, the angle α may be greater than a second predetermined minimum angle and less than a second predetermined maximum angle. In some embodiments the second predetermined minimum angle may be an angle at which a value equal to or larger than the second predetermined minimum angle will cause a slide (e.g., the slide 204) to move in the direction opposite to the y-direction (and the direction opposite to the Y' direction) in view of the forces of gravity and friction, when the slide is placed on the slide platform 308. The second predetermined maximum angle may be an angle at which a value that is equal to or less than the second predetermined maximum angle, a slide (e.g., the slide 204) will not have stability issues, or risk falling off of the slide platform 308.

Referring to FIGS. 3B and 3C, the slide platform 308 may include elongated support portions 310 that extend or are elongated in the Y' direction, and may include one or more crossmember support portions 312 that extend between the support portions 310 in the X' direction. According to some embodiments, the top surface of each of the support portions 310 and the crossmember support portions 312 may be coplanar with each other and the X'-Y' plane. Collectively, the top surfaces of each of the support portions 310 and the crossmember support portions 312 may provide a platform or surface upon which a slide (e.g., the slide 204) may be placed. The relative angles of the X'-Y' plane of the slide platform 308, in addition to the force of gravity which will exceed the counterforces of friction according to some embodiments, may cause the slide (e.g., the slide 204) to gravitate toward or register at the lowest corner or intersection point C. That is, because the X'-Y' plane of the slide platform 308 is rotated or tilted about the x-direction axis and the y-direction axis, when a slide is placed on the slide platform 308, the slide may drift or migrate toward the lowest point on the slide platform 308 at the corner C.

According to some embodiments, the width W1, which is the width measured from the outermost edges of the support portions 310 along the x-direction may be greater than the width of the slide (e.g., the slide 204) to be placed on the slide platform 308. Additionally, the width W2, which is the width measured from outside of the lower long edge of the slide platform 308 (e.g., the outside edge of the support portion 310b) to the inside or closest edge of the opposite support portion 310 (e.g., the support portion 310a), may also be greater than the width of the slide. Thus, because both the width W1 and the width W2 may be greater than the width of the slide, the risk of the slide falling or teetering off of the slide platform 308 may be relatively reduced or minimized. In other embodiments, however, the width W2 may be less than the width of a slide, and the crossmember support portion 312 may provide support to the slide 204 to prevent the slide from sliding or slipping between the space or opening between opposing support portions 310a and 310b.

Figure 3D:
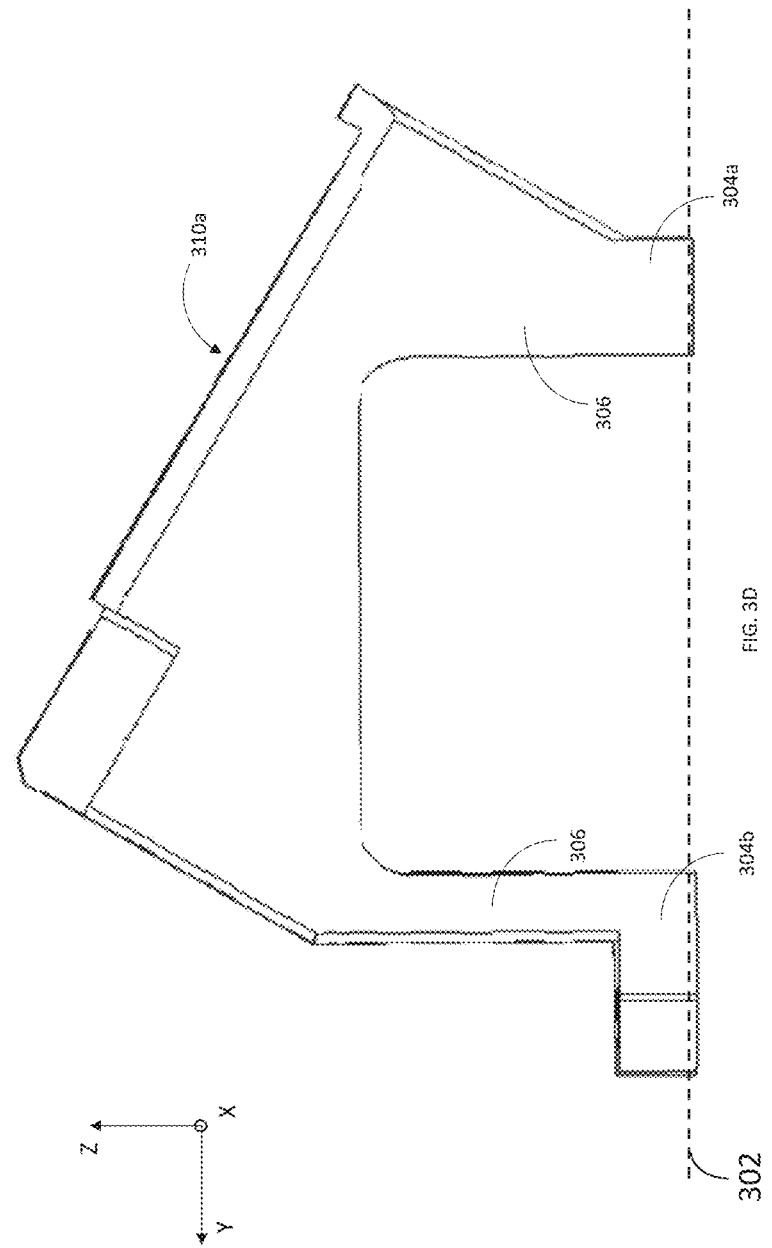
FIG. 3D is a left side view of the slide carrier, according to some embodiments.

FIG. 3D shows a left side view of the slide carrier 300 according to some embodiments. As shown in FIG. 3D, when viewed from the left side of the slide carrier 300, the upper surface of the support portion 310a may be visible, but the support portion 310b is below (e.g., at a lower height or elevation) compared to the support portion 310a. Additionally, as illustrated in FIG. 3D, according to some embodiments, there may be an opening or space between the pillars or vertical supports 306 in the y-direction. In some embodiments, there may also be an opening or space between vertical supports 306 in the x-direction. Thus, in some embodiments, the slide carrier 300 may include two vertical supports 306 at or near opposing ends of the slide carrier 300, or the slide carrier 300 may include additional vertical supports 306, for example, four vertical supports 306 at or near different corners of the slide carrier 300. By creating an opening between different vertical supports 306, the slide carrier 300 may be able to utilize a reduced amount of material, with a relatively lower weight, while still maintaining structural integrity and strength.

Figure 3E:
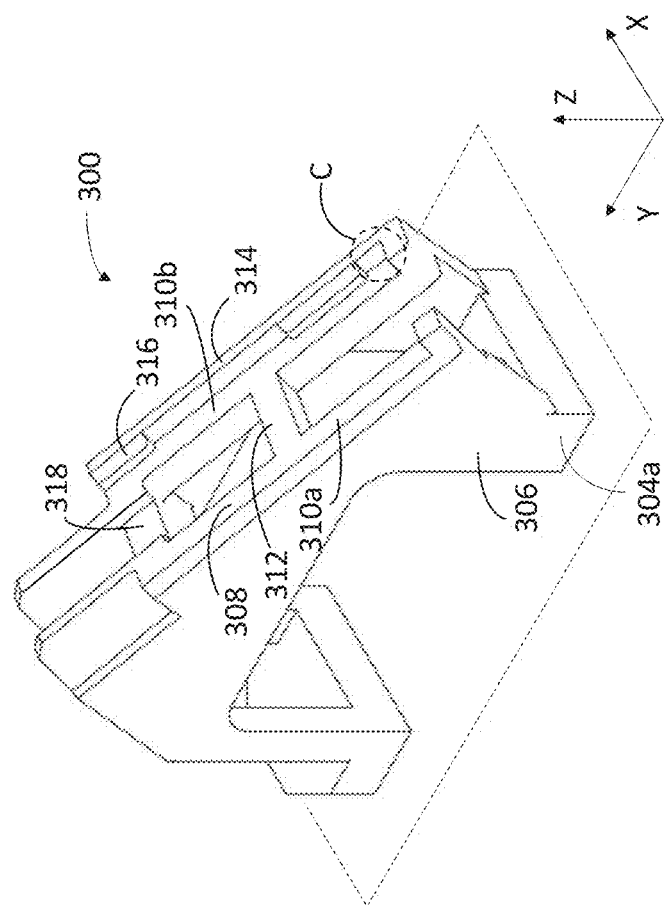
FIG. 3E is a left front perspective view of the slide carrier, according to some embodiments.

FIG. 3E shows a left side perspective view of the slide carrier 300 according to some embodiments. As illustrated in FIG. 3E (and also illustrated in FIG. 3B) the slide carrier 300 may include a barrier or wall 314 that protrudes above the surface of the slide platform 308 at the lower long edge and at the lower short edge of the slide platform 308. The barrier 314 may operate to prevent a slide from sliding off of the slide carrier 300 from the force of gravity. In some embodiments, one or more bumpers or protrusions 316 may extend or protrude from the barrier 314 (for example, with one or more spaces or gaps along the barrier 314 between the adjacent bumpers 316), which may further assist with registering the slide in the intended location. In some embodiment the bumpers 316 may have a softer texture or may be more compressible than the material of the barrier 314, which may prevent damage to the slide.

Additionally, in some embodiments, the bumpers 316 may be elevated above the slide platform 308, or may have a lip or bevel above the slide platform 308 to enable a slide to at least partially extend under a portion of the bumpers 316, thereby providing additional force or pressure against the slide toward the slide platform 308 in order to prevent the slide from inadvertently slipping off of the slide platform 308.

Referring again to FIGS. 3E and 3B, in some embodiments, a connection structure 318 may extend between the opposing support portions 310a and 310b to provide a mechanical connection between the support portions 310a and 310b, as well as to improve the structural integrity of the overall slide carrier 300. According to some embodiments, however, the upper surface of the connection structure 318 may be receded relative to the X'-Y' plane of the slide platform 308. That is, in some embodiments, the connection structure 318 may be located below the surface of the slide platform 308, which may reduce friction with the slide and reduce the likelihood of an edge of the slide unintentionally making contact with, or getting caught up by, the side wall of the connection structure 318 when the slide is being placed on the slide platform 308.

Additionally, in some embodiments, various locations on the slide platform 308 may be utilized as teaching positions for aligning an automated or robotic system. In some embodiments, additional, or alternative teaching positions may be located various known angles and locations relative to the slide platform 308 to enable the automated or robotic system to identify the location of the slide carrier 300 and the slide platform 308.

Figure 3F:
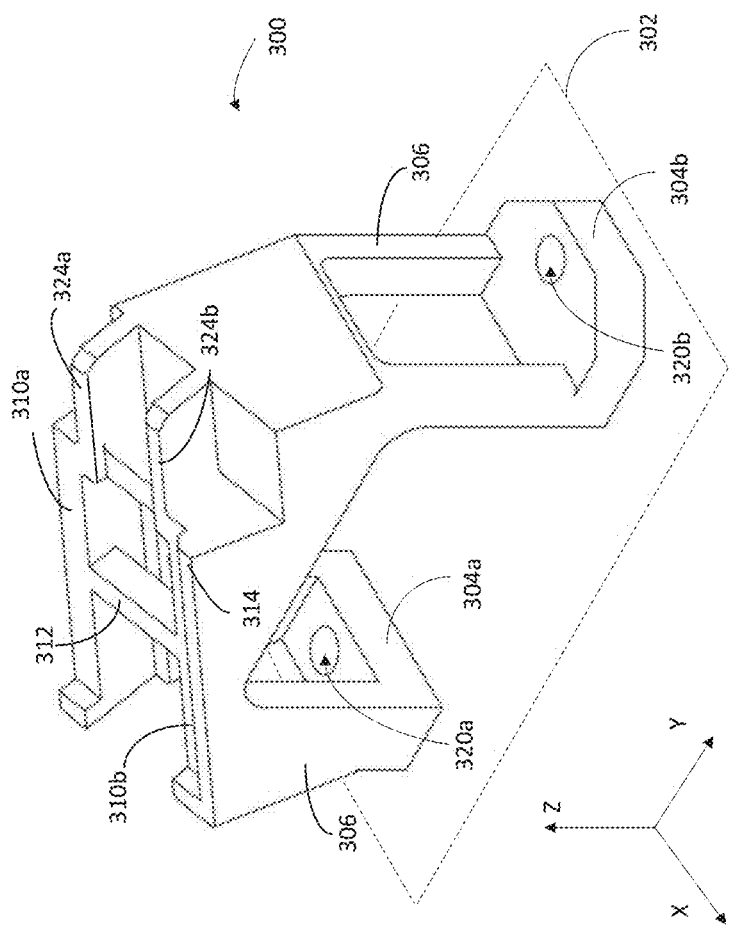
FIG. 3F is a right rear perspective view of the slide carrier, according to some embodiments.

FIG. 3F shows a rear perspective view of the slide carrier 300 according to some embodiments. As shown in FIG. 3F, one or more of the base supports 304 may include an opening or hole 320. The holes 320 may be utilized for securing the slide carrier 300 to the surface 302, for example, by using a screw or bolt. Although FIG. 3F shows two holes 320a and 320b located at each base support 304a and 304b, respectively, embodiments according to the present invention are not limited thereto, and in some embodiments, each base support 304 may include a plurality of openings or holes 320 for securing the slide carrier 300 to the surface 302. Alternatively, in some embodiments, the openings or holes 320 may be omitted for one or more of the base supports 304. Additionally, the slide carrier 300 may be mounted or secured to the surface 302 by utilizing any other suitable mechanical mounting mechanism. For example, in some embodiments, an adhesive, one or more clips, springs, grooves, teeth, etc., may be utilized to secure the slide carrier 300 to the surface 302.

Additionally, according to some embodiments as illustrated in FIG. 3F, the support portions 310 may have narrow support portions 324a and 324b, at the higher elevation end of each support portion 310a and 310b, respectively. The top surfaces of the narrow support portions 324a may be coplanar with the top surfaces of the support portions 310a and 310b, and the crossmember support portion 312. The distance between the narrow support portions 324a and 324b, however, may be less than the distance between the support portions 310a and 310b. According to some embodiments, the distance between the outside edges of each of the narrow support portions 324a and 324b may be less than the width of a slide when it is placed on the slide platform 308.

Figure 3G:
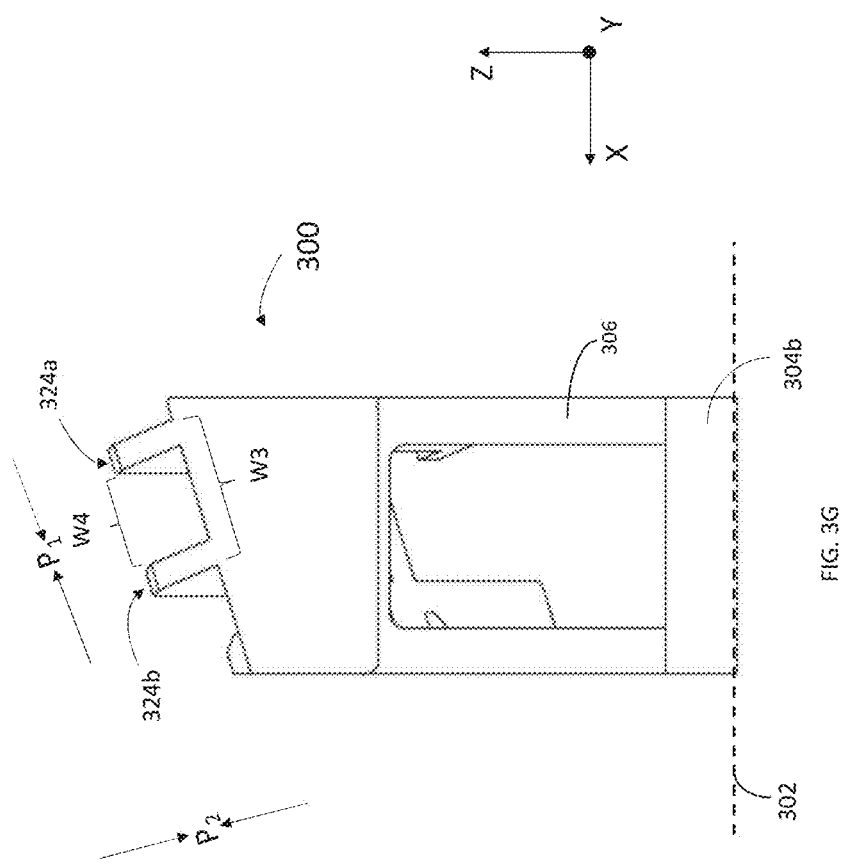
FIG. 3G is a rear view of the slide carrier, according to some embodiments.

FIG. 3G shows a rear view of the slide carrier 300 according to some embodiments. As shown in FIG. 3G, in some embodiments, the outside width W3 between the narrow support portions 324a and 324b may be less than the width of the slide carrier 300 (and the width between the support portions 310a and 310b). Additionally, as discussed above, in some embodiments, the width W3 may be less than the narrow width of a slide when it is placed on the slide platform 308. Thus, it may be relatively easy for a gripper of a mechanical arm to grip the slide in a pinching action $P_1$ (described in more detail below) against the short or narrow width of the slide that is laying on the slide platform 308.

Additionally, as illustrated in FIG. 3G, there may be a space between the narrow support portions 324a and 324b that has a width W4 that is less than the width W3. The space between the narrow support portions 324a and 324b may enable the gripper of a mechanical arm to grip the flat sides of the slide in a pinching action $P_2$ when the slide is resting on the slide platform 308. For example, the space between the narrow support portions 324a and 324b may accommodate a portion of the gripper to fit below the slide, and another portion of the gripper may be maneuvered above the slide, such that the pinching action $P_2$ causes the gripper to put pressure on opposing flat surfaces of the slide in order to pick up or maneuver the slide.

Figure 3H:
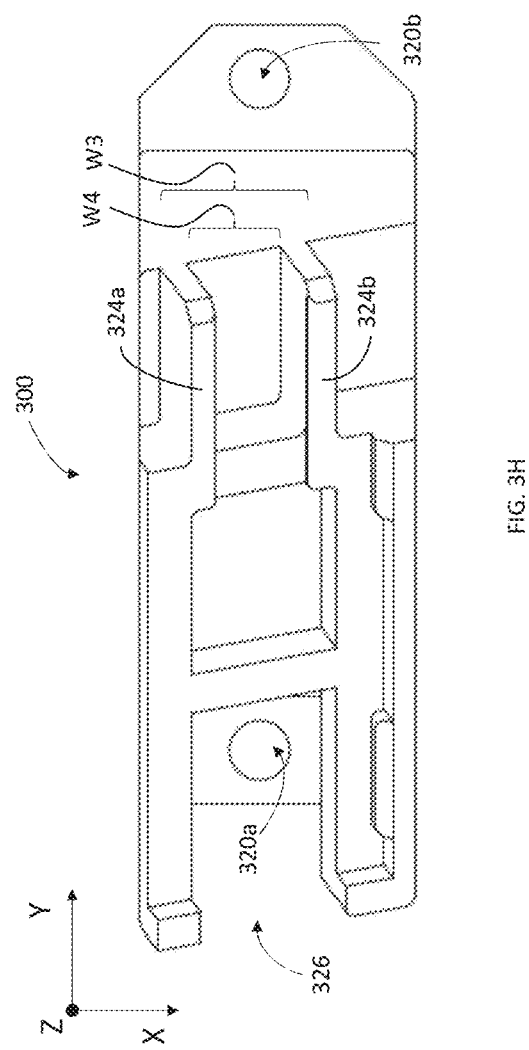
FIG. 3H is a top view of the slide carrier, according to some embodiments.

FIG. 3H shows a top view of the slide carrier 300 according to some embodiments. FIG. 3I shows a bottom view of the slide carrier 300 according to some embodiments. As shown in FIG. 3H, in addition to access to pinching or picking up the slide from the perpendicular pinching actions $P_1$ and $P_2$ described with respect to FIG. 3G, in some embodiments, there may be an opening 326 at the opposite end of the slide carrier 300 relative to the narrow support portions 324a and 324b. The opening 326 may be configured to accommodate a gripper of a mechanical arm in order to pick up a slide resting on the slide platform 308 in a pinching action that is perpendicular to the X'-Y' plane.

Figure 3J:
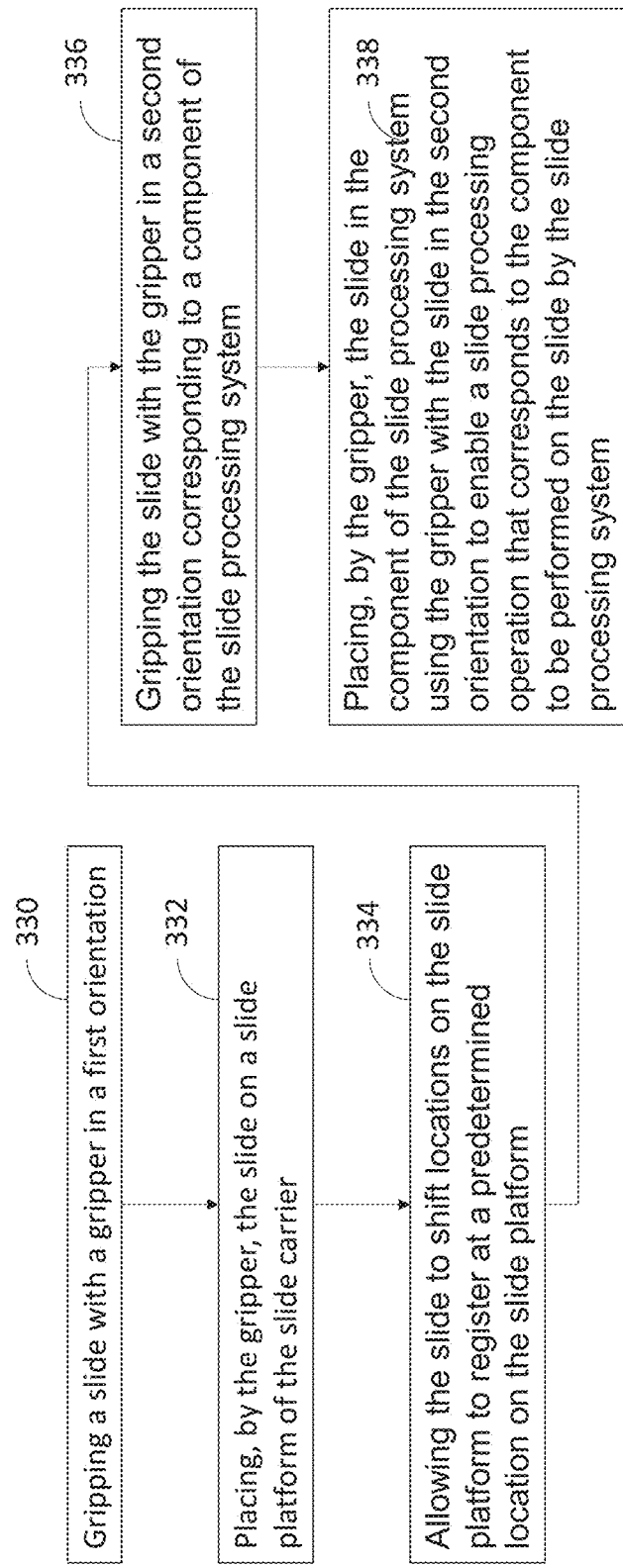
FIG. 3J is a flow diagram illustrating a method of manufacturing a pathology slide in a slide processing system, according to some embodiments.

FIG. 3J is a flow diagram illustrating a method of manufacturing a pathology slide in a slide processing system, according to some embodiments. Although various operations are illustrated in FIG. 3J as part of the method of manufacturing a pathology slide in a slide processing system, embodiments according to the present disclosure are not limited to the operations illustrated in FIG. 3J. For example, some embodiments may include additional operations or fewer operations without departing from the spirit and scope of embodiments according to the present disclosure.

As described above, the manufacturing process starts, and then, at operation 330, a gripper may grip a slide in a first orientation (e.g., any of the orientations described above with respect to FIGS. 3A-3I). At operation 332, the gripper may place the slide on a slide platform of a slide carrier (e.g., the slide carrier 300). At operation 334, the slide may be allowed to shift or move (e.g., under the force of gravity) locations on the slide platform to register the slide at a predetermined location on the slide platform. At operation 336, the slide may be gripped with the gripper in a second orientation (e.g., any of the operations described above with respect to FIGS. 3A-3I), and the second orientation may correspond, for example, to a component (e.g., a slide carrier or slide processing station). At operation 338, the gripper may place the slide in the component of the slide processing system using the gripper with the slide in the second orientation to enable a slide processing operation that corresponds to the component to be performed on the slide by the slide processing system.

Thus, as described above, embodiments according to the present disclosure may include a slide carrier that enables a slide to be picked up or placed down during intermediate manufacturing operations from various angles or orientations. When the slide is placed on the slide carrier, the slide will gravitate to a known, fixed position and orientation, enabling the gripper and mechanical arm to pick up the slide again relatively easily. The slide carrier utilizes compound angles to bias the edges of the slide toward a known location (e.g., the bottom right edge) of the slide carrier. The resting surface of the slide carrier may be minimized or reduced in order to reduce friction on the faces of the slide, and angles of the slide carrier may be optimized or designed to increase potential energy and help to ensure the slide will move under gravity. Additionally, various features are incorporated into the slide carrier to enable various gripper and suction cup designs for picking up and dropping off slides. Additionally, registration features may be added to facilitate teaching positions for aligning to an automated or robotic system. According to some embodiments, an edge detection system (e.g., by utilizing a camera or sensor on a mechanical arm or gripper) may be utilized to detect the location of the slide.

FIGS. 4A-4M illustrate a mechanical arm gripper according to some embodiments of the present disclosure. As described above with respect to FIGS. 2 and 3, according to some embodiments of the present disclosure, a mechanical arm with a gripper connected to an end of the mechanical arm may be configured to pick up and manipulate a slide in a slide processing or manufacturing environment.

Figures 4A, 4B:
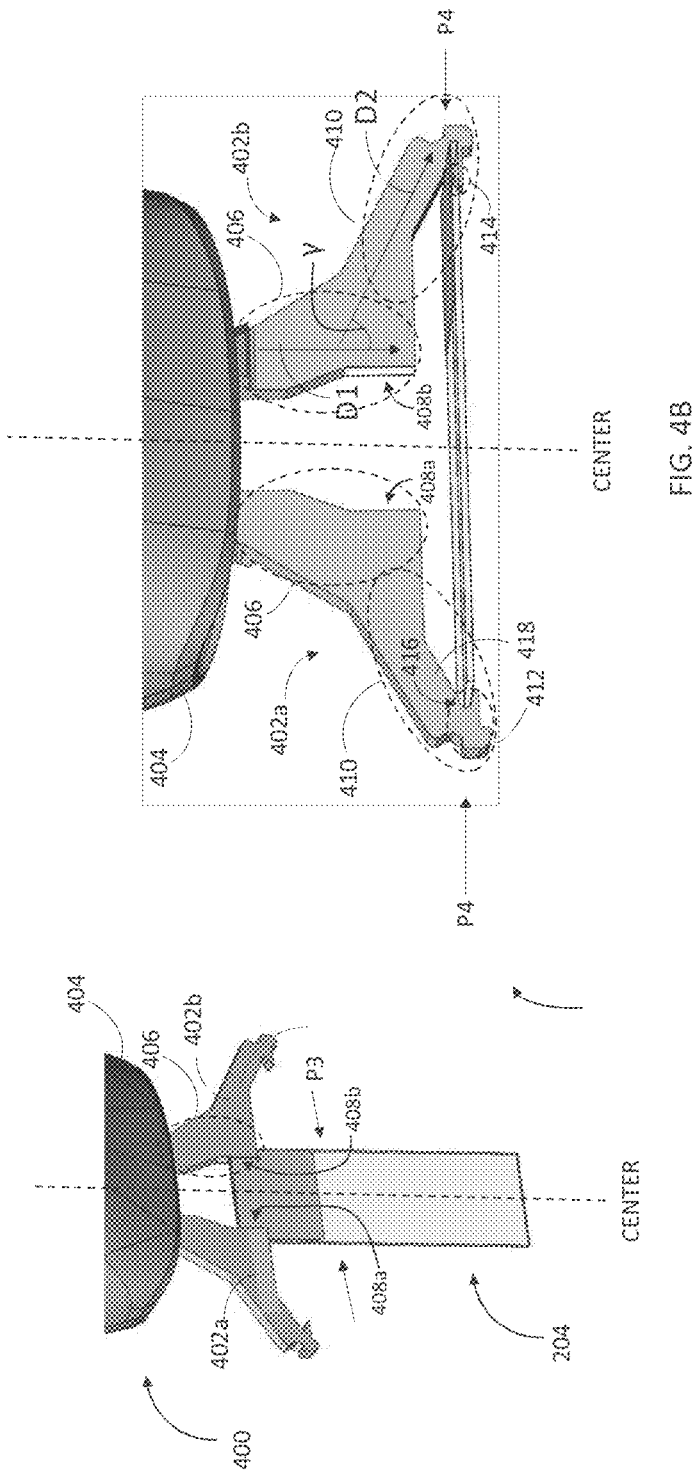
FIG. 4A illustrates a gripper holding a slide in a first gripping mode, according to some embodiments.
FIG. 4B illustrates the gripper holding a slide in a second gripping mode, according to some embodiments.

FIG. 4A illustrates an example of a gripper 400 according to some embodiments. The gripper 400 may be the same as or similar to (or one example of) the gripper 216 illustrated in the slide processing or manufacturing system 200 of FIG. 2A.

The gripper 400 according to some embodiments may be configured to grip or manipulate a slide in various positions or orientations, in order to enable the slide to interface with various different carriers and machines in the process of manufacturing a pathology slide. Thus, embodiments according to the present disclosure may reduce the need to change grippers or tools, and/or utilize multiple mechanical arms during the manufacturing process.

The gripper 400 may be formed of any suitable material that is solid enough to support a glass slide 204, without a substantial risk of the glass slide or the gripper 400 being damaged. For example, in some embodiments, the gripper 400 may be formed of a plastic or polymer material, but embodiments according to the present disclosure are not limited thereto.

As shown in FIG. 4A, the gripper 400 may include two or more gripper fingers 402. Although FIGS. 4A-4M are described in the context of two gripper fingers 402a and 402b, embodiments according to the present disclosure are not limited thereto, and some embodiments may include additional gripper fingers 402 without departing from the spirit and scope of embodiments according to the present disclosure. In the present Specification, in some instances, the reference numeral 402 may be used to refer generally to each of the gripper fingers 402a and 402b (and any additional gripper fingers that may be utilized in some embodiments).

Additionally, according to some embodiments, the gripper 400 (or the mechanical arm to which the gripper 400 is attached) may include additional components configured to be utilized in connection with the manipulation and maneuvering of a slide during a slide manufacturing process. For example, in some embodiments, the gripper 400 (or the mechanical arm to which the gripper 400 is attached) may include a suction cup for creating a suction force against a slide. Additionally, in some embodiments, the gripper 400 (or the mechanical arm to which the gripper 400 is attached) may include a camera or sensor (e.g., an optical sensor, a pressure sensor, etc.) configured to identify or measure the location of a slide, a slide carrier, a surface, or the like.

As shown in FIGS. 4A-4M, the gripper 400, using the gripper fingers 402a and 402b, may be configured to apply a pinching or inward force P3 toward a center line CENTER, which bisects the gripper 400. The gripper fingers 402a and 402b may be positioned an equal distance from the center line CENTER, and may be configured to move toward and away from the center line CENTER in coordination with each other (e.g., at a same speed and with a same force).

Referring to FIGS. 4A-4M, the gripper fingers 402a and 402b may be mounted to an actuator 404 configured to move the gripper fingers 402a and 402b inward (toward the center line CENTER) and outward (away from the center line CENTER) in order to open or close a space between the gripper fingers 402a and 402b. The actuator 404 may be connected to a mechanical arm (e.g., the mechanical arm 202 shown in FIG. 2A), such that collectively, the mechanical arm 202, the actuator 404, and the gripper 400 may operate to manipulate a slide or move the slide from one location to another location. Each gripper finger 402a and 402b may have the same or similar shape. For example, in some embodiments, the gripper finger 402b may be the same as the gripper finger 402a, except rotated 180 degrees relative to the gripper finger 402a, although embodiments according to the present disclosure are not limited thereto.

FIG. 4A illustrates the gripper 400 holding a slide in a first gripping mode or configuration, in which the gripper fingers 402a and 402b operate to provide a pinching force P3 widthwise (along an axis parallel to a width direction of the slide 204), against the long edges of the slide 204.

In the first gripping mode, the gripper 400 may be configured to pick up and/or maneuver the slide 204 in an orientation in which the center line between the gripper fingers 402a and 402b extends along the front face of the slide 204 in parallel with the long edges of the slide 204, with the center line bisecting the short edges of the slide 204.

The gripper fingers 402a and 402b may have a first portion 406 that extends generally in a direction away from the actuator 404. For example, in some embodiments, the first portion 406 may extend in a direction parallel (or generally parallel) to the center line CENTER. The first portion 406 of each gripper finger 402a and 402b may have an interior edge 408a and 408b, respectively, where the interior edges 408a and 408b are interior with respect to the opening or space between the gripper fingers 402a and 402b.

In some embodiments, the interior edges 408a and 408b may be elongated in a direction parallel to the center line CENTER. In some embodiments, the interior edges 408a and 408b may extend parallel to each other, and may each have a groove therein, which are each adapted to receive the top (or bottom) of the long edges a slide as shown in the first gripping mode shown in FIG. 4A. The groove in the interior edges 408a and 408b is illustrated and described in more detail below.

When the pinching or inward force P3 is applied to the long edges of the slide, the gripper 400 may be able to pick up the slide 204 and move the slide around in 3-dimensional space.

FIG. 4B illustrates the gripper 400 holding a slide in a second gripping mode or configuration, in which the gripper fingers 402a and 402b operate to provide a pinching force or pressure P4 lengthwise (along an axis parallel to a length direction of the slide 204) against the short or width edges of the slide 204. That is, the pressure or force P4 may be in a direction toward (e.g., perpendicular to) the center line CENTER. In the second gripping mode, the gripper 400 may pick up and/or maneuver the slide 204 in an orientation in which the center line CENTER between the gripper fingers 402a and 402b may extend through the front and rear faces of the slide 204, halfway between the short edges of the slide 204. That is, a direction that is perpendicular or normal with respect to the planes of the front and rear faces of the slide 204 may be parallel to the center line CENTER, such that the front or rear face of the slide 204 faces toward the actuator 404.

The gripper fingers 402a and 402b may have a second portion 410 that extends from the first portion 406 at an angle that is greater than zero degrees and less than 90 degrees relative to the extension direction of the first portion 406. For example, if the first portion 406 extends in a direction D1 away from the actuator 404, the second portion 410 may extend in a direction D2 away from the first portion 406, where an angle γ between the direction D1 and the direction D2 is less than 90 degrees and greater than zero degrees. Accordingly, an end 412, which is the furthest point of the second portion 410 from the actuator 404, may be further away from the actuator 404, and may also be further away from the center line CENTER, compared to the interior edges 408a and 408b of the first portion 406.

The end 412 of the second portion may include a protrusion or tooth 414 that extends toward the center line CENTER, such that a groove or cavity 416 is created between the protrusion 414 and the main body 418 of the second portion 410. Further details of the groove or cavity 416 and the protrusion 414 are illustrated and described in more detail below.

Because the ends of the second portion 410 are both further away from the actuator 404, and further away from each other, compared to the interior edges 408a and 408b, a wider space may be created between the ends of the second portion 410, relative to the space between the interior edges 408a and 408b. Additionally, the groove 416 between the protrusion 414 and the main body 418 of the second portion 410 may accommodate the width or short edges of the slide 204 such that the gripper 400 can pick up and/or maneuver the slide 204 with the front or rear face of the slide 204 facing toward the actuator 404.

FIG. 4C illustrates the gripper 400 holding a slide in a third gripping mode or configuration, according to some embodiments. In the third gripping mode, the gripper fingers 402a and 402b operate to provide a pinching force or pressure P5 lengthwise (along an axis parallel to a length direction of the slide 204) against the width or short edges of the slide. That is, the pressure or force P5 may be in a direction toward (e.g., perpendicular to) the center line CENTER. In the third gripping mode, the gripper 400 may pick up and/or maneuver the slide 204 in an orientation in which the center line CENTER between the gripper fingers 402a and 402b may extend through the long edges of the slide 204, halfway between the short edges of the slide 204. That is, in contrast to the second gripping mode, in which either the front or rear surface of the slide 204 faces toward the actuator 404, in the third gripping mode, one of the long edges of the slide 204 may face the actuator 404, with the center line CENTER bisecting the front and rear faces, and the front and rear faces facing a direction perpendicular to the extension line of the center line CENTER.

According to some embodiments, the second portion 410 of each gripper finger 402a and 402b may include interior edges 420a and 402b, respectively, that extend in parallel to the extension directions of the interior edges 408a and 408b. The interior edges 420a and 420b may extend in parallel to each other and to the interior edges 408a and 408b. The interior edges 420a and 420b may be interior with respect to the opening or space between the gripper fingers 402a and 402b, and may be elongated or extend in a direction parallel to the center line CENTER. Each interior edge 420a and 420b may face the center line, and may include a groove, which is adapted or configured to accommodate or receive the top or bottom portion of the width edges of the slide 204. The grooves of the interior edges 420a and 420b are illustrated and described in more detail below.

Figure 4D:
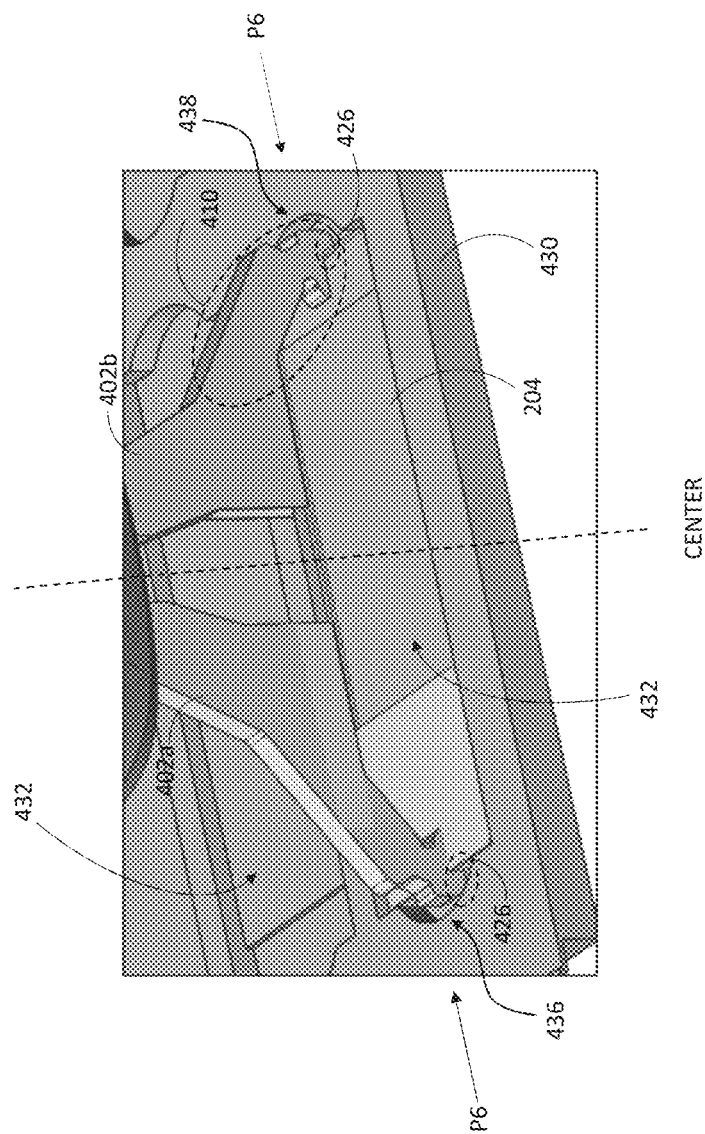
FIG. 4D illustrates the gripper holding a slide in a fourth gripping mode, according to some embodiments.

FIG. 4D illustrates the gripper 400 holding a slide in a fourth gripping mode or configuration, according to some embodiments. In the fourth gripping mode, the gripper fingers 402a and 402b operate to provide a pinching force or pressure P6 lengthwise (along an axis parallel to a length direction of the slide 204) against the short or width edges of the slide 204.

That is, the pressure or force P6 may be in a direction toward (e.g., perpendicular to) the center line CENTER. In the fourth gripping mode, the gripper 400 may pick up and/or maneuver the slide 204 in an orientation in which the center line CENTER between the gripper fingers 402a and 402b may extend through the front and rear faces of the slide 204, halfway between the short edges of the slide 204. That is, a direction that is perpendicular or normal with respect to the planes of the front and rear faces of the slide 204 may be parallel to the center line CENTER, such that the front or rear face of the slide 204 faces toward the actuator 404.

The gripper fingers 402a and 402b may have a protrusion 426 that extends from the end 412 in a direction parallel to the center line CENTER, below the protrusion 414. In some embodiments, the protrusion 414 may be configured to contact the front or rear face of the slide 204 in the fourth gripping mode, and the protrusions 426 may be configured to apply the pressure or force P6 toward the center of the slide 204.

The fourth gripping mode may be configured to be utilized in an operation in which the slide 204 is manipulated with respect to a slide carrier 430 (the slide carrier 430 may be the same as, or similar to, any of the slide carriers 208, 214a, or 214b described with respect to FIG. 2A). For example, the slide carrier 430 may have one or more cavities 432 that are configured to accommodate the slide 204. For example, the cavities 432 may have a width, length, and depth that correspond to (e.g., are slightly larger within a predetermined or acceptable tolerance than) the width, length, and thickness of the slide 204.

Because the protrusion 426 may extend past the length of the slide 204, however, in order to enable the gripper 400 to safely place the slide 204 into the cavity 432 and/or access a firm/sufficient grip on the slide 204 when the slide 204 is already in the cavity 432, the cavity 432 may include a first cavity extension 436 and a second cavity extension 438. The first and second cavity extensions 436 and 438 may be located at opposite ends of the cavity 432 in the length direction. The cavity extensions 436 and 438 may have a size or footprint that is larger than that of the protrusion 426, such that the protrusion 426 can fit within the cavity extensions 436 and 438 when the gripper 400 picks up and/or sets down the slide 204 within the cavity 432. In some embodiments, the cavity extensions 436 and 438 may have a circular or rounded edge in a plan view, but embodiments according to the present disclosure are not limited thereto. For example, the cavity extensions 436 and 438 may have a rectangular shape, or a shape that follows the contour of the gripper 400 in a plan view, or any other suitable shape capable of accommodating the protrusion 426.

Figure 4E:
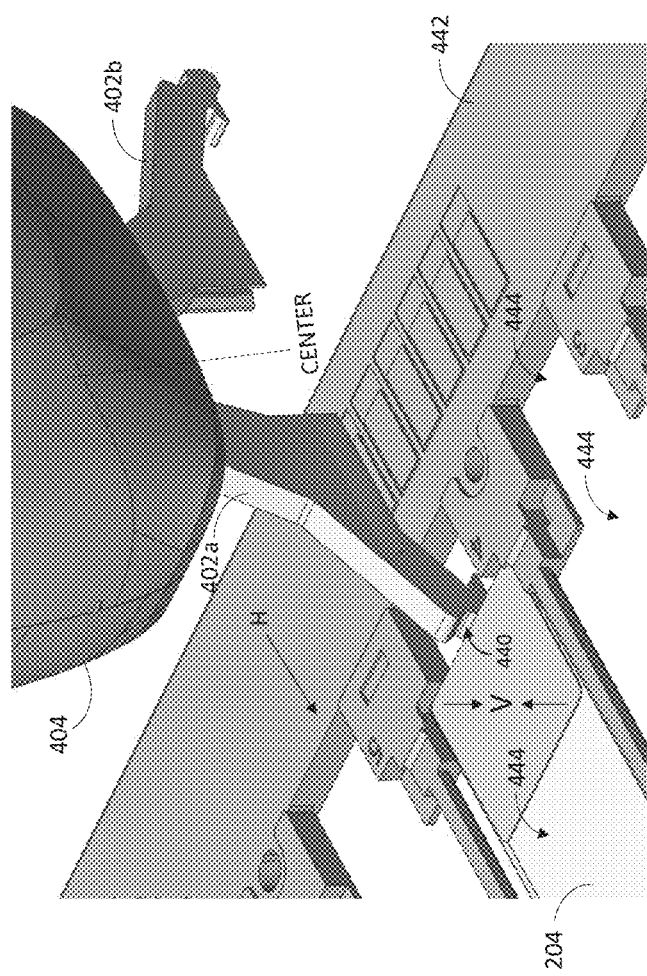
FIG. 4E illustrates the gripper manipulating a slide using an exterior groove, according to some embodiments.

FIG. 4E illustrates the gripper 400 manipulating a slide using an exterior groove or cavity, according to some embodiments. According to some embodiments, the gripper fingers 402 may have an exterior groove 440 extending in a direction perpendicular to the center line CENTER. The exterior groove 440 may be located, for example, on the opposite side of the gripper fingers 402 relative to the space between the gripper fingers 402. The exterior groove 440 may also be located on an opposite side of the second portion 410 relative to the groove 416.

The exterior groove 440 may have a shape configured to receive or accommodate one of the edges of the slide 204, in order to push or provide a force against the slide 204 in a horizontal direction H and/or a vertical direction V relative to a plane in parallel to a front or rear face of the slide 204. For example, as illustrated in FIG. 4E, a slide carrier 442 may be utilized to hold or secure the slide 204. The slide carrier 442 may be, for example, the same as the slide carriers 208, 214a, or 214b, described with respect to FIG. 2A. The slide carrier 442 may include a plurality of cavities 444 configured or shaped to accommodate the slide 204. Each cavity 444 may additionally include a cavity extension 446 that is adjacent to the width edge of the cavity 444, and which is configured or shaped to accommodate the end of the gripper finger 402 and to enable the groove 440 to engage with the width edge of the slide 204.

In some embodiments, the slide carrier 442 may include a spring or clip requiring a force or pressure in the horizontal direction H in order to remove the slide 204 from the slide carrier 442 or to insert the slide 204 into the slide carrier 442. Thus, the exterior groove 440 may be configured to engage the edge of the slide 204, such that the edge of the slide 204 fits within the curvature of the groove 440. The actuator 404 and the gripper finger 402 may then move in the horizontal direction H and/or the vertical direction V to cause the slide 204 to engage or disengage with the slide carrier 442.

Figure 4G:
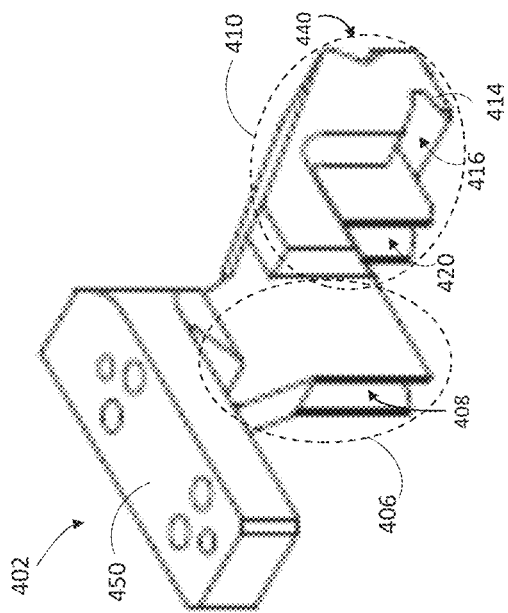
FIG. 4G is a top rear perspective view of a gripper finger, according to some embodiments.
Figure 4F:
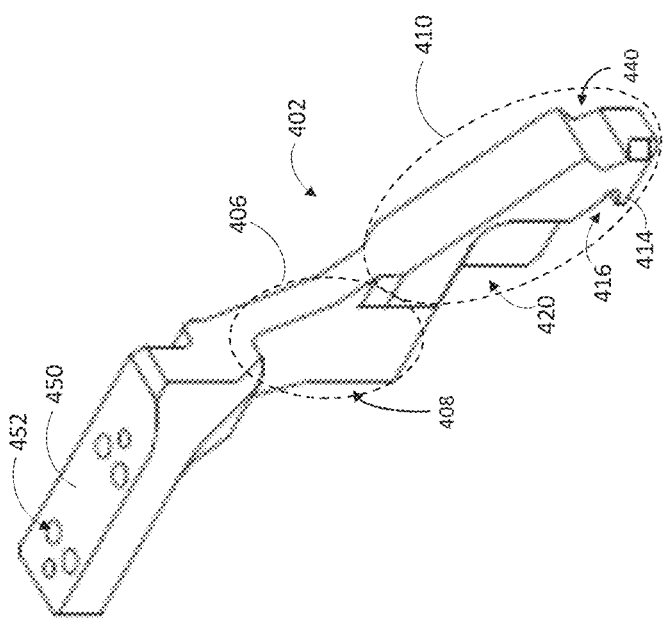
FIG. 4F is a top front perspective view of a gripper finger, according to some embodiments.

FIG. 4F is a top front perspective view of a single gripper finger 402, according to some embodiments. FIG. 4G is a top rear perspective view of a single gripper finger 402 according to some embodiments. As shown in FIGS. 4F and 4G, the gripper finger 402 may include a mounting plate 450. The mounting plate 450 may include a plurality of holes 452 formed therethrough. Thus, the gripper finger 402 may be mounted or mechanically connected to the actuator 404 by the mounting plate 450, with one or more screws, bolts, etc., passing through the holes 452 to fasten the gripper finger 402 to the actuator 404. Additionally, some embodiments may utilize any other suitable fastening mechanism to mechanically connect and secure the gripper finger 402 to the actuator 404.

As illustrated in FIGS. 4F and 4G, and as described above, each of the grooves 416 and 440 may have a shape that is configured to accommodate the edges (e.g., the width edge) of a slide 204. For example, the width or distance across the grooves 416 and 440 may be greater than the thickness (measured from the front face to the rear face) of the slide. In some embodiments, at least one of the groove 416 or the groove 440 may have a curvature (for example, that conforms to, or can accommodate, the edges of the slide 204). Additionally, in some embodiments, at least one of the groove 416 or the groove 440 may have a rectangular shape and/or sloped sidewalls. The grooves 416 and 440 are configured to engage the slide 204 in a configuration in which either the front or rear face of the slide 204 is oriented toward the actuator 404 (and the mounting plate 450).

Similarly, as illustrated in FIGS. 4F and 4G, and as described above, each of the interior edges 408 and 420 may have a shape that is configured to accommodate the edges of a slide 204. In particular, the interior edge 408 may be utilized to accommodate the top or bottom of the length edge of the slide 204 (as shown in FIG. 4A), and the interior edge 420 may be utilized to accommodate the width edge of the slide 204 (as shown in FIG. 4C). For example, the distance across the groove or cavity of the interior edge 408 and the interior edge 420 may be greater than the thickness of the slide. The interior edges 408 and 420 are therefore configured to engage the slide 204 in a configuration in which either the width edge or the length edge of the slide 204 is oriented toward the actuator 404 (and the mounting plate 450).

Figure 4I:
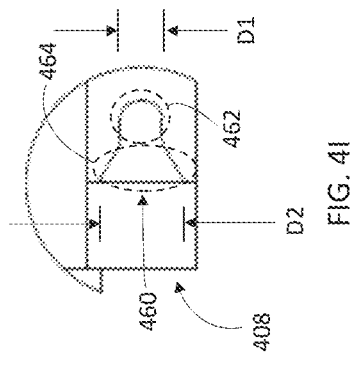
FIG. 4I is a close-up view of a section A of FIG. H, according to some embodiments.
Figure 4J:
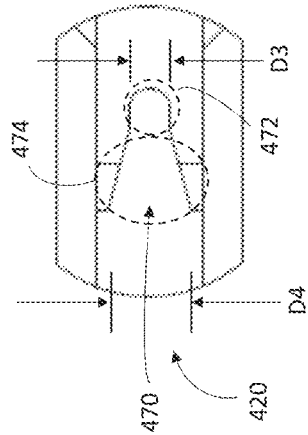
FIG. 4J is a close-up view of a section B of FIG. H, according to some embodiments.
Figure 4H:
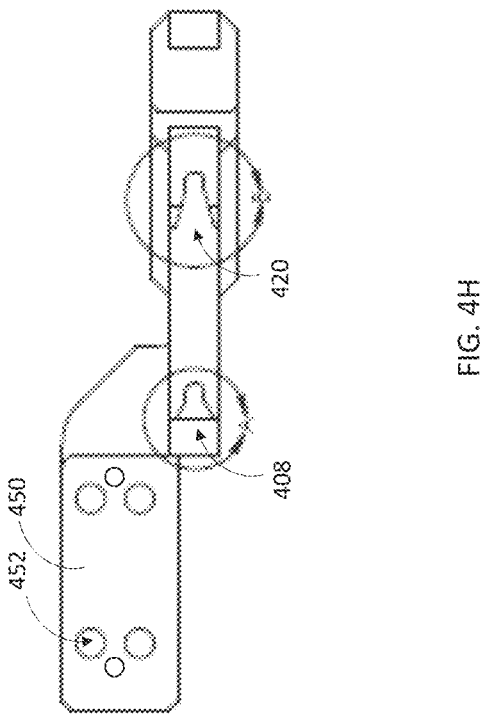
FIG. 4H is a bottom view of a gripper finger, according to some embodiments.

FIG. 4H is a bottom view of a single gripper finger 402 according to some embodiments. FIG. 4I is a close-up view of the section A of FIG. 4H according to some embodiments. FIG. 4J is a close-up view of the section B of FIG. 4H according to some embodiments. Thus, FIGS. 4I and 4J illustrate further details of the interior edges 408 and 420, according to some embodiments.

Referring to FIGS. 4H and 4I, and as discussed above, the interior edge 408 may be configured to accommodate the edge of a slide 204. Thus, the interior edge 408 may include a groove or cavity 460. The cavity 460 may include a first portion 462 that has a width or distance D1 across the cavity 460 at the first portion 462 that is greater than the thickness of the slide 204. Thus, the first portion 462 of the cavity 460 may be configured to accommodate the thickness of the slide 204 to enable the gripper 400 to put the pressure or force against the edge of the slide 204. The cavity 460 may further include a second portion 464 that has a width or distance D2 at an opening of the cavity 460 that is wider than the width D1, and then tapers down to the width D1 at the junction between the first portion 462 and the second portion 464. Thus, because the opening of the cavity 460 is wider than the width D1, and then tapers down to the width D1, the cavity 460 in some embodiments may enable the slide 204 to be inserted into the cavity 460 with a higher degree of tolerance.

Similarly, referring to FIGS. 4H and 4J, and as discussed above, the interior edge 420 may be configured to accommodate the edge of a slide 204. Thus, the interior edge 420 may include a groove or cavity 470. The cavity 470 may include a first portion 472 that has a width or distance D3 across the cavity 470 at the first portion 472 that is greater than the thickness of the slide 204. Thus, the first portion 472 of the cavity 470 may be configured to accommodate the thickness of the slide 204 to enable the gripper 400 to put the pressure or force against the edge of the slide 204. The cavity 460 may further include a second portion 474 that has a width or distance D4 at an opening of the cavity 470 that is wider than the width D3, and then tapers down to the width D3 at the junction between the first portion 472 and the second portion 474. Thus, because the opening of the cavity 470 is wider than the width D3, and then tapers down to the width D3, the cavity 470 in some embodiments may enable the slide 204 to be inserted into the cavity 470 with a higher degree of tolerance.

Figure 4L:
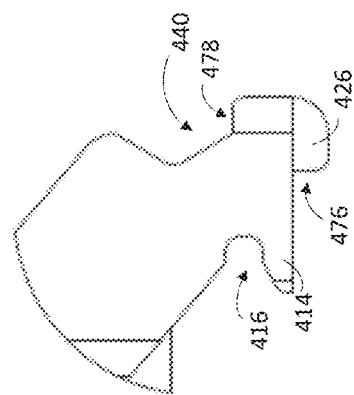
FIG. 4L is a close-up view of a section C of FIG. 4K, according to some embodiments.
Figure 4K:
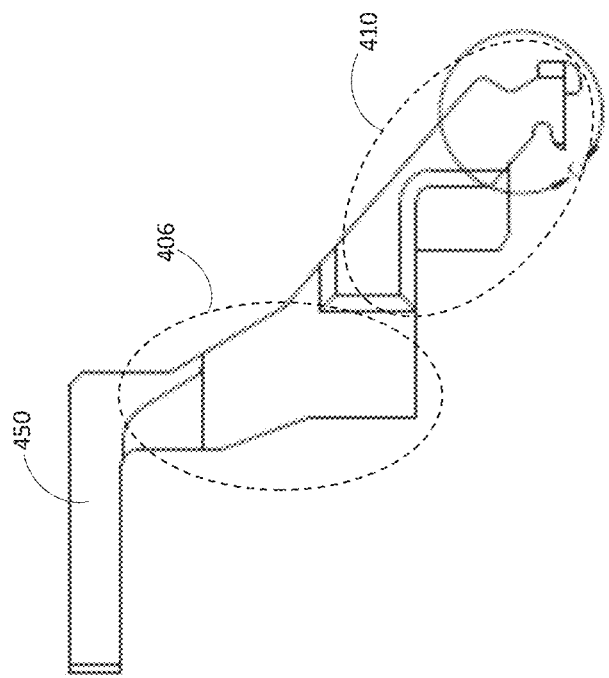
FIG. 4K is a left side view of a gripper finger, according to some embodiments.

FIG. 4K is a side view of a single gripper finger 402 according to some embodiments. FIG. 4L is a close up view of the section C of FIG. 4K according to some embodiments. Thus, FIG. 4L shows further details of the protrusions 414 and 426, and the grooves 416 and 440 according to some embodiments.

As shown in FIGS. 4K and 4L, the protrusion 414 may extend in a direction toward the center line CENTER shown, for example, in FIG. 4A. The protrusion 414 may operate as a support to the slide 204, when the edge of the slide 204 is inserted or accommodated within the groove 416. Additionally, as described with respect to the interior edges 408 and 420, the groove 416 may have a width at a deeper portion that corresponds to, or is greater than, the thickness of the slide 204, and the groove 416 may have an even wider width at the opening (formed or defined by the main body of the gripper finger 402 and the protrusion 414) that is wider and then tapers down to a smaller width.

Additionally, as shown in FIG. 4L, the protrusion 426 may extend vertically below the protrusion 414, and may have an edge 476 that extends in parallel to the center line CENTER (shown, for example, in FIG. 4A). The edge 476 may provide a surface to provide a compressive or lateral force against a slide 204.

The exterior groove 440 may be positioned above the protrusion 426. An edge or shelf 478 may operate as a support or platform for the front or rear face of the slide 204. The other surfaces of the groove 440 may provide a surface for pushing against the edge of the slide 204.

Figure 4M:
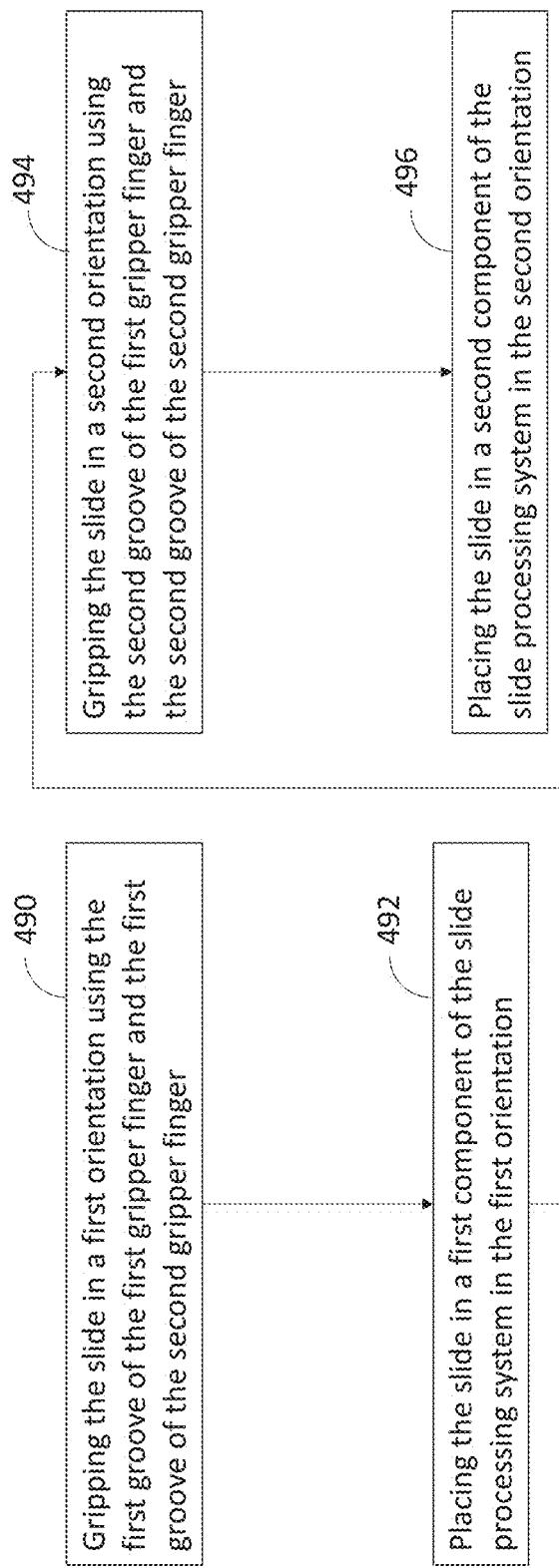
FIG. 4M is a flow diagram illustrating a method of manufacturing a slide in a slide processing system, according to some embodiments.

FIG. 4M is a flow diagram illustrating a method of manufacturing a slide in a slide processing system, according to some embodiments. Although various operations are illustrated in FIG. 4M as part of the method of manufacturing a pathology slide in a slide processing system, embodiments according to the present disclosure are not limited to the operations illustrated in FIG. 4M. For example, some embodiments may include additional operations or fewer operations without departing from the spirit and scope of embodiments according to the present disclosure.

As described above, the manufacturing process starts, and then, at operation 490, a gripper may grip a slide in a first orientation (e.g., any of the orientations described above with respect to FIGS. 3A-4L) using a first groove of a first gripper finger and a first groove of a second gripper finger. At operation 492, the gripper may place the slide on a slide in a first component of the slide processing system in the first orientation. At operation 494, the gripper may grip the slide in a second orientation using a second groove of the first gripper finger and a second groove of the second gripper finger. At operation 496, the slide may be placed in a second component of the slide processing system in the second orientation.

Therefore, according to some embodiments, the gripper may be utilized in conjunction with a slide carrier described above or the slide carrier cassette described below to transfer a slide from the slide carrier and/or the slide carrier cassette to another component or apparatus within the slide processing system 200.

Thus, as described above, embodiments according to the present disclosure may include a gripper capable of being utilized with multiple different carriers or slide manufacturing machines, each of which may have different requirements as far as orientation and gripping position when slides are inserted or removed, as part of a pathology slide manufacturing process or workflow. That is, automation of transferring slides between carriers and to positions within instruments requires interfacing with slides and carriers or machines in many different ways. Robotic arms and actuators may otherwise be limited in gripper tool attachments, making it difficult to perform different transfer tasks with a single gripper tool. Thus, embodiments according to the present disclosure may reduce tool changeover or multiple mechanical arm requirements.

Figure 5B:
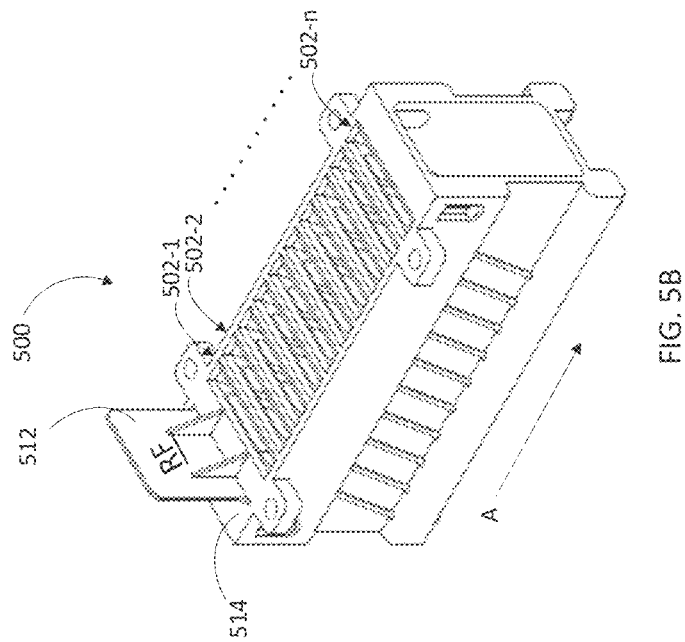
FIG. 5B is a rear perspective view of a slide carrier cassette, according to some embodiments.
Figure 5A:
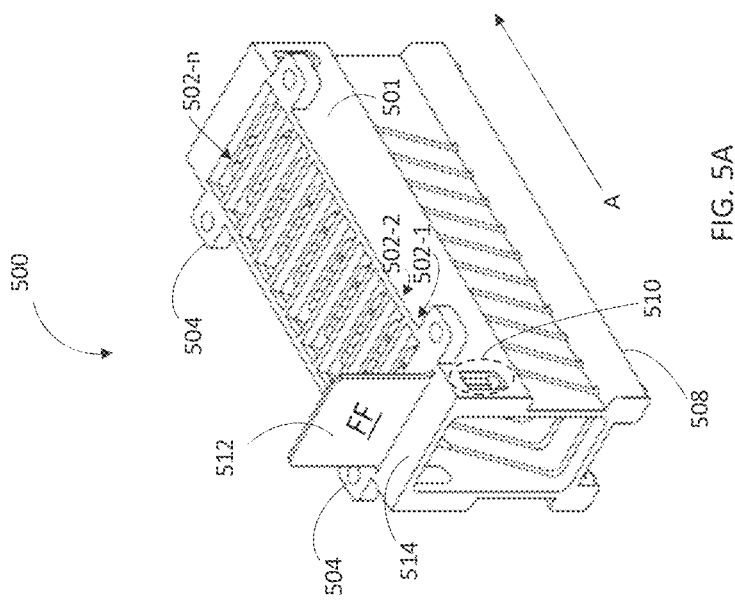
FIG. 5A is a front perspective view of a slide carrier cassette, according to some embodiments.

According to various other embodiments, a slide carrier cassette may be utilized to enable or facilitate processing of multiple slides in coordination and/or concurrently. The slide carrier cassette may also have features for enabling self-alignment of slides, similar to the features described above with respect to FIGS. 3A-3J, and as described below. FIG. 5A is a front perspective view of a slide carrier cassette according to some embodiments. FIG. 5B is a rear perspective view of a slide carrier cassette according to some embodiments. A slide carrier cassette 500 according to various embodiments has a main body or housing 501 having a plurality of slots 502-1 through 502-n formed therein, with openings of the slots 502-1 through 502-n being located at a top side of the main body 501, where "n" is a natural number greater than 1.

The slide carrier cassette 500 may be formed of any suitable material that is solid enough to support a glass slide 204, without substantial friction between the glass and the material of the slide carrier cassette 500. For example, in some embodiments, the slide carrier cassette 500 may be formed of a plastic or polymer material, but embodiments according to the present disclosure are not limited thereto.

The slide carrier cassette 500 may include any suitable number of slots 502-1 through 502-n. The slots 502-1 through 502-n may be arranged or aligned adjacent to each other along an alignment direction A, and each slot 502-1 through 502-n may be configured to receive or accommodate a single slide 204. The front and rear faces of each slide 204, when inside one of the slots 502-1 through 502-n, is oriented toward the front or rear surface of the other slides 204 in other slots. That is, according to some embodiments, planes of the front and rear faces of each slide 204 that is inserted into the slots 502-1 through 502-n is parallel the planes of the front and rear faces of each other slide 204. Additionally, the bottom of each slot 502-1 through 502-n may be aligned along the alignment direction A, such that each slot 502-1 through 502-n may be a same distance or height from the bottom edge 508 of the slide carrier cassette 500.

Each slot 502-1 through 502-n may be formed at a slanted angle (e.g., an angle greater than zero degrees and less than 90 degrees) relative to a plane that is perpendicular to the direction of gravity. Additionally, in some embodiments, each slot may be rotated (e.g., when viewed in a front view or a rear view) to either the left or right, such that a slide 204, when placed in one of the slots 502-1 through 502-n will register or self-align to a known reference location. The orientation and angle of the slots 502-1 through 502-n is illustrated and described in more detail below.

The slide carrier cassette 500 may further include one or more protrusions 504 (e.g., at a top surface of the slide carrier cassette 500). The slide carrier cassette 500 may have a generally rectangular shape in a plan view (e.g., when viewed from a direction above the slide carrier cassette 500 or a direction parallel to gravity), and the protrusions 504 may be located around the edges of the slide carrier cassette 500 (e.g., at or near each corner). The protrusions 504 may be utilized to provide a fixed or semi-permanent mounting mechanism to a slide carrier cassette queue or storage rack (shown in more detail below), and may include, for example, a hole for utilizing a screw or bolt (or other suitable mechanical fastening mechanism) to secure the slide carrier cassette 500 to the queue or storage rack.

In some embodiments, the slide carrier cassette 500 may include a spring (e.g., a living hinge spring) or clip 510. The spring 510 may provide a spring force in an external direction away from the body of the slide carrier cassette 500, such that when the slide carrier cassette 500 is inserted into a queue or storage rack (described in more detail below), the spring 510 may create a retention force to enable the slide carrier cassette 500 to be retained or held by queue or storage rack. The spring 510 may further enable alignment and proper positioning and registration of the slide carrier cassette 500 within the queue or storage rack.

The slide carrier cassette 500 may further include a tab handle 512 at a top surface (or top side) 514 of the slide carrier cassette 500. The tab handle 512 may extend above the top surface 514 of the slide carrier cassette 500, and may have a generally planar shape (although embodiments are not limited thereto). The tab handle 512 may operate as a handle or grasping structure for a human or mechanical gripper to grip onto the structure of the slide carrier cassette 500, for example, when maneuvering/transporting the slide carrier cassette 500, or when inserting the slide carrier cassette 500 into a queue or storage rack, or removing the slide carrier cassette 500 from a queue or storage rack.

When the table handle 512 has a generally planar shape, the tab handle 512 may have a front face FF and a rear face RF. The front face FF may face toward a front of the slide carrier cassette 500, and may have space or room to accommodate, for example, a label or unique identifying information for the slide carrier cassette 500. The rear face RF may face toward the slots 502-1 through 502-n and the rear (or back) side of the slide carrier cassette 500.

Figure 5D:
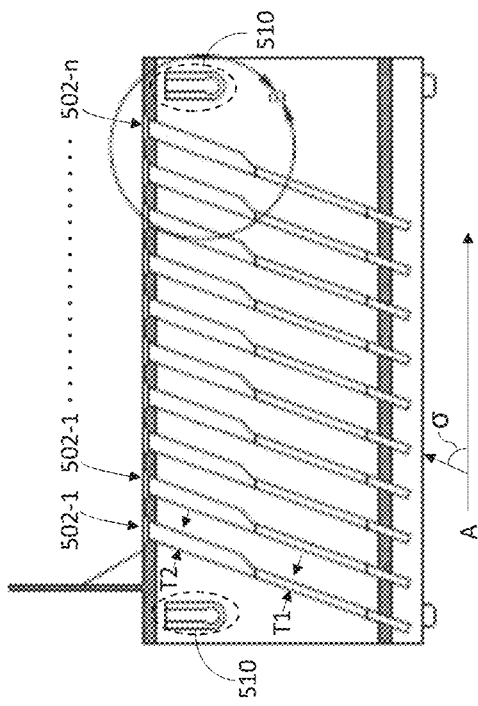
FIG. 5D is a cross-sectional view taken along the line A-A of FIG. 5C, according to some embodiments.
Figure 5E:
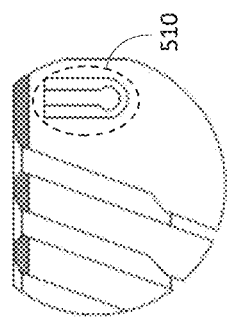
FIG. 5E is a close-up view of the section B of FIG. 5D, according to some embodiments.
Figure 5C:
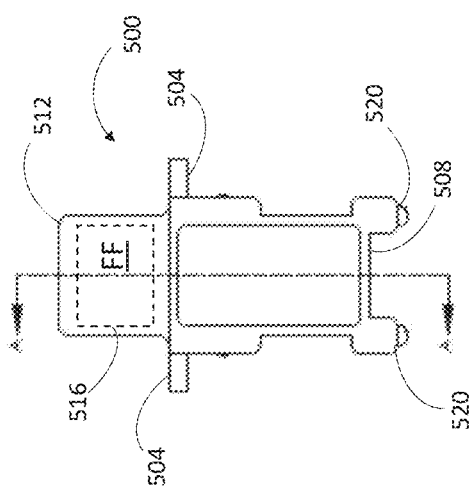
FIG. 5C is a front view of a slide carrier cassette, according to some embodiments.

FIG. 5C is a front view of a slide carrier cassette according to some embodiments.

As shown in FIG. 5O, and as described above, the front face FF of the tab handle 512 may include a label area 516, configured to accommodate a label or unique identifying information corresponding to the slide carrier cassette 500 and/or the slides held by the slide carrier cassette 500. For example, the label may include a barcode, QR code, or alphanumeric characters to provide identifying information regarding the nature and content of the slide carrier cassette 500.

At the bottom of the slide carrier cassette 500, below the bottom edge 508, the slide carrier cassette 500 may include a plurality of feet or posts 520, that may be utilized to provide stability when the slide carrier cassette 500 is resting on a planar surface or a substrate with the bottom edge 508 facing toward the substrate. Additionally, the posts 520 may be utilized to align the slide carrier cassette 500 into a fixture such as a queue or storage rack.

FIG. 5D is a cross-sectional view taken along the line A-A of FIG. 5C. FIG. 5E is a close-up view of the section B of FIG. 5D according to some embodiments. Referring to FIGS. 5D and 5E, and as described above, the slide carrier cassette 500 may include one or more springs or clips 510 located at one or more locations around the sides of the slide carrier cassette 500. In some embodiments, the spring 510 may be a living hinge spring, in which a narrow piece is connected to the body of the slide carrier cassette 500 at one end, and a ball or protrusion extends from the spring 510 at the opposite end. The protrusion of the spring 510 may fit or be accommodated within a corresponding hole or cavity on a storage rack or queue to enable a "snap-in" retention of the slide carrier cassette 500, and also to enable the slide carrier cassette 500 to be aligned in the proper position and orientation.

Additionally, as described above, the plurality of slots 502-1 through 502-n may be aligned with each other in the slide carrier cassette 500 along an alignment direction A such that, when slides are inserted into the slots 502-1 through 502-n, the faces of the slides face toward the adjacent slide, and the edges of the slides face toward the sides of the slide carrier cassette 500. Each slot 502-1 through 502-n may have a thickness T1 that corresponds to (e.g., is slightly greater than) the thickness of the slide, such that movement of a slide that is inserted into the slide carrier cassette 500 in the alignment direction (or opposite to the alignment direction) A may be minimized or relatively reduced. Additionally, each slot 502-1 through 502-n may have a larger thickness T2 at the opening to enable relatively easier insertion of a slide into the slot and to accommodate larger tolerance variations. Each slot 502-1 through 502-n may have a chamfer or tapering portion at the junction between the smaller thickness T1 and the larger thickness T2.

According to some embodiments, each slot may be angled at an angle σ relative to the alignment direction A, where σ is less than 90 degrees, and greater than 0 degrees. In embodiments in which σ is less than 90 degrees, it may be possible to more-easily read the label on each slide that is inserted into the slide carrier cassette 500.

According to some embodiments, each slot 502-1 through 502-n may be separated by a set distance, the size of which may be a function of the size of a gripper to be utilized to insert and retrieve slides from the slide carrier cassette 500.

Figure 5G:
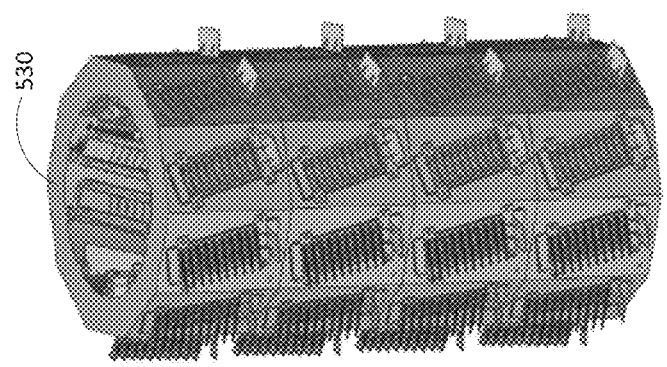
FIG. 5G shows an example of a queue or storage rack with a cylindrical shape, according to some embodiments.
Figure 5F:
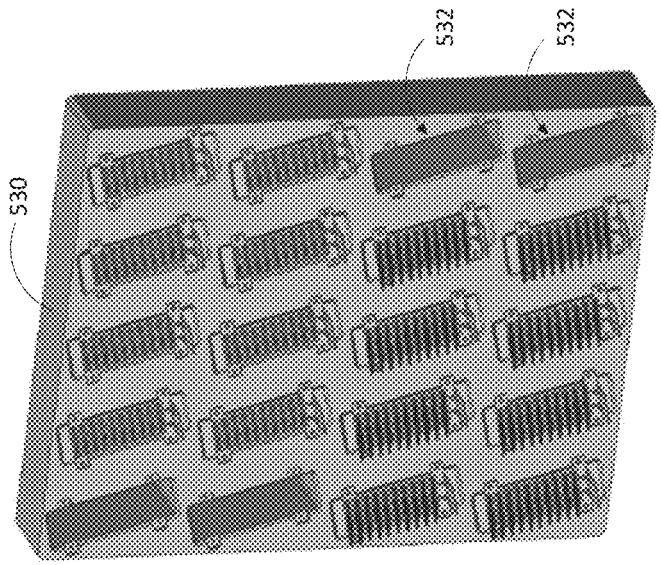
FIG. 5F is shows an example of a queue or storage rack for a plurality of slide carrier cassettes, according to some embodiments.

FIG. 5F is shows an example of a queue or storage rack for a plurality of slide carrier cassettes according to some embodiments. For example, according to some embodiments, a slide carrier queue 530 may include a plurality of cavities 532 arranged, for example, in a plurality of rows and columns. Although FIG. 5F illustrates a queue 530 having four rows and five columns of cavities 532, embodiments according to the present disclosure are not limited thereto, and a queue 530 according to the present disclosure may have any suitable number of rows and columns of cavities 532. Additionally, embodiments according to the present disclosure are not limited to the cavities 532 being arranged in columns and rows, various embodiments may include various different arrangements of cavities according to the design of the queue 530.

According to some embodiments, each cavity 532 may be configured to accommodate the shape of the slide carrier cassette 500. Thus, in some embodiments the cavity 532 may have interior edges that conform to or correspond to the shape of the slide carrier cassette 500.

According to some embodiments, the cavities 532 may be formed (e.g., machined) at an angle (e.g., rotated clockwise or counterclockwise to an angle greater than zero degrees, and less than 90 degrees) relative to a vertical line V (extending, for example, in parallel to the direction of gravity, or in the column direction), as illustrated in FIG. 5F. Because the slide carrier cassette 500 is mounted in the queue 530 at angle relative to the vertical line V, and because the slots 502-1 through 502-n (described and labeled, for example, in FIG. 5A) are also slanted at an angle relative to the bottom edge 508 of the slide carrier cassette 500, the slides may automatically (i.e., due to the force of gravity) bias to a known location. For example, various slides manufactured by different manufacturers or with slightly different formats, may have variations in width, thickness, length, and features (e.g., edges, corners, bevels, etc.) Such variations may be present in the same slide processing environment, due to receiving slides from different sources (e.g., different medical practices from all around the world).

This known bias location allows for slides to be re-gripped at a predetermined or known reference point or location. In other words, the effect of variations of slide sizes and locations, when inserted into the slots 502-1 through 502-n, may be reduced because the resting location of the slide will be at a known location.

The queue 530 may operate as either an intermediate or long term storage location for slides. For example, as slides are inserted into individual slots of individual slide carrier cassettes 500, other spaces may remain open, leaving space for other slides that are manufactured later in time to be included in the queue 530. Once all slides in a batch have been manufactured, the slides can be retrieved from the queue 530 and positioned in a folio or case for longer term storage or to be transported (e.g., for review by a pathologist). The location of slides in individual slots may be managed according to a slot allocation scheme that is organized and controlled by a computer, and also slides may be retrieved manually, for example, by using the labels on individual slides and slide carrier cassettes, as discussed above.

FIG. 5G shows an example of a queue or storage rack with a cylindrical shape according to some embodiments. As shown in FIG. 5G, according to some embodiments, instead of being arranged in a planar or linear matrix as shown in FIG. 5F, the queue 530 may be arranged in a circular or cylindrical configuration. In the cylindrical configuration shown in FIG. 5G, each row of cavities 532 may be formed in a circular shape around a central axis. In some embodiments, the queue 530 may be configured to be rotated around the central axis (e.g., using a rotary system on which the queue 530 may be mounted). The cylindrical configuration may reduce the amount of space needed to access the queue 530 by a mechanical arm, and may enable the queue 530 to be rotated to present individual slides or queues 530 to the mechanical arm, which may increase processing time.

Figure 5H:
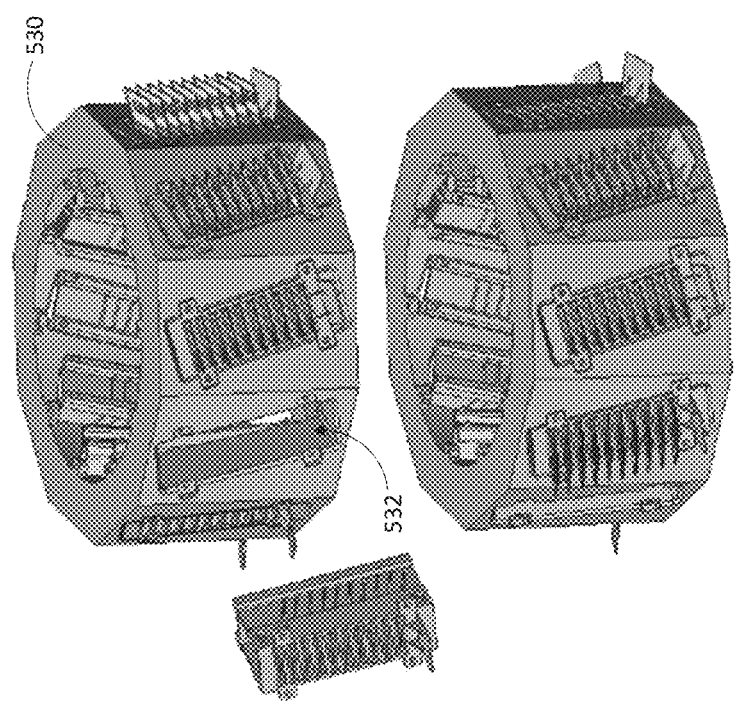
FIG. 5H shows an example of a queue or storage rack in a stacked configuration according to some embodiments.
Figure 51:
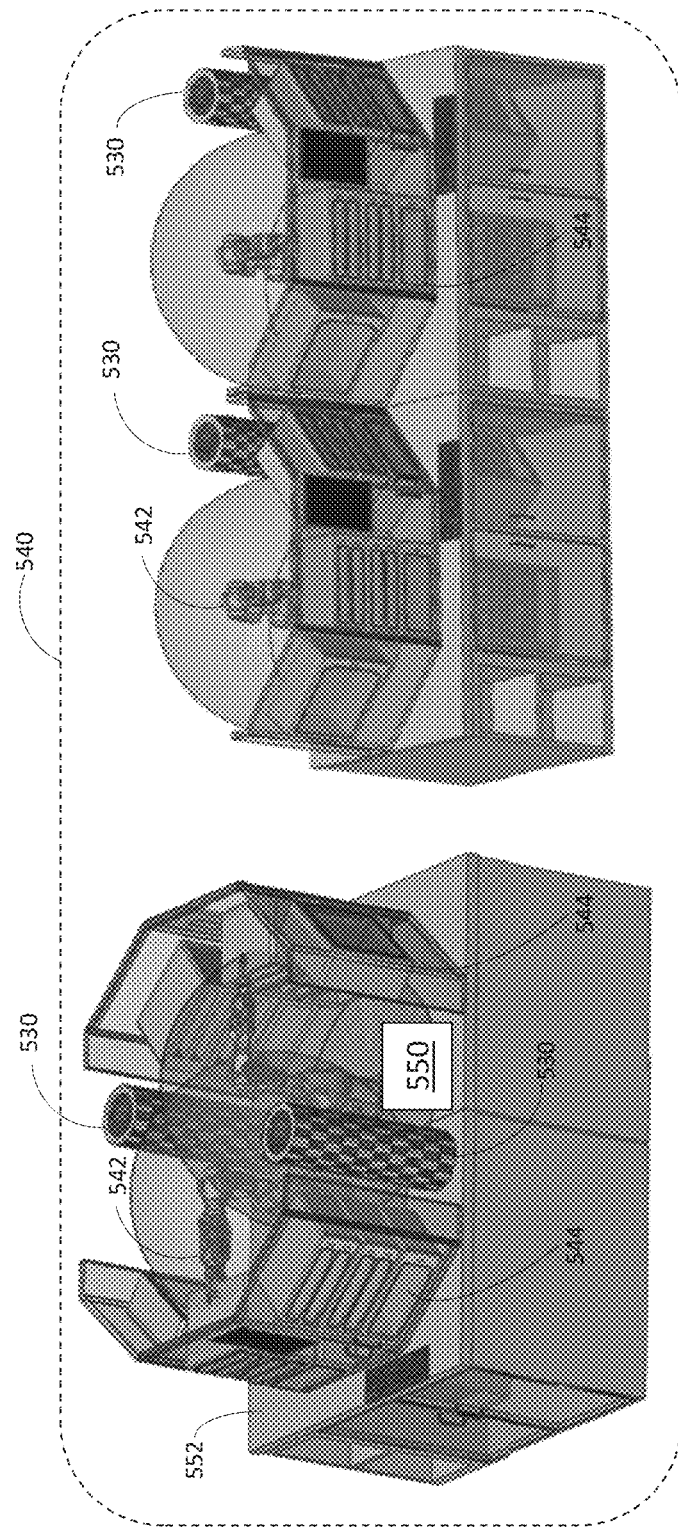

FIG. 5H shows an example of a queue or storage rack in a stacked configuration according to some embodiments. As shown in FIG. 5H, the queue 530 plurality of layers of cylindrical storage queues may be arranged in a stacked or stackable configuration according to some embodiments. Each layer or level of the queue may include a plurality of cavities 532 or openings that are arranged in a cylindrical or circular shape around a central axis, and which are configured to receive a slide carrier cassette 500.

Individual slide carrier cassettes 500 can be removed or inserted as desired, and individual layers of the queue 530 may also be removed or added as desired.

The ability to remove individual slide carrier cassettes 500 from the queue 530 as shown in FIGS. 5F-5H may enable manual intervention or interaction with groups of slides, as well as enable cleaning and replacement of cassettes for maintenance over time. Using slide carrier cassettes 500 in the stackable configuration of the queue 530, as shown in FIG. 5H may enable relatively simpler machined features, and may enable the slide carrier cassettes to be molded or 3-dimensional printed, which may enable the slide carrier cassettes to be manufactures at a relatively lower cost. Additionally, because the slide carrier cassettes 500 are removable from the queue 530, they may be utilized in other processes or instruments, and additionally the individual slides may be transported to different environments without removing them from the slide carrier cassette.

FIG. 5I shows an example of a slide processing system 540, according to some embodiments. The slide processing system 540 may be the same as, or similar to, the slide processing system described above with respect to FIGS. 2-5 (e.g., the slide processing system 200), and may be utilized as part of the pathology system 100 (e.g., at operations 108 and 110 shown in FIG. 1).

As shown in FIG. 5I, a plurality of queues 530 may be placed in proximity (e.g., within reach) of a plurality of corresponding mechanical arms 542. The mechanical arms 542 may be the same as, or similar to, the mechanical arms described above with respect to FIGS. 1-5 (e.g., the mechanical arm 202 shown in FIG. 2A). The mechanical arms 542 may each have a gripper (e.g., the gripper 400) configured to transfer slides between the queues 530 and individual slide processing stations 544. The slide processing stations 544 may be the same as, or similar to, the slide processing stations described above (e.g., the slide processing stations 210), and may be configured to perform one or more processing or manufacturing operations on slides during a pathology slide manufacturing process.

Additionally, one or more slide carriers 550 may be positioned on a work station surface or substrate 552, and may be accessible by (e.g., within reach of) the gripper of the mechanical arm 542. The slide carriers 550 may be the same as, or similar to, the slide carriers described above (e.g., the slide carriers 208, 214a, 214b, and 300).

Utilizing the cylindrical or rotary queue 530 in the slide processing system 540 may enable mechanical arms 542 to be located in a single location that is capable of reaching various components of the slide processing system 540, including the queues 530, and the various slide processing stations 544 and the slide carriers 550. Additionally, as shown in FIG. 5I, the slide processing system 540 may be modular and enable additional work stations 552, with additional mechanical arms 542, queues 530, and slide processing stations 544 to be added to or removed from the environment of the slide processing system 540 as the demands on the slide processing system 540 vary over time.

Figure 5J:
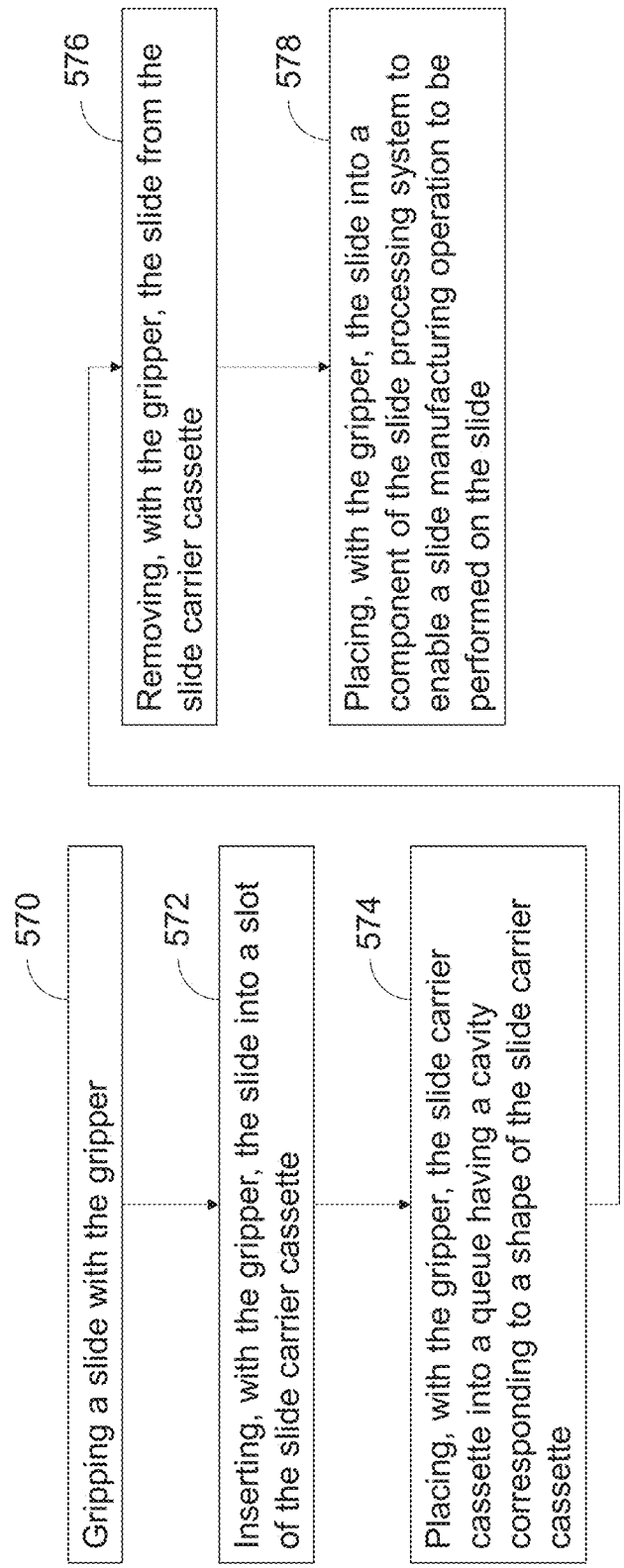
FIG. 5J is a flow diagram illustrating a method of manufacturing a slide in a slide processing system, according to some embodiments.

FIG. 5J is a flow diagram illustrating a method of manufacturing a slide in a slide processing system, according to some embodiments. Although various operations are illustrated in FIG. 5J as part of the method of manufacturing a pathology slide in a slide processing system, embodiments according to the present disclosure are not limited to the operations illustrated in FIG. 5J. For example, some embodiments may include additional operations or fewer operations without departing from the spirit and scope of embodiments according to the present disclosure.

As described above, the manufacturing process starts, and then, at operation 570, a gripper may grip a slide in a first orientation (e.g., any of the orientations described above with respect to FIGS. 3A-4M). At operation 572, the gripper may insert the slide into a slot of a slide carrier cassette (e.g., the slide carrier cassette 500). At operation 574, the gripper may place the slide carrier cassette into a queue having a cavity corresponding to a shape of the slide carrier cassette. At operation 576, the gripper may remove the slide from the slide carrier cassette. At operation 578, the gripper may place the slide into a component of the slide processing system to enable a slide manufacturing operation to be performed on the slide.

Thus, as shown above, embodiments according to the present disclosure enable a relatively improved and efficient pathology slide manufacturing process. For example, during a pathology slide manufacturing process, a mechanical arm with a gripper may be utilized to manipulate and transfer the slide between different operations and locations. Different slide processing components, stations, or carriers, however, may require that slides be picked up or inserted from various angles, locations, and orientations. Thus, embodiments according to the present disclosure may include a slide carrier may be provided that enables a mechanical arm gripper to pick up and set down a slide during intermediate operations of a slide manufacturing process. The slide carrier may enable the gripper to pick up the slide in various modes or configurations according to the processing operation to be performed next. For example, the slide may be placed onto the slide carrier using a grip with one orientation, and then the gripper may pick the slide up using a grip with a different orientation. Because of various angles of the surface of the slide carrier relative to gravity, the slide may tend to move or gravitate toward a known location on the slide carrier, thereby enabling the gripper and mechanical arm to pick up the slide again from a known location and orientation.

Additionally, embodiments according to the present disclosure may include a gripper or gripper fingers having various protrusions, channels, or grooves, to enable a pinching or compression action to be performed on the slide from different angles or orientations.

Finally, some embodiments may include a slide carrier cassette configured to hold a plurality of slides, and to register slides at a known location after being inserted into the slide carrier cassette. A plurality of slide carrier cassettes may be inserted into a queue to be accessed by a mechanical arm and gripper system. In some embodiments, the queue may have a cylindrical or rotary configuration, enabling individual slide carrier cassettes or individual slides to be moved to an accessible location of a mechanical arm during a pathology slide manufacturing process.

As described above with respect to FIG. 1, the pathology environment is generally labor and time intensive. Generally speaking, alternative systems have relatively little automation and involve numerous individuals and operations. Highly trained pathologists and histotechnicians/histotechnologists are responsible for executing a large number of repetitive, manual, skilled, and unskilled tasks. Each task, when performed by a human, adds costs to the process, and creates the potential for errors. Additionally, as the qualified labor force is shrinking in many countries, it may be desirable to automate aspects of the pathology environment/histology process in order enable workers to direct their attention toward more complex tasks and problems.

Thus, aspects of some embodiments may include an automated histology system (e.g., the slide processing system 200 illustrated and described, for example, with respect to FIG. 2A) capable of receiving pathology slides and tissue samples, and processing the slides or samples, for example, by way of one or more staining operations. According to some embodiments, as described in more detail below, the automated histology system may be capable of processing a large volume of pathology slides without human involvement.

According to some embodiments, an automated histology storage system and method may enable consolidating pathology slides into an efficient vertical storage solution, which may reduce the overall footprint of the storage of pathology slides. According to some embodiments, the automated histology system may be capable of electrically connecting to a database, memory system, or network that stores information regarding tissue samples and patients in order to efficiently and automatically assign slides to appropriate cases, folders, or trays without human involvement. Additionally, according to some embodiments, the automated histology system may be capable of storing slide locations in a database, memory system, or network-connected memory in order to prevent or reduce lost time due to humans manually searching for errant slides. Some embodiments may further be capable of sorting pathology slides into cases, folders, or trays using a combination of one or more robotic arms and grippers, thereby reducing or eliminating the need for human involvement.

Figure 6C:
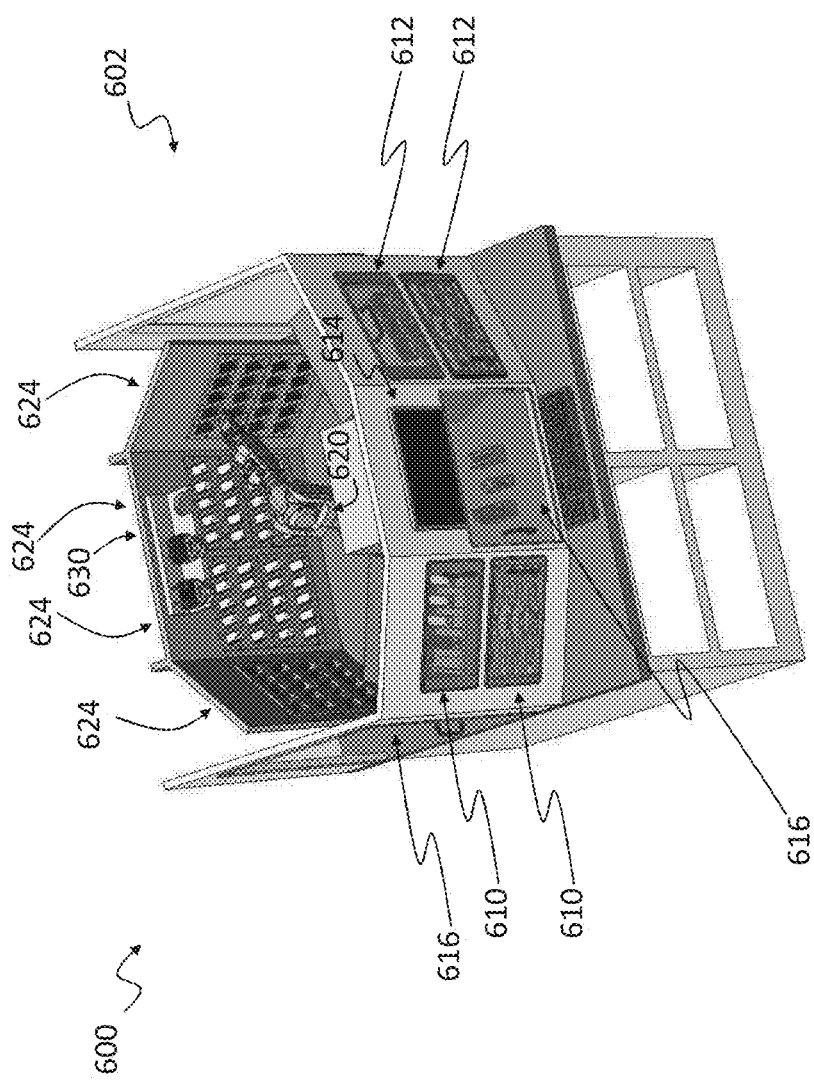
FIG. 6C shows further details of an example automated histology storage system, according to some embodiments.

FIGS. 6A-6D illustrate aspects of an example automated histology storage system and environment according to some embodiments. FIG. 6A illustrates a histology system and environment 600 according to some embodiments. According to some embodiments, the histology system and environment 600 may operate within, or as part of, a slide processing or manufacturing environment or system (e.g., the slide processing or manufacturing system 200) As illustrated in FIG. 6A, the histology system and environment 600 may include an automated histology storage system 602. As will be described in more detail below, the automated histology storage system 602 is configured to receive coverslipped slides at various stages of processing, and automatically organize and store the slides during the manufacture and processing of the slides within the histology system and environment 600.

The histology system and environment 600 may further include one or more processing stations or devices 604a-604c. The processing stations or devices 604a-604c are configured to receive slides with tissue samples or specimens (e.g., coverslipped slides), and perform one or more staining or reagent operations on the slides as part of the manufacturing process of the slides in preparation for further analysis by a pathologist as described above. Although three processing stations or devices 604a-604c are illustrated in FIG. 6A, a person having ordinary skill in the art would recognize the histology system and environment 600 is not limited to three processing stations or devices, and according to some embodiments, the histology system and environment 600 may include additional, or fewer, processing stations or devices without departing from the spirit and scope of embodiments according to the present disclosure.

A technician 606 may work within the histology system and environment 600 to initiate and monitor the processing operations of slides at the processing stations or devices 604a-604c, and to transfer slides between the processing stations or devices 604a-604c. The technician 606 may further transfer slides to the automated histology storage system 602 at various stages of the manufacturing process.

FIG. 6B shows further details of an example automated histology storage system 602 according to some embodiments. In particular, FIG. 6B illustrates an example front perspective view of the automated histology storage system 602 at a side that may be accessible to a technician (e.g., the technician 606). As will be described in more detail below, the automated histology storage system 602 operates as a mechanism to receive pathology slides and then, in an automated fashion, organize and store the slides, for example, between processing operations. Additionally, as will be described in more detail below, the automated histology storage system 602 may be capable of sorting stained slides, and assembling the slides into cases or folders for pathologist review, which is otherwise a labor and space intensive process that presents many opportunities for human error.

As will be described in more detail below, slides may be input into the automated histology storage system 602 by way of one or more racks or trays, which a user or technician may load into an open position in an input rack portal. In some instances, the slides may have a tissue sample or specimen, which may be stained, dried, and coverslipped prior to being inserted into the automated histology storage system 602. Embodiments according to the present disclosure are not limited thereto, however, and in some embodiments, the automated storage system 602 may be configured to receive slides at intermediate processing steps. Additionally, in some embodiments, one or more processing stations or devices (e.g., the processing stations or devices 604a-604c) may be enclosed or located within the automated histology storage system 602, such that one or more slide manufacturing processing operations may be executed by the automated histology storage system 602.

Individual slides may be labeled or marked with unique identifying information (e.g., in the form of a barcode or QR code). Once loaded into the automated histology storage system 602, the slides may be individually scanned, and then loaded into a temporary storage location, for example, a slide carrier cassette 500 described above, to await being assembled into a case or folder that will be transferred to a different environment (e.g., a high resolution digital scanner or camera, or a pathologist) for further review and processing.

When it is time to assemble a case or folder, a user or technician may initiate a folder creation process by providing a user input to the automated histology storage system 602. The automated histology storage system 602 may then retrieve the relevant slides from one or more queues of slide carrier cassettes, and automatically assemble the case or folder with the relevant slides. The assembled case or folder may then be automatically transferred to an output portal to be retrieved by a user or technician.

As shown in FIG. 6B, the automated histology storage system 602 may include a plurality of input portals 610 (shown and described in more detail below) to enable a user or technician to insert trays or racks of slides into the automated histology storage system 602. That is, the input portals 610 operate as an interface for exchanging slides between users or technicians and the automated histology storage system 602. According to some embodiments, the input portals 610 may be configured to receive slides stored, secured, or housed in temporary trays or racks as will be described in more detail below.

In some embodiments, each portal may have the same width and height dimensions, and utilize the same mechanical and electrical connection interfaces with the automated histology storage system 602. Accordingly, the input portals 610 may be configured to be modular components that can be interchanged (e.g., removed, replaced, etc.) according to the operational desires or requirements of the automated histology storage system 602. For example, depending on the operations to be performed and the use case of the automated histology storage system 602, it may be desirable to utilize a first type of portal (e.g., a tray portal, discussed in more detail below) for a period of time, and then remove the first type of portal so that a second type of portal (e.g., a rack portal, discussed in more detail below) can be inserted into the space or slot previously occupied by the first type of portal.

The automated histology storage system 602 may further include one or more output portals 612 to enable the automated histology storage system 602 to provide one or more trays or racks of slides to a user or technician. That is, the output portals 612 may operate as an interface for users or technicians to retrieve trays or racks of slides from the automated histology storage system 602.

The automated histology storage system 602 may further include a user interface. According to some embodiments, the user interface may include a graphical display device or display panel 614 for display images or a graphical user interface. In some embodiments, the display panel 614 may include a touch screen capability to enable users to provide touch input. The automated histology storage system 602 may further include other mechanisms for providing user input, such as a keyboard, mouse, and one or more buttons.

Using the user interface, a user or technician may provide an input to the automated histology storage system 602 to indicate that the user desires to deposit a slide, folder of slides, or rack of slides, into the automated histology storage system 602. For example, the user or technician may provide identifying information about the slides, and the storage mechanism (e.g., whether the slides are in a folder, a rack, etc.). The automated histology storage system 602, in some embodiments, may direct the user to a particular input portal 610 for depositing the slides. Once deposited into the input portal 610, as will be described below, the automated histology storage system 602 may proceed to organize, sort, and assemble the slides into one or more storage queues until the user requests that they be retrieved.

For example, when it is desirable to retrieve a slide, folder of slides, or rack of slides from the automated histology storage system 602, a user or technician may provide an input to a user interface of the automated histology storage system 602 to request certain slides be retrieved. As will be described in more detail below, in response to a retrieval request, the automated histology storage system 602 may identify the corresponding slides, retrieve them from a storage queue, and insert the slides into one of the output portals 612.

According to some embodiments, the user interface may enable the user, for example, to request slides to be retrieved and/or assembled into one or more trays or racks. The slides may be stored in a variety of locations or slide carrier cassettes within the automated histology storage system 602. For example, some of the requested slides may be stored in one location or slide carrier cassette and other slides may be stored in different locations or slide carrier cassettes. According to some embodiments, the user interface may enable the user to provide information about the characteristics of slides to be retrieved. For example, the user may be enabled to request all slides corresponding to a particular patient, all slides corresponding to a plurality of patients, or a subset of slides for a particular patient or group of patients that have certain characteristics (e.g., tissue sample from a certain part of the patient's body, or having certain stain or reagent characteristics, etc.). In response to the user input, the automated histology storage system 602 may proceed to retrieve relevant slides from the variety of storage locations within the automated histology storage system 602, and assemble them into one or more trays or racks, while not including or retrieving any slides that do not fit the criteria of the request from the user.

In some embodiments, the automated histology storage system 602 may further include one or more service doors 616. In some embodiments the service doors 616 may be transparent (or have transparent regions) to enable a user or technician to observe the inside of the automated histology storage system 602. Additionally, the service doors 616 may be configured to be opened in order to enable servicing or repair of components within the automated histology storage system 602.

FIG. 6C shows further details of an example automated histology storage system 602 according to some embodiments. In particular, FIG. 6C illustrates an example top front perspective view of the automated histology storage system 602 according to some embodiments. As illustrated in FIG. 6C, the automated histology storage system 602 may include a mechanical or robotic arm 620. The mechanical arm 620 may be the same as or similar to the mechanical arm 202 described above, and some repeated or duplicative description thereof may be omitted. The mechanical arm 620 may be configured to retrieve slides, slide folders, and slide racks from the input portals 610, manipulate individual slides while organizing and assembling them in storage racks or queues, and then retrieve slides, folders, or racks from storage locations and deposit them in output portals 612. The retrieval, manipulation, and storage operations of the mechanical arm 620 may be executed in response to user input (e.g., by way of the user input interface and the graphical display panel 614), individual data corresponding to each slide, and one or predetermined handling protocols.

The automated histology storage system 602 may further include one or more slide carrier queues 624. The slide carrier queues 624 illustrated in FIG. 6C may be the same as, or similar to, the slide carrier queues 530 illustrated and described above, and some repetitive or duplicated description thereof may be omitted. The slide carrier queues 624 may be capable of storing a plurality of racks (e.g., slide carrier cassettes 500, in FIGS. 5A-5E) of slides, as described above with respect to FIGS. 5F-5I. Additionally, although FIG. 6C illustrates the slide carrier queues 624 being configured in a planar configuration of rows and columns of cavities for storing slides, embodiments according to the present disclosure are not limited thereto, and in some embodiments, the slide carrier queues 624 may be configures in a cylindrical shape as shown in FIG. 5G, and the cylindrical shape may be configured to be rotated, and different levels or rows may be modular in that they can be added or removed as desired.

Additionally, according to some embodiments, the automated histology storage system 602 may include a tool change shelf or rack 630. The tool change rack 630 may be configured to hold or store a plurality of different tools or grippers for use by the mechanical arm 620. In some embodiments, the automated histology storage system 602 may be configured to automatically (e.g., without human involvement) change the tool or gripper being utilized by the mechanical arm 620 depending on the operation being performed. For example, a first type of gripper may be utilized for removing slide trays or racks (e.g., slide carrier cassettes) from an input portal 610, but a different tool or gripper may be utilized for manipulating individual slides within the automated histology storage system 602. Thus, in some embodiments, between operations with slides, the automated histology storage system 602 may send an electronic signal to the mechanical arm 620 to cause the mechanical arm 620 to remove a first tool or gripper and store it in the rack 630, and then attach a second tool or gripper to the mechanical arm 620 that is stored on the rack 630. As a person having ordinary skill in the art would recognize, embodiments according to the present disclosure are not limited to two grippers or tools, however, and any suitable number of tools or gripper configurations may be utilized according to the design and configuration of the automated histology storage system 602.

FIG. 6D shows an example top view of the automated histology storage system 602 according to some embodiments. As shown in FIG. 6D, the automated histology storage system 602 may include a working platform or workstation 640 to be utilized by the mechanical arm 620 to manipulate and process slides within the automated histology storage system 602. According to some embodiments, various components may be fixed to the workstation 640 (or other locations within the automated histology storage system 602. For example, according to some embodiments, the slide carrier 300 may be fixed to the workstation 640. Additionally, the workstation 640 may include various sensors, for example, cameras, barcode readers, etc. for identifying aspects of components or slides within the automated histology storage system 602. In some embodiments, the workstation 640 may further include one or more rack carriage nests and/or one or more tray carriage nests, which will be described in more detail below. The rack carriage nests and tray carriage nests may operate as intermediate platforms for enabling the mechanical arm 620 to work with and manipulate slides, trays of slides, and racks of slides. Further details of some components that may be mounted to the workstation 640 will be described below.

As shown in FIG. 6D, the automated histology storage system 602 may further include or be electrically connected to a control system 650. The control system 650 may include a processor 652 and a memory 654 coupled to (e.g., in electronic communication with) the processor 652. The memory 654 may store instructions that, when executed by the processor 652, cause the automated histology storage system 602 to execute various operations as described herein. For example, the instructions stored on the memory 654, when executed by the processor 652, may send one or more signals to the user interface to receive and display data or information to/from the user. Similarly, the instructions stored on the memory 654, when executed by the processor 652, may control or change the position or configuration of the mechanical arm 620 and/or the gripper of the mechanical arm 620 (for example, to pick up and manipulate slides, folders, trays, racks, etc.).

The control system 650 may further be in electronic communication (by way of a wired or wireless communication channel) with a network 660 (e.g., a local area network (LAN), private wide area network (WAN), and/or public wide area network such as, for example, the Internet). In some embodiments, the control system 650 may be configured to receive or transmit signals to external components or computer systems that are also connected to, or in electronic communication with, the control system 650 by way of the network 660.

In some embodiments, a database 662 may be connected to the control system 650, for example, through the network 660. The database 662 may store data corresponding to unique identifying information about individual slides, groups of slides, patient data, tissue sample data, processing operation data, and the like. In some embodiments, the database 662 may be remote with respect to the automated histology storage system 602, or the database 662 may be local or housed within the automated histology storage system 602.

Figure 7A:
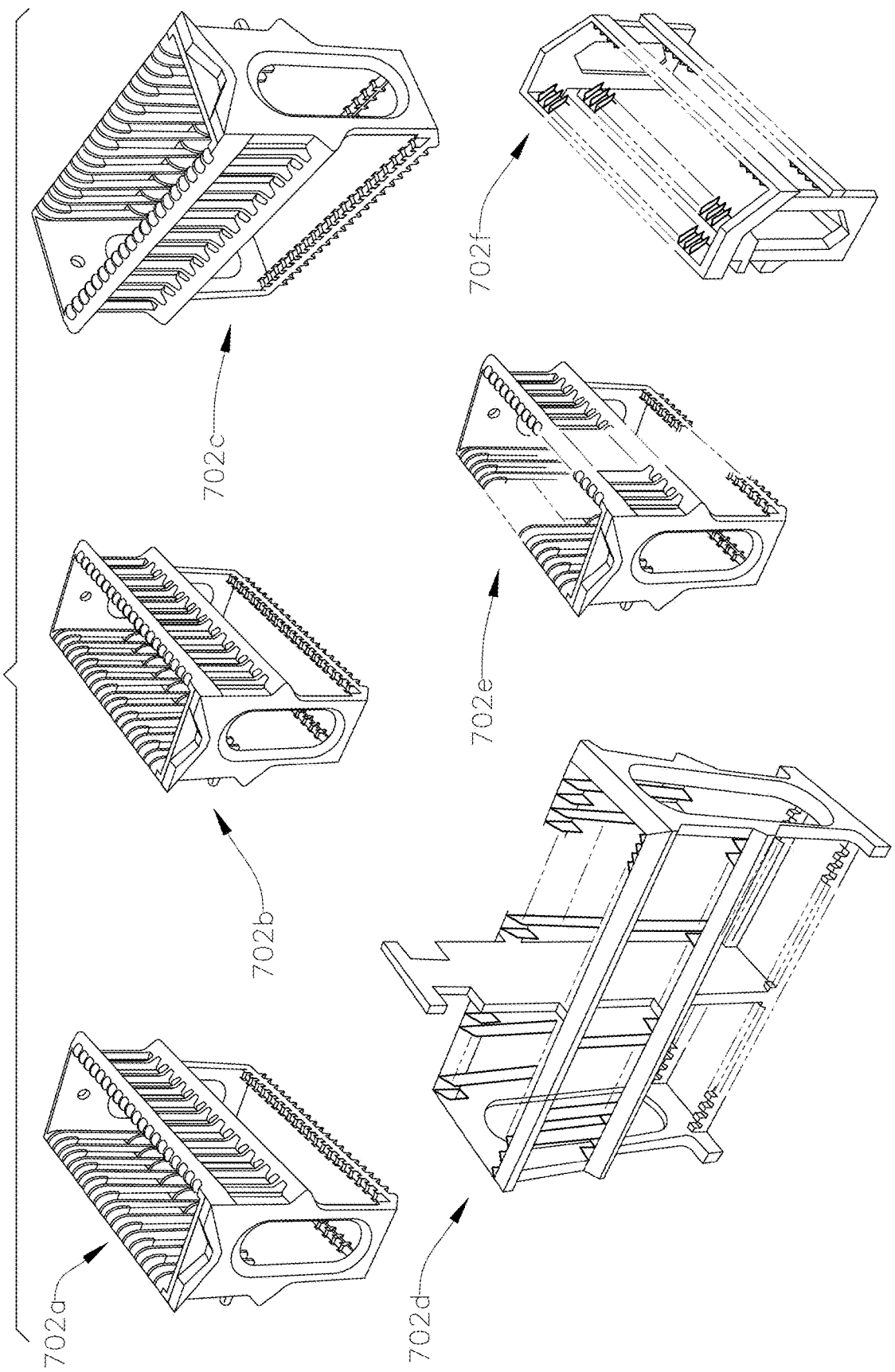
FIG. 7A shows an example of a variety of slide racks, according to some embodiments.
Figure 7B:
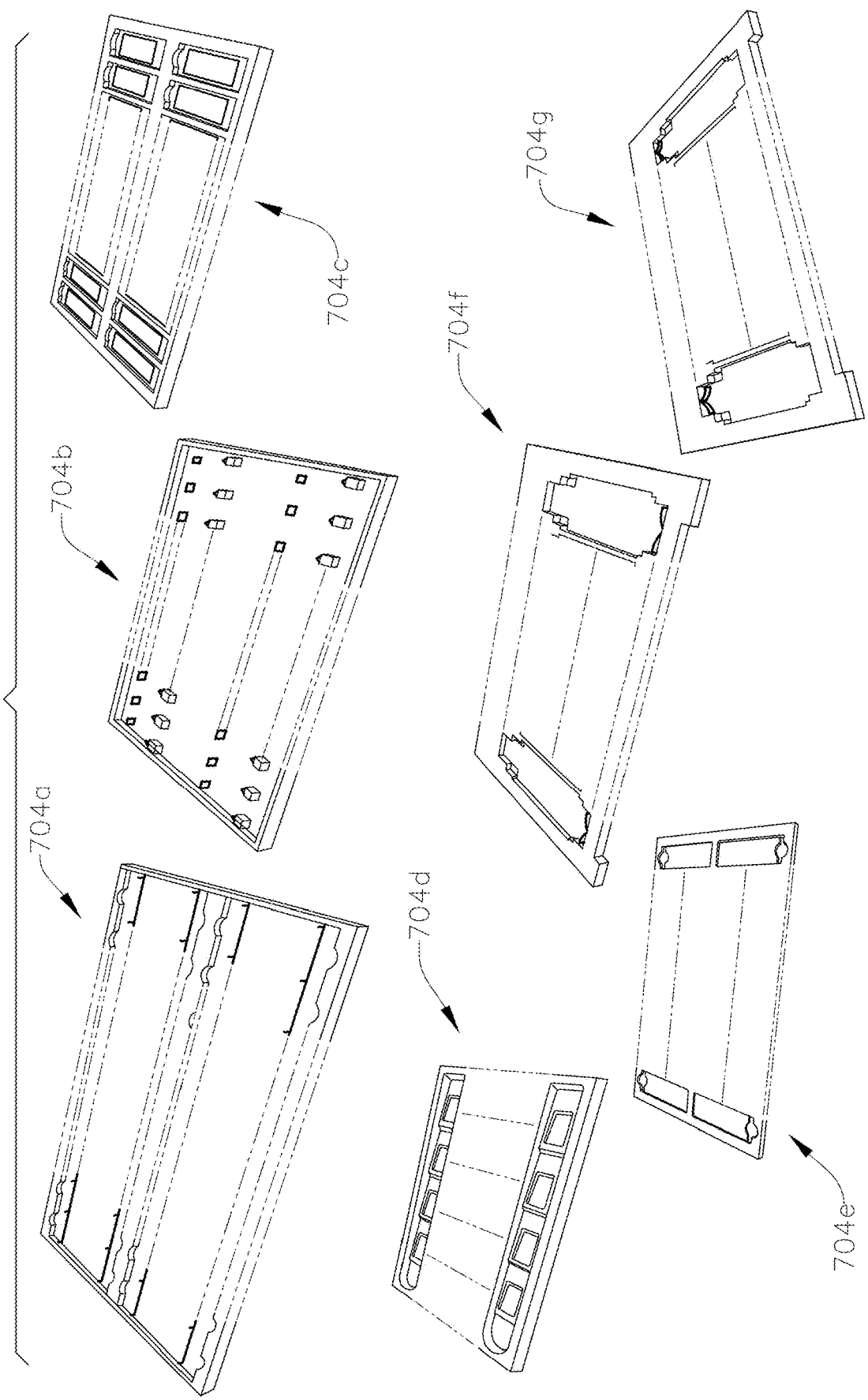
FIG. 7B shows an example of a variety of slide trays, according to some embodiments.
Figure 7D:
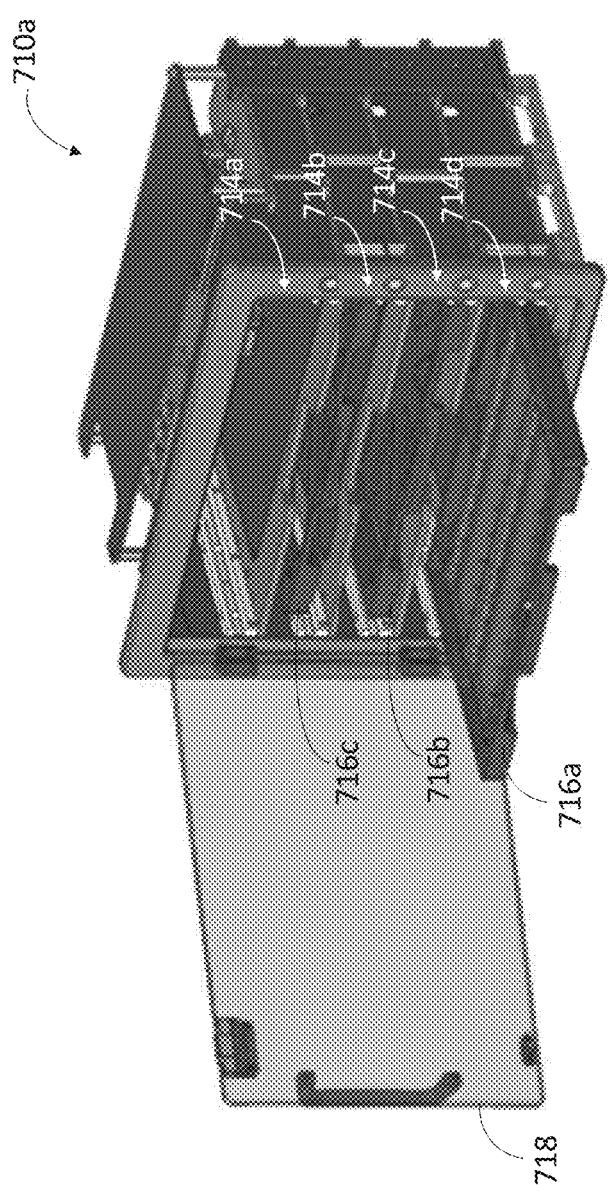
FIG. 7D shows further details of an example tray portal according to some embodiments.
Figure 7E:
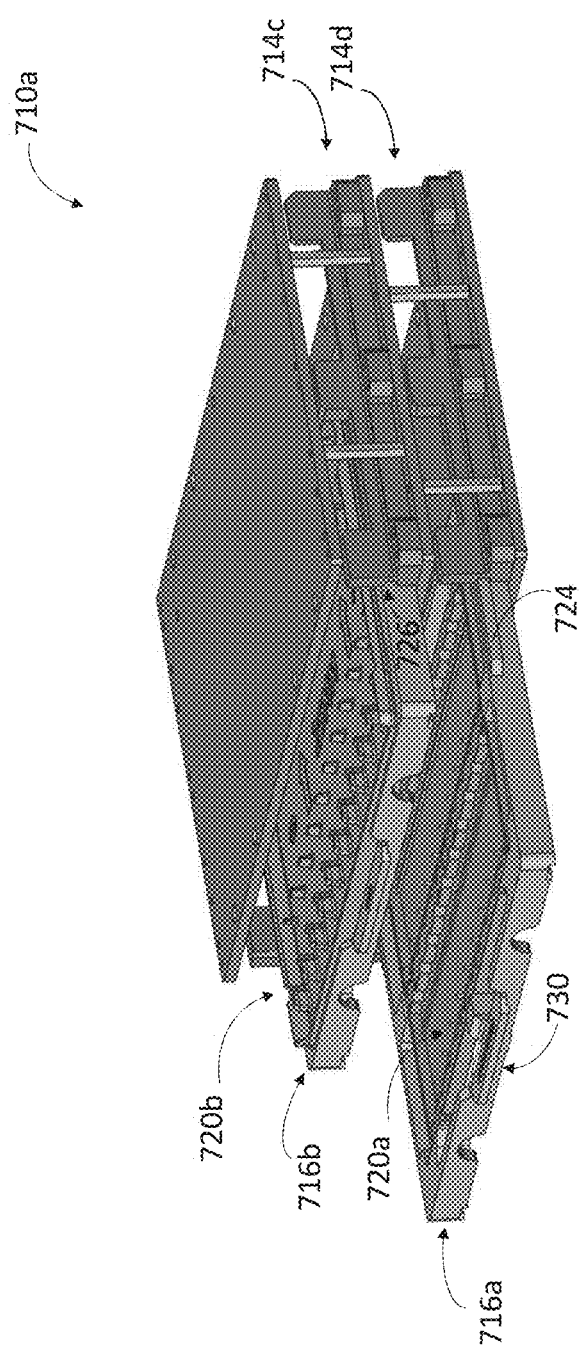
FIG. 7E shows further details of internal components of a tray portal according to some embodiments.
Figure 7F:
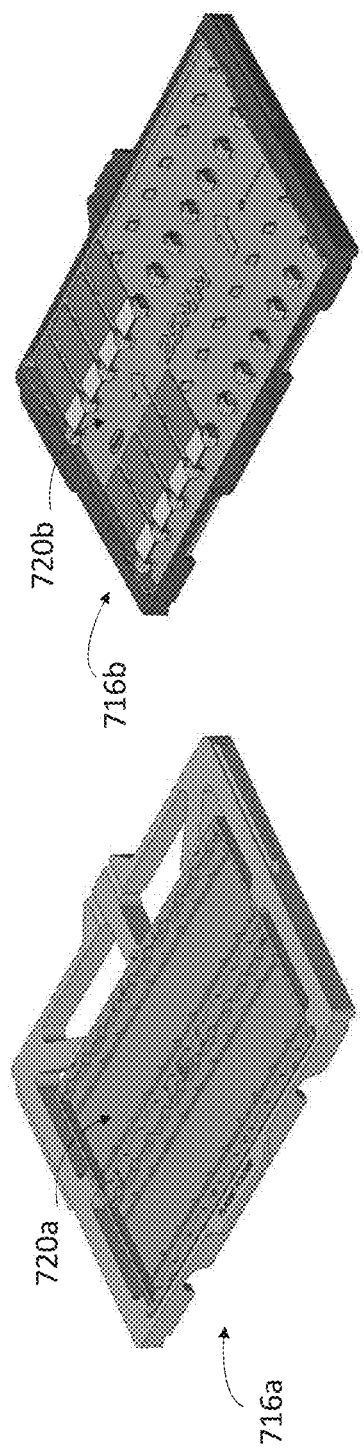
FIG. 7F shows further details of example tray carriages, according to some embodiments.
Figure 7G:
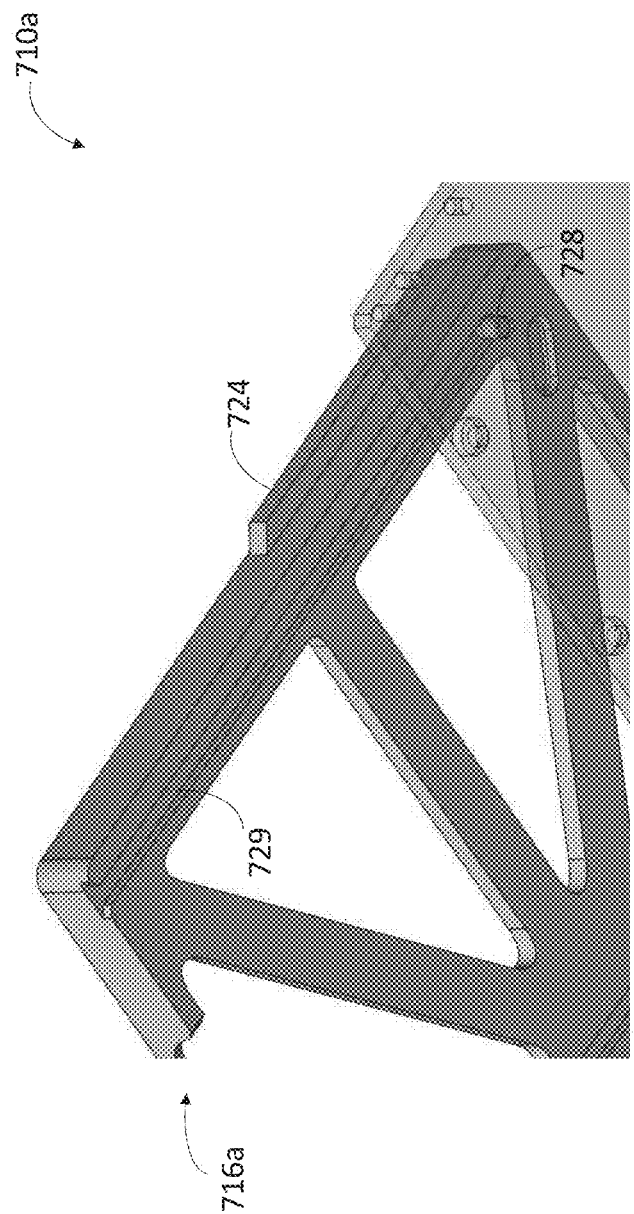
FIG. 7G shows a bottom view of a portion of a portal slot of a tray portal, according to some embodiments.
Figure 7H:
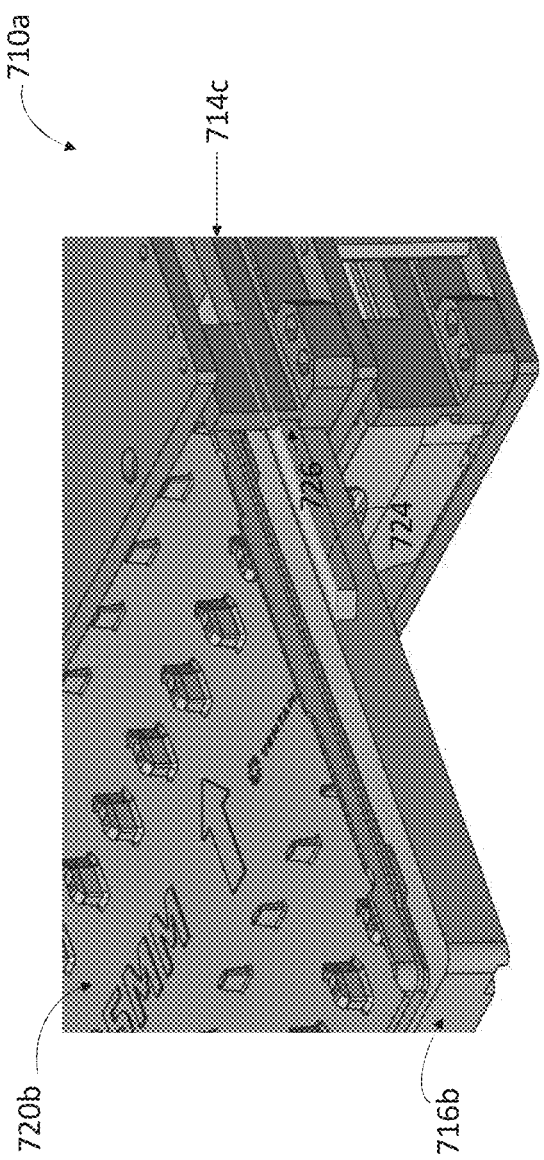
FIG. 7H shows a close-up view of a rail of an example tray carriage, according to some embodiments.
Figure 7N:
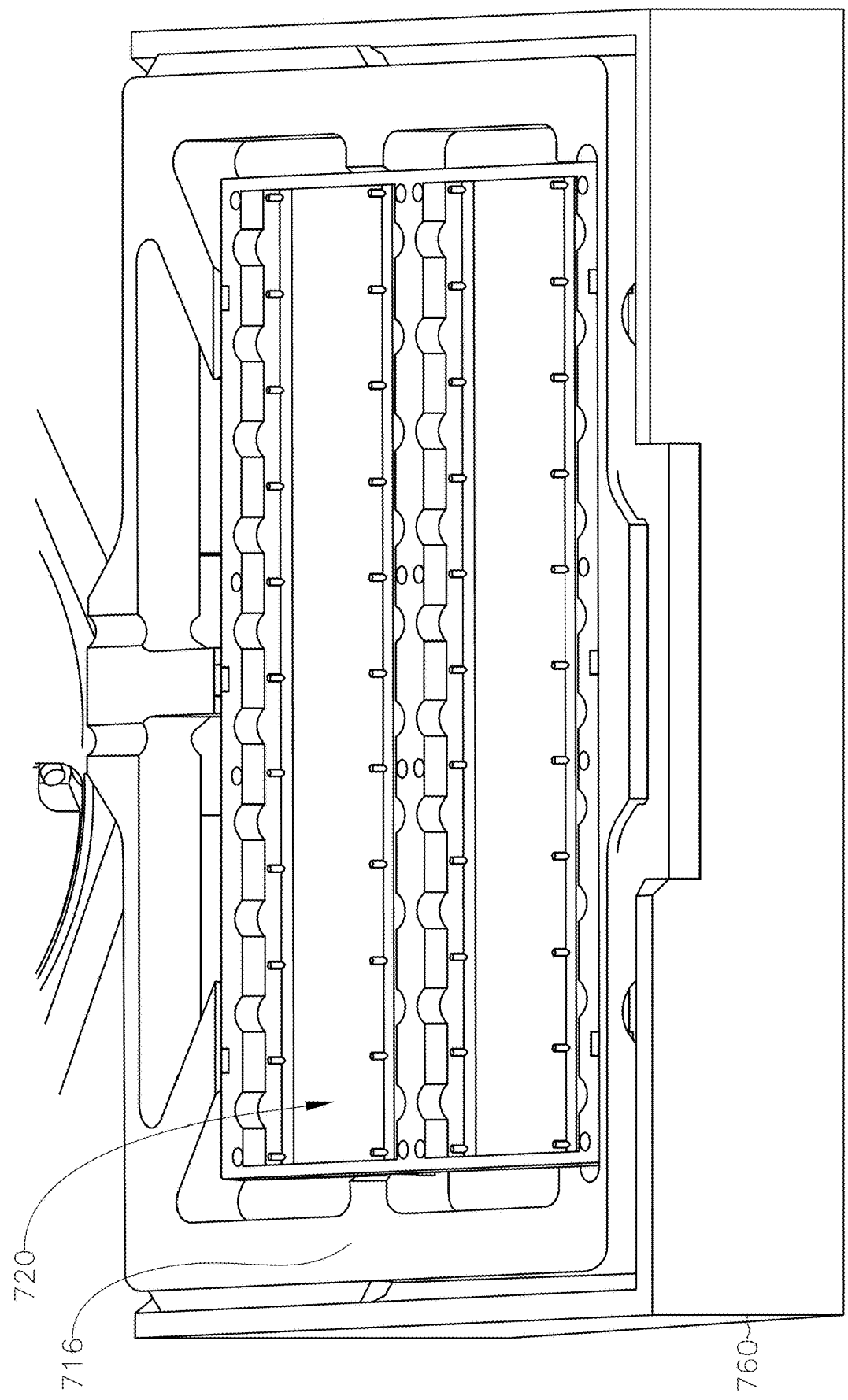
FIG. 7N shows an example tray carriage nest, according to some embodiments.
Figure 7P:
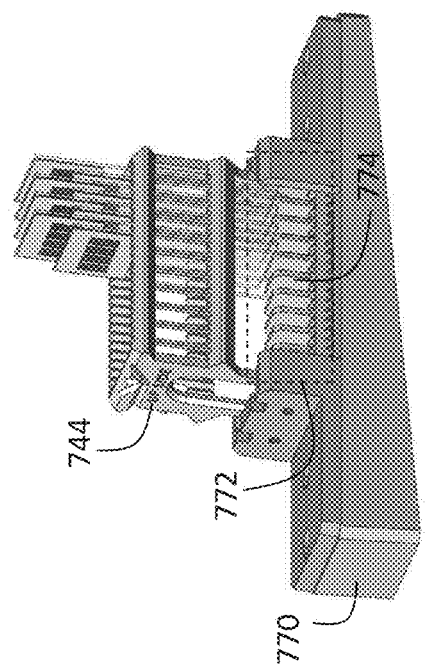
FIG. 7P shows a perspective view of the example rack nest, according to some embodiments.

FIGS. 7A-7P illustrate aspects of a portal system operating as part of the automated histology storage system 602 according to some embodiments. Within the histology system and environment 600, various slide storage devices may be utilized to rest or store slides during processing.

For example, for certain advanced staining processes or applications, slides may be stored in racks or baskets in which individual slides can be arranged in a vertical orientation and slid into individual slots sequentially in front or behind each other. The racks can then be utilized to transport slides to and from processing machines, or in some instances, may be inserted into processing machines to enable staining or reagent process operations to be performed.

FIG. 7A shows example racks 702a-702e, which are all generally capable of storing individual slides in a vertical orientation with the front and rear faces of the slides facing toward the adjacent slides in front or behind. As may be apparent, however, each of the slide racks 702a-702e has a similar shape or configuration, yet each individual design has a different form factor. For example, different vendors or processing operations may produce or utilize racks with slightly different shapes or form factors for a variety of reasons.

Thus, it may be difficult or time consuming for an automated histology storage system 602 utilizing a mechanical arm 620 to pick up and manipulate a variety of different racks with different form factors, since each different form factor may have different locations, handles, or protrusions at which a gripper of the mechanical arm 620 may grip the racks.

As a person having ordinary skill in the art would recognize, the example rack form factors illustrated in FIG. 7A is not intended to be limiting, and various other form factors may be utilized. Rather, the examples illustrated in FIG. 7A are merely intended to convey the concept that embodiments according to the present disclosure can accommodate a wide variety of a plurality of different rack form factors.

Similarly, in other staining processes or applications, slides may be stored in planar folders or trays, where individual slides may be arranged, for example, in rows or columns and the front and back faces are co-planar with each other. Like the racks described above, the trays of slides can be utilized to transport slides to and from processing machines.

FIG. 7B shows example slide trays or folders 704a-704g, which are all generally capable of storing individual slides in a planar orientation, for example, with slides arranged in rows and columns and in which front and back faces of slides are co-planar. As may be apparent, however, each of the trays 704a-704g has a similar shape or configuration, yet each individual design has a different form factor. For example, similar to the racks discussed above, different tray manufacturers may utilize different form factors for different applications for a variety of reasons.

Thus, as is the case with the varying shapes of racks, the varying shapes of the trays may make it difficult for an automated histology storage system 602 using a mechanical arm 620 to pick up and manipulate a variety of different trays that all have different form factors, since the locations for picking up and manipulating the trays with the gripper of the mechanical arm 620 may vary between different form factors.

As a person having ordinary skill in the art would recognize, the example tray form factors illustrated in FIG. 7B is not intended to be limiting, and various other form factors may be utilized. Rather, the examples illustrated in FIG. 7B are merely intended to convey the concept that embodiments according to the present disclosure can accommodate a wide variety of a plurality of different tray form factors.

Thus, as will be described below, embodiments according to the present disclosure provide mechanisms to enable the automated histology storage system 602 to receive, pick up, manipulate, and store slides from a wide variety of racks and trays that may have different form factors, without necessarily requiring the mechanical arm 620 to change gripping mechanisms for each varying form factor.

In the present disclosure and claims, the term "slide holder" may be utilized to refer collectively to either slide trays or slide racks. That is, a "slide holder" according to the present disclosure and claims refers to a component that is configured to physically hold slides in slide slots or cavities, either in a vertical orientation (as in the case of slide racks illustrated and described with respect to FIG. 7A) or a planar orientation (as in the case of slide trays or folders illustrated and described with respect to FIG. 7B).

FIG. 7C shows example input or output portals according to some embodiments. As described with respect to FIGS. 6A to 6D, the input and output portals 610 and 612 may operate as an interface mechanism to enable users or technicians to insert slides into the automated histology storage system 602. As shown in FIG. 7C, the automated histology storage system 602 may include a tray portal 710a, which may be the same as or similar to the input portal 610 and/or the output portal 612 described above with respect to FIGS. 6A to 6D. The tray portal 710a may be capable of receiving slide trays (e.g., which are the same as or similar to the trays 704a-704g described above).

Similarly, the automated histology storage system 602 may include a rack portal 710b, which may be the same as or similar to the input portal 610 and/or the output portal 612 described above with respect to FIGS. 6A to 6D. The rack portal 710b may be capable of receive slide racks (e.g., which are the same as or similar to the racks 702a-702f described above).

According to some embodiments, the tray portal 710a and the rack portal 710b may have the same or similar external dimensions. For example, the tray portal 710a and the rack portal 710b may have the same or similar height H, width W, and/or depth D. Additionally, according to some embodiments, the tray portal 710a and the rack portal 710b may have the same or similar mechanical mounting hardware for securing the portals to the automated histology storage system 602. Furthermore, according to some embodiments, the tray portal 710a and the rack portal 710b may have the same or similar electrical connection mechanisms for being electrically connected to the automated histology storage system 602.

Accordingly, the portals may operate as modular components of the automated histology storage system 602 to enable the portals to be swapped in or out of the automated histology storage system 602 according to the design, operation, or use case. For example, in some environments or use cases, it may be desirable to utilize only or primarily tray portals 710a. In other environment or use cases, it may be desirable to utilize only or primarily rack portals 710b. In some environments, it may be desirable to be able to change the configuration or number of different types of portals. Because the portals 710a and 710b may have the same or similar dimensions, it may be possible to configure or reconfigure the portals, and swap portals in and out, according to the design and operation of the automated histology storage system 602.

FIG. 7D shows further details of an example tray portal 710a according to some embodiments. As shown in FIG. 7D, the tray portal 710a includes four layers, tray levels, or portal slots although embodiments according to the present disclosure are not limited thereto. For example, in some embodiments, there may be additional layers or fewer layers without departing from the spirit and scope of embodiments according to the present disclosure. As shown in FIG. 7D, each level, or portal slot, may be configured to hold a tray carriage. Further details of the tray carriages will be described in more detail below, but each tray carriage may be configured to receive a tray of slides. Each tray carriage may have substantially the same external form factor such that the mechanical arm 620, and its gripping mechanism, can pick up and manipulate the tray carriage in substantially the same manner without requiring adjustment of gripping positions or gripper tools. As will be described in more detail below, each tray carriage may further have a cavity configured to receive a tray of slides. The interior form factor of the cavity may vary according to the design of the tray. Thus, while each of the different variety of trays may have a slightly different shape or form factor, the interior of the cavity of the tray carriages may conform to the shape of their corresponding tray. According to some embodiments, the interior cavity of the tray carriages may be keyed to their corresponding tray type, such that only they tray design corresponding to the individual tray carriage can fit properly in the interior cavity, and other tray designs cannot properly fit or be fully seated within the interior cavity of the wrong tray carriage.

By way of example, 7D illustrates a portal with three tray carriages 716a-716c in the bottom three layers or portal slots 714b-714d, and the top portal slot 714a is empty. The bottom tray carriage 716a includes a tray inside the internal cavity of the tray carriage 716a, while the other two tray carriages 716b and 716c are empty or vacant, meaning no trays are inside their respective interior cavities. As a person having ordinary skill in the art would recognize, the particular configuration illustrated in FIG. 7D is only for purposes of illustration, and depending on the usage and circumstances of the automated histology storage system 602, various portal slots and tray carriages may be occupied or vacant at various times.

As shown in FIG. 7D, the tray portal 710a may include a door 718 that can be opened to enable a user to place a tray into the portal 710a. In some embodiments, the user may first interact with the user interface (e.g., the display panel 614 shown in FIGS. 6A-6D) prior to inserting a tray into the portal 710a. For example, user interface may have a graphical interface for enabling the user to indicate that the user wishes to insert a tray into the automated histology storage system 602.

The automated histology storage system 602, in some embodiments, may be configured to sense whether or not any of the portals 710a, or portal slots or levels within one or more of the portals 710a, is currently vacant (e.g., does not currently have a tray inserted). For example, according to some embodiments, the automated histology storage system 602 may include one or more sensors (e.g., magnets, visual or non-visual wavelength light sensors, cameras, etc.), configured to detect whether or not a portal slot has a tray carriage, and whether or not a tray carriage is occupied by a tray.

In response to identifying an open portal or portal slot, the automated histology storage system 602 may identify whether or not a portal slot currently has a tray carriage inserted that is not occupied (i.e., is vacant) by a tray. If the portal slot is empty (i.e., does not have a tray or a tray carriage inserted), the automated histology storage system 602 may transmit one or more signals to the mechanical arm to retrieve an empty tray carriage and insert the empty tray carriage into the empty portal slot. Prior to inserting the empty tray carriage into the empty slot, however, the automated histology storage system 602 may prompt the user to identify the type of tray to be inserted into the portal 710a. For example, the user may select the type of tray from a menu, or the user may provide unique identifying information about the tray (e.g., in the form of a barcode scan, etc.), to enable the automated histology storage system 602 to identify which tray carriage to select that will correspond to the tray to be inserted. In other embodiments, the automated histology storage system 602 may automatically identify the type of tray inserted into the portal 710a. For example, each portal may include a barcode reader, camera, RFID reader, NFC scanner or other device that is able to retrieve unique identifying information about the tray, including the type and interior and exterior form factors of the tray.

Similarly, if the portal 710a has portal slots with vacant tray carriages, but the vacant tray carriages do not correspond to the tray that the user wishes to insert into the portal 710a, the automated histology storage system 602 may be configured to sense, by way of one or more sensors, data stored in memory, and/or user input, that one of the tray carriages needs to be replaced with a tray carriage that matches the tray that the user wishes to insert. Accordingly, the automated histology storage system 602 may transmit one or more signals to the mechanical arm 620 to cause the mechanical arm 620 to remove one or more of the vacant tray carriages from the portal 710a, retrieve a tray carriage with an inner cavity that corresponds to the tray that the user desires to insert into the portal 710a, and insert the corresponding tray carriage into a vacant slot in the portal 710a.

Once the vacant tray carriage is ready to be filled with a tray, according to some embodiments, the automated histology storage system 602 may provide or display a graphical alert to the user regarding the availability and/or location of the proper vacant tray carriage. For example, in some embodiments the automated histology storage system 602 may display a message on a graphical user interface displayed on the display panel 614 to direct the user to the appropriate portal and portal slot. In some embodiments, the automated histology storage system 602 may display a light or other indicator at a portal slot.

As shown in FIG. 7D, tray carriages are configured to be moved laterally in and out of the portal 710a. According to some embodiments, however, the user may be prevented from entirely removing the tray carriage from the portal slot, and rather the tray carriage may only slide out of the portal to a fixed or predetermined limit that provides sufficient clearance to enable the user to insert the tray into the interior cavity of the tray carriage without removing the tray carriage. The mechanism for preventing the tray carriage from being entirely removed will be described in further detail below, but in some embodiments, the tray carriage may have one or more rails that are configured to be seated within and to slide along one or more slots or grooves, and a protrusion or peg at the back of the tray carriage may catch on the groove or the body of the portal 710a to prevent the tray carriage from being pulled all the way out of the portal 710a. Additionally, or alternatively, the slots or grooves along which the tray carriage slides may not extend entirely to the front edge of the portal 710a, but rather may be recessed within the portal 710a by a predetermined distance in order to prevent the tray carriage from being pulled all the way out of the portal 710a.

FIG. 7E shows further details of internal components of a portal according to some embodiments. For example, FIG. 7E shows two layers or levels of portal slots of the tray portal 710a, with the exterior housing and structure, and two of the four layers illustrated in FIG. 7D, removed. As shown in FIG. 7E, each layer or portal slot may be configured to accommodate a single tray carriage 716. As described above, when inserted into the corresponding portal slot 714, the tray carriages 716a and 716b are configured to slide in and out of the portal slot 714 to enable a tray to be inserted into the tray carriage. FIG. 7E illustrates an example in which different trays 720a and 720b are inserted into the tray carriages 716a and 716b, respectively. As shown in FIG. 7E, the trays 720a and 720b are similar to each other, in that they are both configured to receive or hold individual slides in a plurality of columns and rows, in which the front and rear faces of the slides are generally co-planar with each other when stored in their respective trays. But, each of the trays 720a and 720b have a slightly different exterior form factor. Thus, the tray carriage 716a has an internal cavity configured to specifically accommodate the tray 720a. Similarly, the tray carriage 716b has an internal cavity configured to specifically accommodate the tray 720b. If the tray 720a is attempted to be inserted into the tray carriage 716b, it will not fit or will not be seated properly, or there may be undesirable movement or spacing around the edges of the tray 720a. Similarly, if the tray 720b is attempted to be inserted into the tray carriage 716a, it will not fit or will not be seated properly, or there may be undesirable movement or spacing around the edges of the tray 720b.

As shown in FIG. 7E, the tray carriages 716a and 716b, despite having different form factors in their respective interior cavities that correspond to specific tray designs, have the same or similar exterior form factor. Accordingly, the tray carriages 716a and 716b are capable of being positioned in any open portal slot. Each tray carriage 716a and 716b may include the same or similar exterior shapes or protrusions. For example, the tray carriages 716a and 716b may include one or more rails 724 for guiding the tray carriages 716a and 716b along slots or grooves 726 of the corresponding portal slot. Additionally, as described previously and further below, the tray carriages 716a and 716b, in some embodiments, may be configured to slide in and out of the tray portal 710a, but may be prevented from being entirely removed from the tray portal 710a from the front side (e.g., by way of a protrusion or slide mechanism that prevents the tray carriages 716a and 716b from being removed from the tray portal 710a.

FIG. 7F shows further details of the example tray carriages 716a and 716b. As described above, the tray carriages 716 operate as intermediate components or substrates for enabling a user to load and unload trays or folders of slides into the automated histology storage system 602. The external features (e.g., gripping locations, handles, rails, grooves, dimensions, etc.) may be the same or similar, but a cavity for holding trays may be vary according to the tray design corresponding to the tray carriage. The mechanical arm 620 of the automated histology storage system 602 may interact with the tray carriages 716, rather than the tray itself. Because the exterior form factor is the same, the mechanical arm 620 of the automated histology storage system 602 may be capable of interacting with the different tray carriages 716 the same way, without having to change gripping tools or mechanisms.

FIG. 7G shows a bottom view of a portion of a portal slot of the portal 710a according to some embodiments, when a tray carriage 716a is in an extended or pulled-out position. As shown in FIG. 7G, a protrusion or peg 728 may protrude or extend from a bottom surface or substrate of the portal slot. The protrusion 728 may be configured to fit within a groove or slot 729 on the bottom side of the tray carriage 716a. According to some embodiments, the groove 729 may extend all the way to the front of side of the tray carriage 716a, such that the tray carriage 716a can be removed from the portal 710a from the back side of the portal 710a. But, the slot 729 may not extend entirely to the back side of the tray carriage 716a. Thus, as the tray carriage 716a is moved in and out of the portal slot, the tray carriage 716a may not be removed from the portal 710a from the front side. That is, the protrusion may prevent the tray carriage 716a from being pulled out past a predetermined point.

FIG. 7H shows a close-up view of the rail 724 of an example tray carriage 716b according to some embodiments. As shown in FIG. 7H, the rail 724 of the tray carriage 716b may be configured to slide within the groove 726 to guide the tray carriage 716b in and out of the portal slot 714c. Additionally, the mechanical coupling of the rail 724 and the groove 726 operates to prevent a user from moving the tray carriage 716b vertically.

FIG. 7I shows a close-up view of a portion of the internal structure of a portal slot when a carrier tray is in an extended or pulled-out position. FIG. 7J shows a close-up view of the portion of the internal structure of the portal slot when the carrier tray is in a retracted or pushed-in position. As shown in FIG. 7I, the groove 726 guides the rail 724 of the tray carriage 716b to move in and out within the tray portal 710a. As shown in FIG. 7I, the rear of the groove 726 may be cut away to form a cutout portion 730, such that the groove 726 is located at the front portion of the tray portal 710a and not the rear portion. Thus, as shown in FIG. 7J, when the tray carriage 716b is in the pushed-in or retracted position, the rail 724 is no longer engaged with the groove 726. Thus, from the back or rear side (i.e., internal with respect to the automated histology storage system 602) of the portal 710a, the tray carriage 716b may be lifted and removed from the portal 710a by the mechanical arm 620 and pulled into the interior of the automated histology storage system 602.

FIG. 7K illustrates further details of internal components of a rack portal according to some embodiments. For example, FIG. 7K shows four rack slots 740a-740d of the rack portal 710b, with the exterior housing and structure removed. Although four rack slots are illustrated in FIG. 7K, embodiments according to the present disclosure are not limited thereto, and according to some embodiments, there may be fewer rack slots or additional rack slots without departing from the spirit and scope of embodiments according to the present disclosure. Additionally, as discussed above, the rack portal 710b and the tray portal 710a may have the same or similar exterior dimensions, such that the number of rack slots in the rack portal 710b may be a function of the shared width of the rack portal 710b and the tray portal 710a, and may further be a function of the width of the largest or widest tray that the tray portal 710a is designed to accommodate.

As shown in FIG. 7K, each rack slot 740a-740d may be configured to accommodate a single rack carriage 742. As described above, when inserted into the corresponding portal slot 740, the tray carriages 742 are configured to slide in and out of the portal slot 740 to enable a rack to be inserted into the rack carriage. FIG. 7K illustrates an example in which racks 744a-744d are inserted into rack carriages 742a-742d, respectively. The racks 744a-744d may correspond to one of the racks 702a-702f illustrated above.

As shown in FIG. 7K, each of the racks 744a-744d are the same as each other. But, as described above with respect to FIG. 7A, a variety of different racks, having a variety of different form factors, may be utilized as part of the histology system and environment 600. Thus, like the tray carriages 716, the rack carriages 742a-742d may each have the same exterior form factor. But, the form factor of the internal cavity, configured to receive the racks 744, may be vary according to the design and form factor of a corresponding rack 742. For example, different racks 702a-702f each have different form factors. A corresponding rack carriage 740 may be designed for each of the racks 702a-702f, such that an individual rack can be properly seated in its corresponding rack carriage. But, each rack carriage 740 is keyed to the shape of its corresponding rack design, and thus racks that do not correspond to a rack carriage either cannot fit inside the wrong rack carriage or cannot be seated properly (e.g., fully seated, without lateral or vertical movement, etc.).

FIG. 7L shows further details of example rack carriages 742 according to some embodiments. As described above, the rack carriages 742 operate as intermediate components or substrates for enabling a user to load and unload racks of slides into the automated histology storage system 602. The external features (e.g., gripping locations, handles, rails, grooves, dimensions, etc.) may be the same or similar, but a cavity for holding racks may be vary according to the rack design or form factor corresponding to the rack carriage. The mechanical arm 620 of the automated histology storage system 602 may interact with the rack carriages 742, rather than the rack itself. Because the exterior form factor is the same, the mechanical arm 620 of the automated histology storage system 602 may be capable of interacting with the different rack carriages 742 the same way, without having to change gripping tools or mechanisms.

FIG. 7M shows an example rack carriage nest 750 according to some embodiments. According to some embodiments, the rack carriage nest 750 may be located within the automated histology storage system 602. For example, the rack carriage nest 750 may be mechanically fixed or secured to a surface of the workstation 640. The rack carriage 750 may operate as a location and platform to enable the mechanical arm 620 to pick up slides from the rack 744 for further processing (e.g., placing slides in a slide carrier cassette 500 for storage in a slide carrier queue 530, or placing slides into the rack 744). According to some embodiments, the rack carriage nest 750 may have a surface on which a rack carriage 742 (having a rack 744 inserted therein) may be placed by the mechanical arm 620. Like the slide carrier 300 illustrated, for example, in FIG. 3A, the surface of the rack carriage nest 750 may be inclined relative to an x-axis direction and a y-axis direction, similar to or the same as the slide platform 308 of the slide carrier 300 shown, for example, in FIG. 3A. Thus, some detailed description of the rack carriage nest 750 may be omitted for brevity. Because the surface of the rack carriage nest 750 is inclined with respect to the x-axis and y-axis, the rack carriage 742, when placed on the rack carriage nest 750, may gravitate to a known, fixed position and orientation, enabling the gripper of the mechanical arm 620 to pick up individual slides or the rack carriage 742 relatively easily. That is, like the slide carrier 300, the rack carriage nest 750 may bias edges of the rack carriage 742 toward a known location (e.g., the bottom right or left corner or edge) of the rack carriage 750.

FIG. 7N shows an example tray carriage nest 760 according to some embodiments. According to some embodiments, the tray carrier nest 760 may be located within the automated histology storage system 602. For example, the tray carrier nest 760 may be mechanically fixed or secured to a surface of the workstation 640. The tray carrier nest may operate as a location and platform to enable the mechanical arm 620 to pick up slides from the tray 720 for further processing (e.g., placing slides in a slide carrier cassette 500 for storage in a slide carrier queue 530, or placing slides into the tray 720). According to some embodiments, the tray carrier nest 760 may have a surface on which a tray carriage 716 (having a tray 720 inserted therein) may be placed by the mechanical arm 620. In some embodiments, the top surface of the tray carriage nest 760 may be inclined relative to an x-axis and/or a y-axis to cause the tray carriage 716 to gravitate to a known, fixed position and orientation. Thus, the mechanical arm 620 may be capable of picking up individual slides or the tray carriage 716 relatively easily.

Figure 7O:
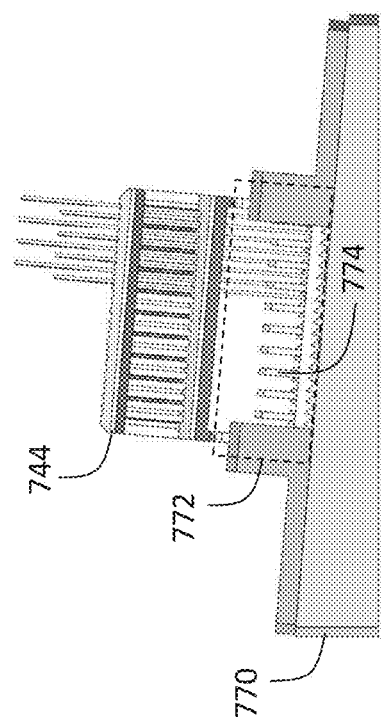
FIG. 7O shows a side view of an example rack nest, according to some embodiments.

FIGS. 7O and 7P illustrate aspects of a rack nest 770 according to some embodiments. Certain types of staining and reagent machines may require the use of racks having certain form factors, as described previously. In some instances, the spacing between individual slides may be relatively tight. That is, in order to fit the desired number of slides into the rack while still allowing the rack to fit within the space parameters of the staining machine, each slide may be positioned relatively close to the slides in front and behind. Because of the tight spacing between slides, it may be difficult for the mechanical arm 620 to manipulate the gripper in a way that allows the gripper to fit into the tight spacing when trying to pick up individual slides, without bumping into adjacent slides.

Thus, according to some embodiments, a rack nest 770 may be utilized to passively lift certain slides (e.g., every other slide) up to provide sufficient spacing to enable the mechanical arm 620 to grip the slides without contacting or damaging adjacent slides. FIG. 7O shows a side view of an example rack nest 770 according to some embodiments. FIG. 7P shows a perspective view of the example rack nest 770 according to some embodiments. For example, according to some embodiments, each of the protrusions 774 has a height of approximately 1 inch.

According to some embodiments, the mechanical arm 620 may place the rack 744 directly on the rack nest 770, in a nesting region 772. Within the nesting region 772, the rack nest 770 may include one or more protrusions 774. According to some embodiments, the protrusions 774 may be positioned at locations corresponding to every other slide or slide location within the rack 744. According to some embodiments, each protrusion may have a width that is less than a distance between the front face and rear faces of adjacent slides. Thus, when the rack 744 is placed into the nesting region 772, slides that correspond to or align with protrusions 774 will be lifted or raised by the protrusions 774 above the slides adjacent to them. Additionally, each protrusion may have a height that is sufficient to enable the gripper of the mechanical arm 620 to grip the slide that is raised by the protrusion 774 without the gripper contacting or damaging the adjacent slides that are not raised. Furthermore, according to some embodiments, each protrusion may have a height that is sufficient to enable unique identifying information (e.g., barcodes) of the raised slides to be exposed above the slides that are not raised.

According to some embodiments, the mechanical arm 620 may lift the rack 744 to rotate the rack 744 by 180 degrees before re-inserting the rack into the nesting region 772 to raise the other slides. For example, in a first position, the protrusions 774 may cause a first group of slides (e.g., the even-numbered slides) to be raised above a second group of slides. In a second position, in which the rack 744 is rotated 180 degrees relative to the first position, the protrusions 774 may cause a second group of slides (e.g., the odd-numbered slides) to be raised above the first group of slides. Additionally, according to some embodiments, rather than having fixed or stationary protrusions 774, the protrusions may be capable of being dynamically raised or lowered (e.g., by use of actuators) thereby enabling the automated histology storage system 602 to dynamically raise or lower specific slides according to the operation of the mechanical arm 620. Thus, the rack nest 770 may ease dimensional constraints of the gripper of the mechanical arm 620 and improve robustness and ease of picking up and manipulating slides.

FIGS. 8A-8E illustrate an example slide position detection system according to some embodiments. As described above, for example, with respect to FIGS. 7O and 7P, slides in a rack 744 may be very close to each other, and the tight spacing between adjacent slides may make it difficult for the mechanical arm 620, and the gripper of the mechanical arm 620, to pick up individual slides. Additionally, in many instances, an individual rack 744 may not be completely filled with slides. Thus, for each rack, the mechanical arm 620 may have to spend a certain amount of time identifying whether or not a slide is present at each location in the rack 744. Over the course of a day, where a large volume of slides may be processed through the automated histology storage system 602, the amount of time that the mechanical arm 620 devotes to check whether or not a slide is present in various positions within the numerous racks it processes may be substantial. If the mechanical arm 620 mis-identifies a position within the rack as being empty when in fact a slide is present, it may cause a threat to the slide and the automated histology storage system 602, in that the slide may break, which may cause debris within the automated histology storage system 602 that could damage other components or contaminate the environment and other slides.

Thus, according to some embodiments, the automated histology storage system 602 may include a slide position detection sensor 800 configured to enable the automated histology storage system 602 to identify whether or not a slide is present at various locations in a given rack 744. According to some embodiments, the slide position detection sensor 800 may include a depth camera (e.g., a stereoscopic depth camera) including, for example, two or more image sensors 802.

According to some embodiments, the slide position detection sensor 800 may be placed in front of the rack 744 and/or a rack nest 750/770 at a predetermined distance D from the rack 744. Although the rack nest 770 is illustrated in FIG. 8A, embodiments are not limited thereto, and according to some embodiments, the rack nest 750 (e.g., a rack nest without the protrusions 774) may be utilized. For convenience of description, the rack nest 770 may be referenced in connection with the slide position detection sensor 800, but embodiments according to the present disclosure are not limited thereto.

Because the distance D between the rack 744 and the slide position detection sensor 800 is known and fixed, the distance between the slide position detection sensor 800 and each slide slot or slide position can also be known. Thus, according to some embodiments, the slide position detection sensor 800 may be configured to iterate through the known distance of each slide position and capture an image at each predetermined distance of each slide position or slide slot to identify whether or not a slide is present at that position.

Because the distance from the front of the rack 744 to the first slide position is known, and the distance from the slide position detection sensor 800 is known, the distance from the slide position detection sensor 800 to the first slide position is also known. Additionally, the distance between each subsequent slide position may be a known distance. For example, according to some embodiments, the distance between each slide position may be the same (e.g., 4 millimeters (mm), 6.5 mm, etc.), although embodiments according to the present disclosure are not limited thereto, and in some embodiments the distance between slide positions may vary but is known or predetermined.

In order to detect or determine whether or not a slide is located at a given slide position, the slide position detection sensor 800 is capable of taking an image focusing on a specific distance away from the slide position detection sensor 800 that corresponds to the given slide position. If an element of a slide (e.g., a barcode, unique identifying information, etc.) is visible or identified at the specific distance, the slide position detection sensor 800 may determine that the slide position is occupied by a slide. By contrast, if an element of a slide is not visible or identified at the specific distance, the slide position detection sensor 800 may determine that the slide position is vacant (e.g., not occupied by a slide).

Figure 8B:
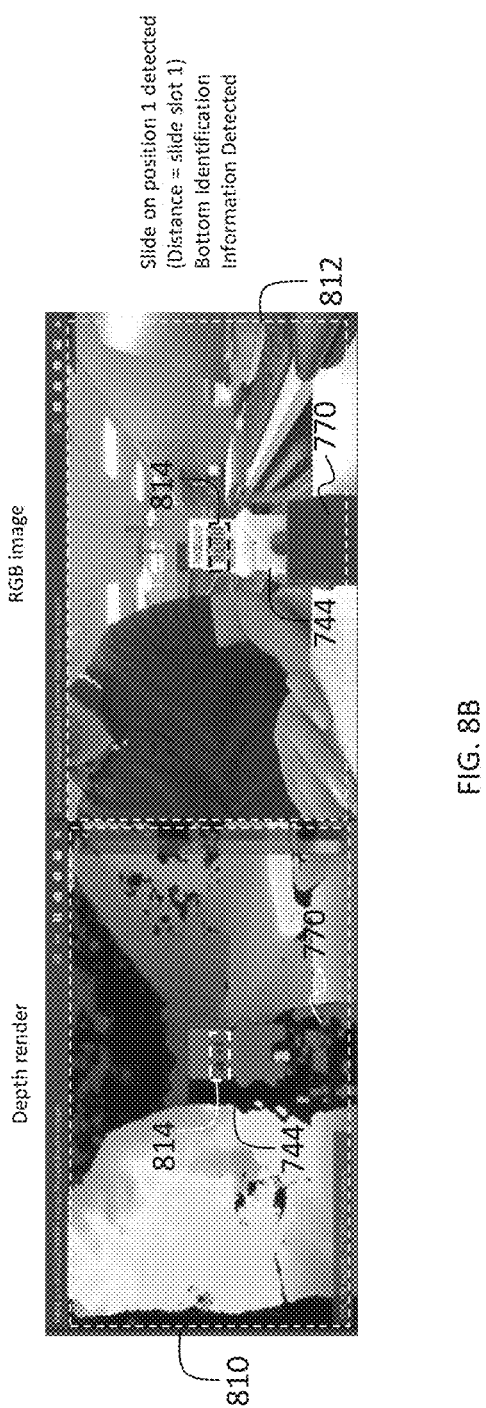
FIG. 8B shows an example image of a first slide position in a slide position detection system, according to some embodiments.

For example, FIG. 8B illustrates an example image of a first slide position (e.g., slide slot 1) in a rack 744 that is a first distance away from the slide position detection sensor 800. The first distance corresponds to the distance D, plus the distance from the front of the rack 744 to the first slide position (e.g., the front of the first slide position). In the example illustrated in FIG. 8B, the left image 810 shows a depth map image or rendering of the slide rack 744, and the right image 812 shows an RGB image of the slide rack 744. An element 814 (e.g., a barcode) affixed to the surface of the slide is present at the first distance. Accordingly, the slide position detection sensor 800 and/or the automated histology storage system 602 may identify a slide is present at the first slide position, and may cause the mechanical arm 620 to interact with the slide (e.g., by picking the slide up, etc.).

Because the slide rack 744 is positioned in the rack carriage 770, the protrusions 774 (illustrated, for example, in FIGS. 7O and 7P) cause the slide in the second slide position, behind the slide in the first slide position, to be elevated above the slide in the first slide position (as described previously). Thus, if desired, prior to the slide in the first slide position being removed, the slide position detection sensor 800 may be configured to adjust the distance it is measuring/evaluating to the distance of the second slide position to identify whether or not an element of a second slide in the second slide position is visible.

Figure 8C:
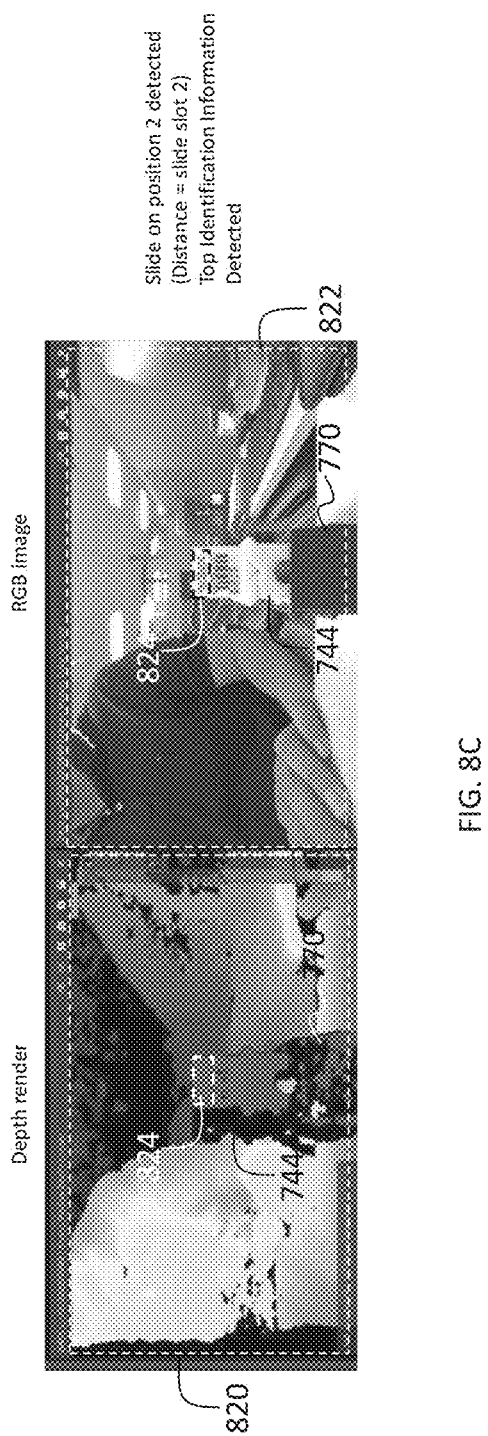
FIG. 8C shows an example image of a second slide position in a slide position detection system, according to some embodiments.

For example, FIG. 8C illustrates an example image of a second slide position (e.g., slide slot 2) in the rack 744 that is a second distance away from the slide position sensor 800. The second distance corresponds to the distance D, plus the distance from the front of the rack 744 to the second slide position (e.g., the front of the second slide position). In the example illustrated in FIG. 8C, the left image 820 shows a depth map image or rendering of the slide rack 744, and the right image 822 shows an RGB image of the slide rack 744.

As shown in FIG. 8C, the second slide is positioned behind the first slide illustrated in FIG. 8B. An element 824 (e.g., a barcode) affixed to the surface of the slide is present at the second distance. Accordingly, without the first slide being removed, the slide position detection sensor 800 and/or the automated histology storage system 602 may identify a slide is present at the second slide position, and may cause the mechanical arm 620 to interact with the slide (e.g., by picking up the slide, etc.).

The automated histology storage system 602 and/or the slide position detection sensor 800 may continue iterating through each slide position of the rack 744 in order to help identifying whether or not each slide position is occupied by a slide. As slides are identified, they may be removed from the rack 744 in order to enable the slide position detection sensor 800 to view the next slide position. In instances where an element of a slide is not identified at a given slide position, the slide position detection sensor 800 and/or the automated histology storage system 602 may determine that no slide is present at that slide position.

Alternatively, according to some embodiments, as will be described in more detail below, the slide position detection sensor 800 may be configured to capture one or more images of a slide rack 744 and identify a slide element is present in the image. Based on the slide element (e.g., a barcode, QR code, etc.) being present in the image, and a depth map or depth image information, the slide position detection sensor 800 may be configured to identify a distance between the slide position detection sensor 800 and the identified slide element. The slide position detection sensor 800 and/or the automated histology storage system 602 may then infer or identify (e.g., using a lookup table or stored distance data) to determine a slide position of the identified slide element.

Thus, embodiments according to the present disclosure may enable the automated histology storage system 602 to automatically identify (e.g., without human involvement or intervention) the presence or lack of slides at individual slide positions without potential risks to the safety of slides and the environment of the automated histology storage system 602 that may otherwise be caused, for example, by the mechanical arm 620 attempting to grip slides that are not present or incorrectly determining a slide is not present when it is. Additionally, the slide position detection sensor 800 may enable relatively faster identification of whether or not a slide is present at each slide position.

Figure 8D:
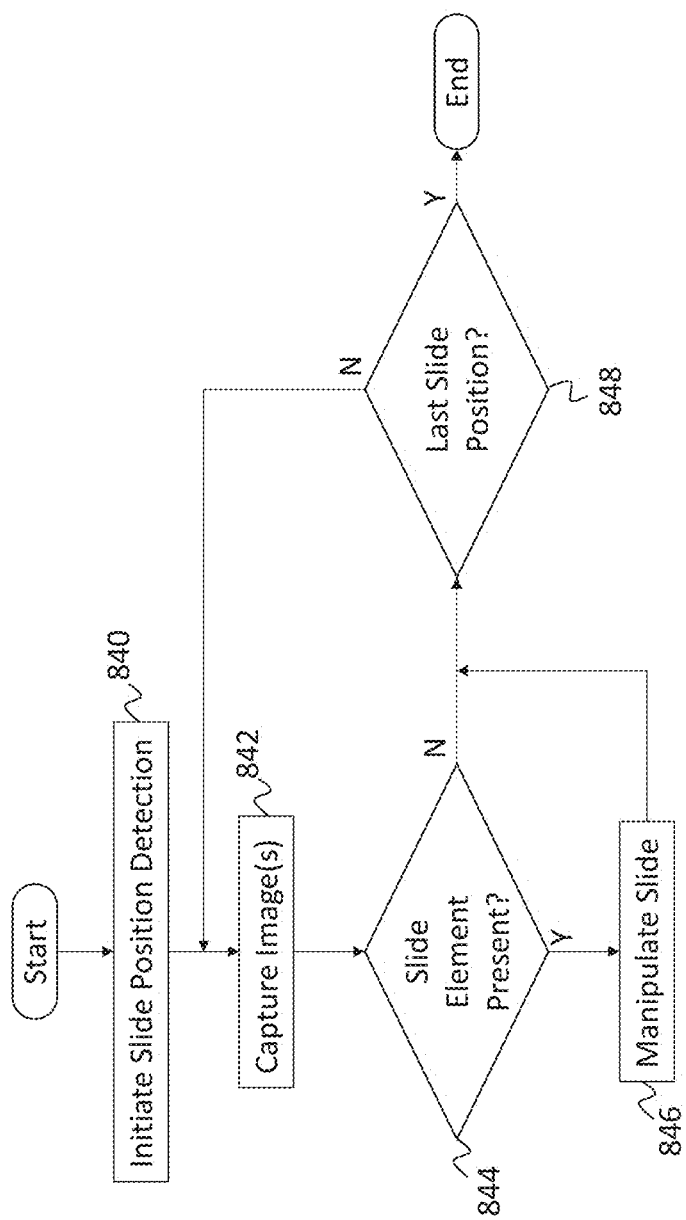
FIG. 8D illustrates an example method to determine one or more slide positions, according to some embodiments.

FIG. 8D illustrates an example method to determine one or more slide positions according to some embodiments of the present disclosure. Although various operations are illustrated in FIG. 8D, embodiments according to the present disclosure are not limited to the particular operations illustrated in FIG. 8D. For example, according to some embodiments, there may be additional operations or fewer operations without departing from the spirit and scope of embodiments according to the present disclosure. Additionally, according to some embodiments, the order of operations may vary, unless otherwise stated or implied, without departing from the spirit and scope of embodiments according to the present disclosure.

The operations illustrated in FIG. 8D may be initiated and/or controlled by various elements of the automated histology storage system 602 including, for example, the control system 650, the slide position detection sensor 800, the mechanical arm 620, etc. Unless otherwise stated, any suitable components within the automated histology storage system 602 may be utilized to execute the operations described in FIG. 8D, and for convenience of description, the various components of the automated histology storage system 602 that perform the operations of the process illustrated in FIG. 8D may be collectively referred to as "the system."

As illustrated in FIG. 8D, the process starts and then, at operation 840, the system initiates a slide position detection process. For example, according to some embodiments, the automated histology storage system 602 may detect the presence of a rack and/or a rack carriage (e.g., the rack 744 and/or the rack carriage 742) in a rack carriage nest (e.g., the rack carriage nest 750 or 770). For example, according to some embodiments, a sensor (e.g., an optical sensor, a magnetic sensor, a mechanical switch, etc.) may be triggered in response to the rack and/or rack carriage being placed in the rack carriage nest. Alternatively (or additionally), according to some embodiments, the automated histology storage system 602 and/or the mechanical arm 620 may identify the completion of an operation in which the mechanical arm 620 placed the rack and/or the rack carriage in the rack carriage nest.

In some instances, the rack and/or the rack carriage may be transported directly from an input portal to the rack carriage nest by the mechanical arm 620, and the automated histology storage system 602 may not have information about which slots within the rack are occupied by slides. Thus, prior to manipulating (e.g., removing, processing, etc.) slides from the rack, the automated histology storage system 602 may identify or determine whether or not a slide is present in a given slide position within the rack, thereby enabling the mechanical arm 620 to safely begin manipulating the slide(s).

Thus, at operation 842, the system may capture one or more images of the slide rack and/or one or more exposed slides. According to some embodiments, the system may capture unique identifying information (e.g., in the form of a barcode, ID number, QR code, etc.) corresponding to the rack. For example, unique identifying information may be affixed (e.g., with a sticker or label) to the front face of the rack that is facing the slide position detection sensor 800. The unique identifying information may identify information about samples on slides within the rack (e.g., patient information, tissue/specimen information, etc.), as well as the type or style of rack. For example, in some embodiments, different styles or types of slide racks may have different spacing between slide positions.

According to some embodiments, the system may crop the one or more photos to correspond to a predetermined region at and around the rack, in order to reduce errors in subsequent processing.

Based on a distance (e.g., a set or predetermined distance) from the slide position detection sensor 800 and the first slide position within the rack, the slide position detection sensor 800 may capture a color image of the rack and/or any exposed slides as well as a depth map image of the rack and/or any exposed slides, with the color and depth map images focusing on the known distance to the first slide position.

At operation 844, the system may determine whether or not a slide element is present in the color image and/or the depth map image at the distance to the first slide position. The slide element may include, for example, unique identifying information affixed to the slide, for example, in the form of a barcode, a QR code, identifying numbering or characters, and the like. If a slide element is present, the system may proceed, at operation 846, to control the mechanical arm 620 to manipulate the slide in the first slide position, for example, by removing the slide and placing the slide into a slide carrier cassette 500.

The system may then proceed, at operation 848, to determine whether or not the slide position is the last slide position within the rack. For example, based on the type or style of rack, the automated histology storage system 602 may know the number of slide positions within the rack, as well as the distance between the slide position detection sensor 800 and the final slide position (e.g., the slide position furthest from the slide position detection sensor 800). If the slide position is the last slide position in the rack, then the process may end. Otherwise, if there are more slide positions in the rack, the system may return to operation 842, to capture images corresponding to the next slide position.

Alternatively, if a slide element is not present or identified at operation 844, the system may proceed to operation 848, to determine whether or not the vacant slide position is the last slide position in the rack. If the vacant slide position is also the last slide position in the rack, the process may end. If the vacant slide position is not the last slide position in the rack, the process may return to operation 842 to capture images corresponding to the next slide position.

Additionally, or alternatively, according to some embodiments, rather than iterating through each individual slide position, according to some embodiments, the automated histology storage system 602 may capture images of slides and then when a slide is identified as being present, the corresponding slide position may be identified. For example, FIG. 8E illustrates an example method to determine one or more slide positions according to some embodiments of the present disclosure.

Figure 8E:
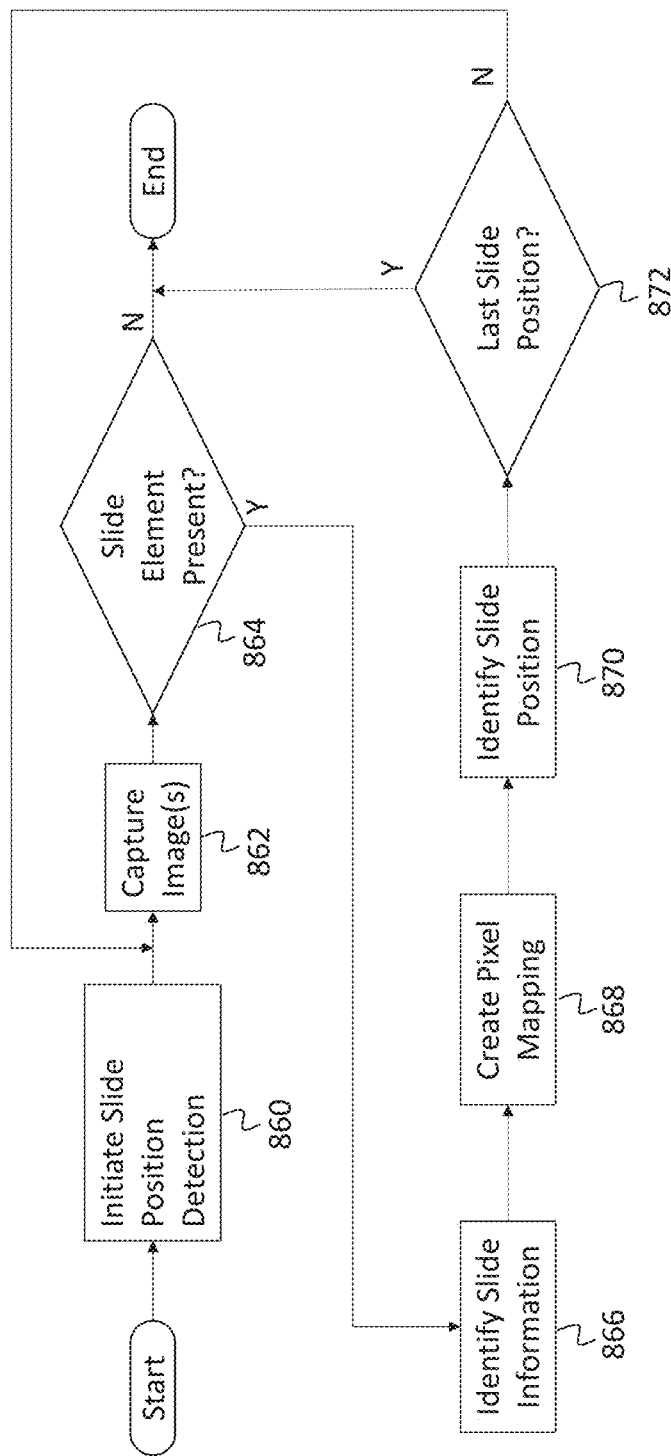
FIG. 8E illustrates an example method to determine one or more slide positions, according to some embodiments.

Although various operations are illustrated in FIG. 8E, embodiments according to the present disclosure are not limited to the particular operations illustrated in FIG. 8E. For example, according to some embodiments, there may be additional operations or fewer operations without departing from the spirit and scope of embodiments according to the present disclosure. Additionally, according to some embodiments, the order of operations may vary, unless otherwise stated or implied, without departing from the spirit and scope of embodiments according to the present disclosure.

The operations illustrated in FIG. 8E may be initiated and/or controlled by various elements of the automated histology storage system 602 including, for example, the control system 650, the slide position detection sensor 800, the mechanical arm 620, etc. Unless otherwise stated, any suitable components within the automated histology storage system 602 may be utilized to execute the operations described in FIG. 8E, and for convenience of description, the various components of the automated histology storage system 602 that perform the operations of the process illustrated in FIG. 8E may be collectively referred to as "the system."

As shown in FIG. 8E, the process starts and then, at operation 860, the system initiates a slide position detection process. For example, according to some embodiments, the automated histology storage system 602 may detect the presence of a rack and/or a rack carriage (e.g., the rack 744 and/or the rack carriage 742) in a rack carriage nest (e.g., the rack carriage nest 750 or 770). For example, according to some embodiments, a sensor (e.g., an optical sensor, a magnetic sensor, a mechanical switch, etc.) may be triggered in response to the rack and/or rack carriage being placed in the rack carriage nest. Alternatively (or additionally), according to some embodiments, the automated histology storage system 602 and/or the mechanical arm 620 may identify the completion of an operation in which the mechanical arm 620 placed the rack and/or the rack carriage in the rack carriage nest.

As described previously, in some instances, the automated histology storage system 602 may not know which slide positions within a rack are occupied by a slide and which positions are vacant. Thus, at operation 862, the system may capture one or more images of the slide rack and/or one or more exposed slides. According to some embodiments, the system may capture unique identifying information (e.g., in the form of a barcode, ID number, QR code, etc.) corresponding to the rack. For example, unique identifying information may be affixed (e.g., with a sticker or label) to the front face of the rack that is facing the slide position detection sensor 800. The unique identifying information may identify information about samples on slides within the rack (e.g., patient information, tissue/specimen information, etc.), as well as the type or style of rack. For example, in some embodiments, different styles or types of slide racks may have different spacing between slide positions.

The one or more photos may include, for example, a color image (e.g., a high-resolution color image) of the rack and/or the one or more exposed slides, as well as a depth map image of the rack and/or the one or more exposed slides. According to some embodiments, the system may crop the one or more photos to correspond to a predetermined region at and around the rack, in order to reduce errors in subsequent processing.

At operation 864, the system may determine whether or not a slide element is present. For example, the system may identify whether or not unique identifying information corresponding to a slide (e.g., a barcode, QR code, identification numbers or characters, etc.) is present in the one or more photos. If a slide element is not present, the process may end.

If a slide element is present, however, the system may proceed, at operation 866, to identify the slide information. For example, the slide element may include unique identifying information about the patient, sample, and the like. The system may retrieve such information and store the information for subsequent processing.

Additionally, at operation 868, the system may create a pixel mapping between the color image and the depth image to identify coordinates of the slide element. Then, at operation 870, based on the coordinates of the slide element and the depth image, the system may identify the depth or distance of the slide element relative to the slide position detection sensor 800. According to some embodiments, based on the distance derived from the coordinates and depth image, the system may identify the slide position of the slide element. For example, a lookup table (LUT) or slide position data may be stored in memory (e.g., the memory 652 and/or the database 662) storing information about the distance between each slide position and the slide position detection sensor 800. Once the slide position is identified, the system may cause the mechanical arm 620 to manipulate or move the slide out of the rack.

Then, at operation 872, the system may determine whether or not the slide was in the last slide position or not. If the position of the slide corresponds to the last slide position in the rack, the process may end. Alternatively, if the position of the slide does not correspond to the last slide position in the rack, the system may return to operation 862 to capture images corresponding to subsequent slide positions.

FIGS. 9A-9E illustrate a mechanical arm gripper according to some embodiments of the present disclosure. As described above with respect to FIGS. 2 and 3, according to some embodiments of the present disclosure, a mechanical arm with a gripper connected to an end of the mechanical arm may be configured to pick up and manipulate a slide in a slide processing or manufacturing environment and/or an automated histology storage system.

Figure 9A:
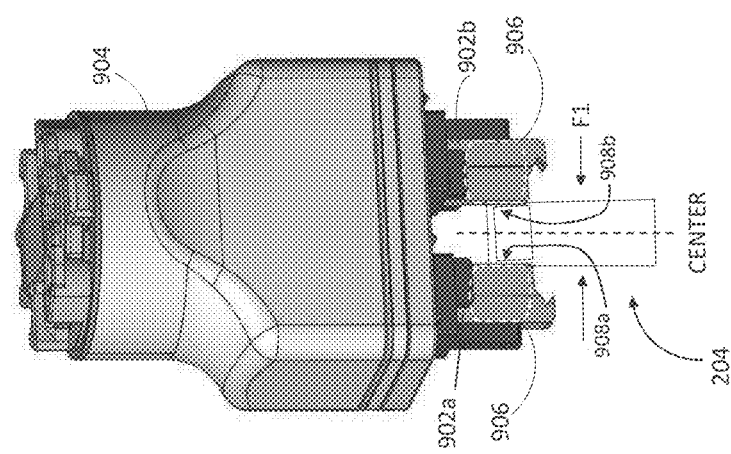
FIG. 9A illustrates an example of a gripper holding a slide in a first gripping mode, according to some embodiments.

FIG. 9A illustrates an example of a gripper 900 according to some embodiments. The gripper 900 may be the same as or similar to (or one example of) the gripper 216 illustrated in the slide processing or manufacturing system 200 of FIG. 2A.

The gripper 900 according to some embodiments may be configured to grip or manipulate a slide in various positions or orientations, in order to enable the slide to interface with various different carriages, racks, machines, and the like, in the process of manufacturing or storing a pathology slide. Thus, embodiments according to the present disclosure may reduce the need to change gripers or tools, and/or utilize multiple mechanical arms to manipulate slides.

The gripper 900 may be formed of any suitable material that is solid enough to support a glass slide 204, without a substantial risk of the glass slide or the gripper 900 being damaged. For example, in some embodiments, the gripper 900 may be formed of a plastic or polymer material, but embodiments according to the present disclosure are not limited thereto.

As shown in FIG. 9A, the gripper 900 may include two or more gripper fingers 902. Although FIGS. 9A-9E are described in the context of two gripper fingers 902a and 902b, embodiments according to the present disclosure are not limited thereto, and some embodiments may include additional gripper fingers 902 without departing from the spirit and scope of embodiments according to the present disclosure. In the present Specification, in some instances, the reference numeral 902 may be used to refer generally to each of the gripper fingers 902a and 902b (and any additional gripper fingers that may be utilized in some embodiments).

Additionally, according to some embodiments, the gripper 900 (or the mechanical arm 620 to which the gripper 900 is attached) may include additional components configured to be utilized in connection with the manipulation and maneuvering of a slide during a slide manufacturing process. For example, in some embodiments, the gripper 900 (or the mechanical arm 620 to which the gripper 900 is attached) may include a suction cup for creating a suction force against a slide. Additionally, in some embodiments, the gripper 900 (or the mechanical arm 620 to which the gripper 900 is attached) may include a camera or sensor (e.g., an optical sensor, a pressure sensor, etc.) configured to identify or measure the location of a slide, a slide carrier, a surface, or the like.

As shown in FIGS. 9A-9E, the gripper 900, using the gripper fingers 902a and 902b, may be configured to apply a pinching or inward force F1 toward a center line CENTER, which bisects the gripper 900 and the slide 204. The gripper fingers 902a and 902b may be positioned an equal distance from the center line CENTER, and may be configured to move toward and away from the center line CENTER in coordination with each other (e.g., at a same speed and with a same force).

Referring to FIGS. 9A-9E, the gripper fingers 902a and 902b may be mounted to an actuator 904 configured to move the gripper fingers 902a and 902b inward (toward the center line CENTER) and outward (away from the center line CENTER) in order to open or close a space between the fingers 902a and 902b. The actuator 904 may be connected to a mechanical arm (e.g., the mechanical arm 202 shown in FIG. 2A and/or the mechanical arm 620 shown in FIG. 6A), such that collectively, the mechanical arm, the actuator 904, and the gripper 900 may operate to manipulate a slide or move the slide from one location to another location. Each gripper finger 902a and 902b may have the same or similar shape. For example, in some embodiments, the gripper finger 902b may be the same as the gripper finger 902a, except rotated 180 degrees relative to the gripper finger 902a, although embodiments according to the present disclosure are not limited thereto.

FIG. 9A illustrates the gripper 400 holding a slide in a first gripping mode or configuration, in which the gripper fingers 902a and 902b operate to provide a pinching force F1 widthwise (along an axis parallel to a width direction of the slide 204), against the long edges of the slide 204.

In the first gripping mode, the gripper 900 may be configured to pick up and/or maneuver the slide 204 in an orientation in which the center line between the gripper fingers 902a and 902b extends along the front face of the slide 204 in parallel with the long edges of the slide 204, with the center line bisecting the short edges of the slide 204.

The gripper fingers 902a and 902b may have a first portion 906 extending generally in a direction away from the actuator 904. For example, according to some embodiments, the first portion 906 of the gripper fingers 902a and 902b may extend in a direction parallel (or generally parallel) to the center line CENTER.

The gripper fingers 902a and 902b (e.g., the first portion 906 of the gripper fingers 902a and 902b) may have interior edges 908a and 908b, respectively, where the interior edges 908a and 908b are interior with respect to the opening or space between the gripper fingers 902a and 902b. According to some embodiments, the interior edges 908a and 908b may be elongated in a direction parallel to the center line CENTER and may define (or be located at) the interior edge the first portion 906 of each corresponding gripper finger 902a and 902b. In some embodiments, the interior edges 908a and 908b may extend parallel to each other, and may each have a groove therein, which are each adapted to receive the top (or bottom) of the long edges of a slide as shown in the first gripping mode shown in FIG. 9A. The groove in the interior edges 908a and 908b is illustrated and described in more detail below.

When the pinching or inward force F1 is applied to the long edges of the slide, the gripper 900 may be able to pick up the slide 204 and move the slide around in 3-dimensional space.

Figure 9B:
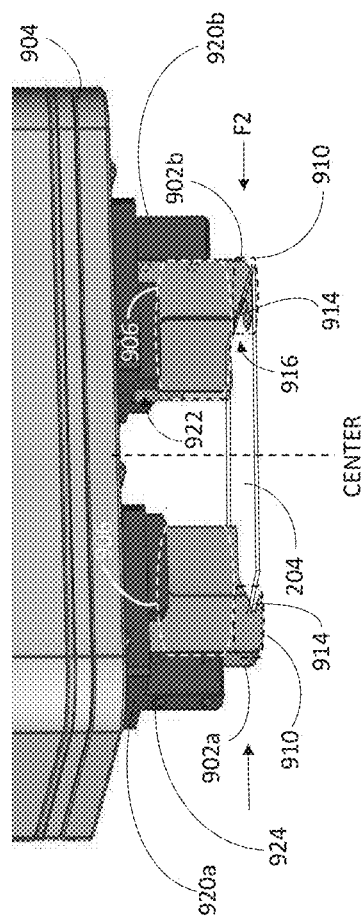
FIG. 9B illustrates an example of a gripper holding a slide in a second gripping mode, according to some embodiment.

FIG. 9B illustrates the gripper 900 holding a slide in a second gripping mode or configuration, in which the gripper fingers 902a and 902b operate to provide a pinching force or pressure F2 lengthwise (along an axis parallel to a length direction of the slide 204) against the short or width edges of the slide 204. That is, the pressure or force F2 may be in a direction toward (e.g., perpendicular to) the center line CENTER. In the second gripping mode, the gripper 900 may pick up and/or maneuver the slide 204 in an orientation in which the center line CENTER between the gripper fingers 902a and 902b may extend through the front and rear faces of the slide 204, halfway between the short edges of the slide 204. That is, a direction that is perpendicular or normal with respect to the planes of the front and rear faces of the slide 204 may be parallel to the center line CENTER, such that the front or rear face of the slide 204 faces toward the actuator 904.

The gripper fingers 902a and 902b may have a second portion 910 that extends from the first portion 906 at an angle parallel or generally parallel to the extension direction of the first portion 906. The second portion 910 may include a protrusion or tooth 914 that extends toward the center line CENTER, such that a groove or cavity 916 is created between the protrusion 914 and the main body of the second portion 910.

The ends of the second portion 910, including the groove 916, are both further away from the actuator 904, and further away from each other, compared to the interior edges 908a and 908b. Thus, a relatively wider space may be created between the ends of the second portion 910 (and the grooves 916), relative to the space between the interior edges 908a and 908b. Additionally, the groove 916 between the protrusion 914 and the main body of the second portion 910 may accommodate the width or short edges of the slide 204 such that the gripper 900 can pick up and/or maneuver the slide 204 with the front or rear face of the slide 204 facing toward the actuator 904.

Figure 9C:
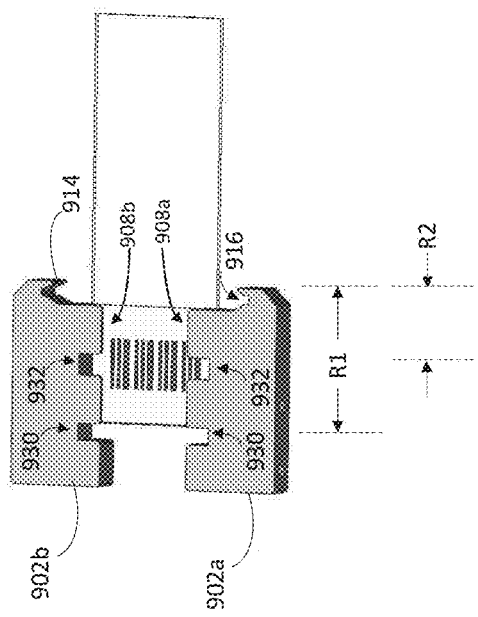
FIG. 9C illustrates further details of an example gripper, according to some embodiments.

According to some embodiments, the gripper fingers 902a and 902b may be mechanically connected to the actuator 904 through support brackets 920a and 920b. That is, each gripper finger 902a and 902b may be connected to a corresponding support bracket 920a and 920b, respectively. According to some embodiments, the gripper fingers 902a and 902b may be mechanically affixed to the brackets 920a and 920b using any suitable mechanical connection mechanism. For example, in some embodiments, the brackets 920a and 920b may have a channel or groove 922 extending horizontally (e.g., perpendicularly with respect to the center line CENTER and/or parallel to the direction of the force F2). The support brackets 920a and 920b may have, for example, an upper portion (e.g., a flared upper portion) configured to fit within the channel 922. Additionally, or alternatively, according to some embodiments, one or more screws or bolts may be inserted into one or more holes 924 that extend through a vertical portion of the support bracket 920, and connect with one or more corresponding holes (e.g., threaded holes) located on the gripper fingers 902. By utilizing the support brackets 920a and 920b, According to some embodiments, as illustrated for example in FIG. 9C, the gripper fingers 902a and 902b may include one or more notches or gaps. For example, a first notch 930 may be cut or machined into the interior edges 908a and 908b. The first notch 930 may be located at a first distance R1 from the bottom of the gripper finger (e.g., the outside edge of the protrusion 914). Additionally, a second notch 932 may be cut or machined into the interior edges 908a and 908b. The second notch 932 may be located at a second distance R2, less than the first distance R1, from the bottom of the gripper finger. The first notch 930 and the second notch 932 may be utilized for manually calibrating pickup distances for the mechanical arm 620 when picking up slides. For example, a first pickup distance may be selected such that the width edge of the slide is aligned with the first notch 930 (as illustrated in FIG. 9C) when more precise control of the slide is desired. A second pickup distance may be selected such that the width edge of the slide is aligned with the second notch 932 when less precision is desired, but spacing (e.g., when a slide is located deep within a fixture, rack, or carriage) is a consideration. Additionally, the second notch 932 may operate to reduce overall friction on the slide at the edges 908a and 908b, because less surface area of the gripper fingers 902a and 902b may be in contact with the slide, which may reduce the likelihood of damage to the slide caused by the gripper fingers.

Figure 9E:
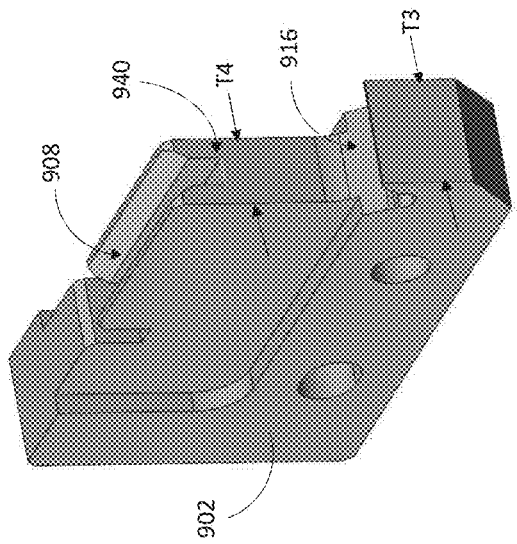
FIG. 9E illustrates further details of a gripper finger, according to some embodiments.
Figure 9D:
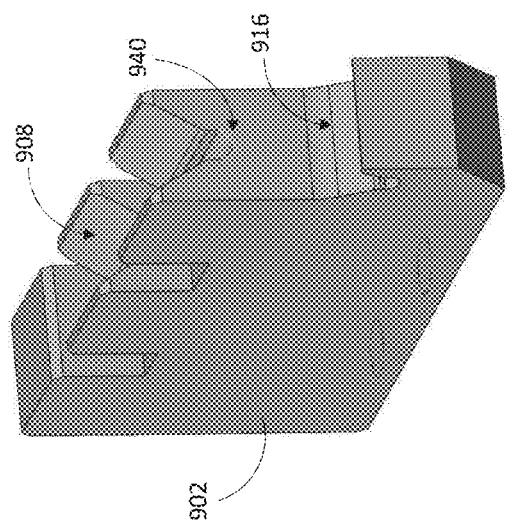
FIG. 9D illustrates further details of an internal edge of a gripper finger, according to some embodiments.

Referring to FIGS. 9D and 9E, the interior edges 908 of the gripper fingers 902 may have a groove formed therein. According to some embodiments, the groove may have a rounded surface 940 for contacting the slide 204, as illustrated in FIG. 9D. Alternatively, the groove may have a flat surface 940 for contacting the slide 204. The rounded or flat surface 940 may be the inside surface of the groove that provides lateral pressure (e.g., in the direction of the force F1) against the long edges of the slide 204. The rounded surface 940 may enable relatively improved grip position control. By contrast, the flat surface 940 may have relatively improved wear performance compared to the rounded surface, but may have slightly less grip control over the slide, since the slide might generally be capable of a greater degree of movement or angle inconsistency within the flat surface groove.

FIGS. 10A-10F illustrate a mechanical arm gripper according to some embodiments of the present disclosure. As described above with respect to FIGS. 2, 3, 6, and 7, according to some embodiments of the present disclosure, a mechanical arm with a gripper connected to an end of the mechanical arm may be configured to pick up and manipulate a slide in a slide processing or manufacturing environment and/or an automated histology storage system. Additionally, a mechanical arm equipped with a gripper may be configured to pick up and manipulate racks or trays that carry slides, as well as rack carriages or tray carriages that carry racks and trays, respectively.

Figure 10B:
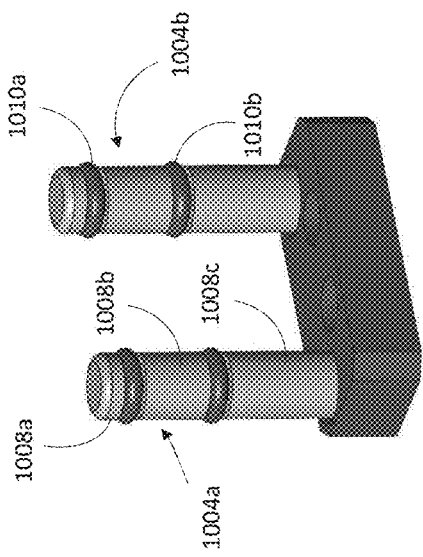
FIG. 10B illustrates an example gripper finger rod, according to some embodiments.
Figure 10A:
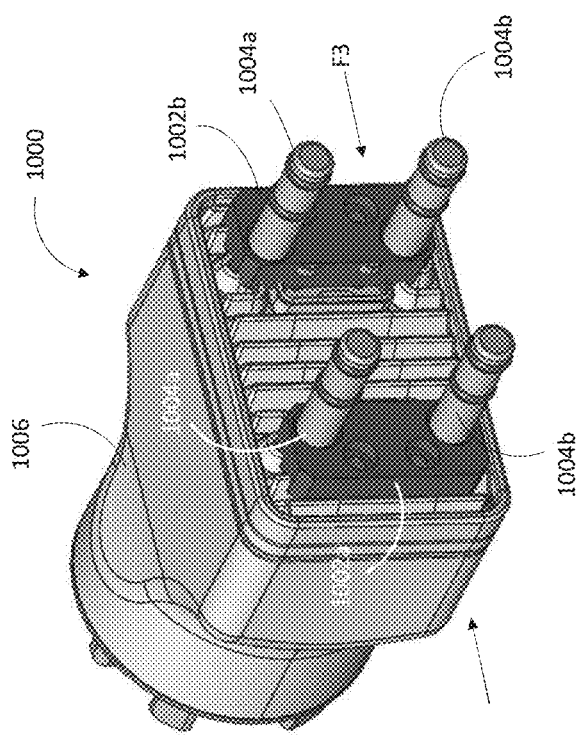
FIG. 10A illustrates an example of a gripper, according to some embodiments.

FIG. 10A illustrates an example of a gripper 1000 according to some embodiments. The gripper 1000 may be the same as or similar to (or one example of) the gripper 216 illustrated in the slide processing or manufacturing system 200 of FIG. 2A.

The gripper 1000 according to some embodiments may be configured to grip or manipulate various carriages in various positions or orientations, in order to transfer slides or empty carriages to and from various locations within the slide processing or manufacturing system 200 and/or the automated histology storage system 602 the process of manufacturing or storing a pathology slide. Thus, embodiments according to the present disclosure may reduce the need to change grippers or tools, and/or utilize multiple mechanical arms to manipulate slides or carriages.

The gripper 1000 may be formed of any suitable material that is solid enough to support a glass slide 204 and/or a carriage (e.g., a tray carriage 716, a rack carriage 742, etc.), without a substantial risk of the glass slide or the gripper 900 being damaged. For example, in some embodiments, the gripper 900 may be formed of a plastic or polymer material, but embodiments according to the present disclosure are not limited thereto.

As shown in FIG. 10A, the gripper 1000 may include two or more gripper finger brackets 1002, each gripper finger bracket 1002 having one or more gripper finger rods 1004 protruding from their respective gripper finger brackets 1002. Although FIGS. 10A-10F are described in the context of two gripper finger brackets 1002a and 1002b, embodiments according to the present disclosure are not limited thereto, and some embodiments may include additional gripper finger brackets without departing from the spirit and scope of embodiments according to the present disclosure. In the present Specification, in some instances, the reference numeral 1002 may be used to refer generally to each of the gripper finger brackets 1002a and 1002b (and any additional gripper finger brackets that may be utilized in some embodiments).

Additionally, although FIGS. 10A-10F are illustrated and described in the context of each gripper finger bracket 1002 including two gripper finger rods 1004, embodiments according to the present disclosure are not limited thereto, and some embodiments may include additional gripper finger rods or fewer gripper finger rods without departing from the spirit and scope of embodiments according to the present disclosure. In the present Specification, in some instances, the reference numeral 1004 may be used to refer generally to each of the gripper finger rods 1004a and 1004b (and any additional gripper finger rods that be utilized in some embodiments).

Additionally, according to some embodiments, the gripper 1000 (or the mechanical arm 620 to which the gripper 1000 is attached) may include additional components configured to be utilized in connection with the manipulation and maneuvering of a slide during a slide manufacturing process. For example, in some embodiments, the gripper 1000 (or the mechanical arm 620 to which the gripper 1000 is attached) may include a suction cup for creating a suction force against a slide. Additionally, in some embodiments, the gripper 1000 (or the mechanical arm 620 to which the gripper 1000 is attached) may include a camera or sensor (e.g., an optical sensor, a pressure sensor, etc.) configured to identify or measure the location of a slide, a slide carrier, a surface, or the like.

As shown in FIGS. 10A-10F, the gripper 1000, using the gripper finger brackets 1002a and 1002b and the gripper finger rods 1004a and 1004b, may be configured to apply a pinching or inward force F3 toward a center of the gripper 1000. The gripper finger brackets 1002a and 1002b may be positioned an equal distance from the center of the gripper 1000, and may be configured to move toward and away from the center in coordination with each other (e.g., at a same speed and with a same force).

Referring to FIGS. 10A-10F, the gripper finger brackets 1002a and 1002b may be mounted to an actuator 1006 configured to move the gripper finger brackets 1002a and 1002b inward (toward the center) and outward (away from the center) in order to open or close a space between the gripper finger brackets 1002a and 1002b. The actuator 1006 may be connected to a mechanical arm (e.g., the mechanical arm 202 shown in FIG. 2A and/or the mechanical arm 620 shown in FIG. 6A), such that collectively, the mechanical arm, the actuator 1006, and the gripper 1000 may operate to manipulate a slide or move the slide from one location to another location. Each gripper finger bracket 1002a and 1002b may have the same or similar shape, and each gripper finger rod 1004a and 1004b may have the same or similar shape. For example, in some embodiments, the gripper finger bracket 1002b may be the same as the gripper finger bracket 1002a, except rotated 180 degrees relative to the gripper finger bracket 1002a, although embodiments according to the present disclosure are not limited thereto.

Referring to FIG. 10B, each gripper finger rod 1004 may extend generally in a direction away from the gripper finger bracket 1002. According to some embodiments, the gripper finger rod 1004 may have a generally cylindrical shape, with a consistent diameter along the length of the gripper finger rod 1004. Embodiments according to the present disclosure are not limited thereto, and according to some embodiments, the gripper finger rod 1004 may have a rectangular or square shape (or any other suitable shape) in a cross-section, and in some embodiments, the gripper finger rod 1004 may have a curved shape in the extension direction, instead of a linear cylinder as illustrated in FIGS. 10A-10F.

The gripper finger brackets 1002 may be mounted to the actuator 1006 using any suitable connection mechanism, for example, one or more screws or bolts, clips, springs, etc. The gripper finger rods 1004 may be mounted to their corresponding gripper finger bracket 1002 by being inserted into a hole (e.g., a threaded hole), being connected to a threaded bolt extending from the gripper finger bracket 1002, or any other suitable mechanism (e.g., a clip, spring, friction, adhesive material, etc.).

According to some embodiments, the gripper finger rod 1004 may have one or more segments extending away from the gripper finger bracket 1002. For example, FIG. 10B illustrates the gripper finger rods 1004 having three segments 1008*a*, 1008*b*, and 1008*c*, although embodiments according to the present disclosure are not limited thereto, and some embodiments may include fewer segments or additional segments without departing from the spirit and scope of embodiments according to the present disclosure.

Additionally, one or more flared portions may be incorporated into the gripper finger rods 1004. For example, FIG. 10B illustrates the gripper finger rods having two flared portions 1010*a* and 1010*b*, although embodiments according to the present disclosure are not limited thereto, and some embodiments may include fewer flared portions or additional flared portions without departing from the spirit and scope of embodiments according to the present disclosure. According to some embodiments, the flared portions 1010 may be made of the same material as the segments 1008. For example, the flared portions 1010 and the segments 1008 may be made of a polymer or plastic material, although embodiments are not limited thereto, and any other suitable material (e.g., metal) may be utilized. Additionally, according to some embodiments, the flared portions 1010 may be o-rings formed of a different material (e.g., rubber) from the segments, and may be installed or inserted into grooves or channels in the gripper finger rod 1004 corresponding to the location of the flared portions 1010. The flared portions 1010 may operate to aid in friction when the gripper 1000 is being utilized to pick up objects (e.g., tray or rack carriages).

Figure 10D:
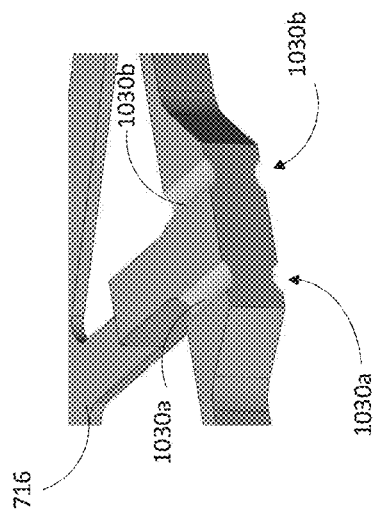
FIG. 10D illustrates example gripping channels of a tray carriage, according to some embodiments.
Figure 10C:
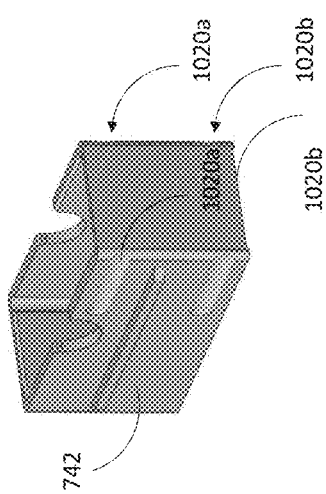
FIG. 10C illustrates example gripping channels of a rack carriage, according to some embodiments.

Referring to FIGS. 10C and 10D, the rack carriage 742 (shown in FIG. 10C) and the tray carriage 716 (shown in FIG. 10D) may have one or more channels or grooves formed thereon at various locations. For example, as illustrated in FIG. 10C, the rack carriage 742 includes a first channel 1020*a* and a second channel 1020*b* on a first side of the rack carriage 742. On the opposite side of the rack carriage 742, the rack carriage 742 also includes the first channel 1020*a* and the second channel 1020*b*. The first channel 1020*a* may correspond, for example, to the first gripper finger rod 1004*a* and the second channel 1020*b* may correspond, for example, to the second gripper finger rod 1004*b*. For example, the distance between the first channel 1020*a* and the second channel 1020*b* may correspond to (or be equal to) the distance between the first gripper finger rod 1004*a* and the second gripper finger rod 1004*b* on the same gripper finger bracket 1002. Additionally, according to some embodiments, the shape of the channels 1020*a* and 1020*b* may have a contour that corresponds or conforms to the shape of the gripper finger rods 1004*a* and 1004*b*, respectively. Although FIG. 10C illustrates the channels 1020 being at one end of the rack carriage 742, embodiments according to the present disclosure are not limited thereto. For example, in various embodiments, the channels 1020 may be located at any suitable location, for example, the other end of the rack carriage 742, the middle of the rack carriage 742, etc.

Similarly, referring to FIG. 10D, the tray carriage 716 includes a first channel 1030*a* and a second channel 1030*b* at a top side of the tray carriage 716. On the opposite side of the tray carriage 716, the tray carriage 716 also includes two corresponding channels. The first channel 1030*a* may correspond, for example, to the first gripper finger rod 1004*a* and the second channel 1030*b* may correspond, for example, to the second gripper finger rod 1004*b*. For example, the distance between the first channel 1020*a* and the second channel 1030*b* may correspond to (or be equal to) the distance between the first gripper finger rod 1004*a* and the second gripper finger rod 1004*b* on the same gripper finger bracket 1002. Additionally, according to some embodiments, the shape of the channels 1030*a* and 1030*b* may have a contour that corresponds or conforms to the shape of the gripper finger rods 1004*a* and 1004*b*, respectively. Although FIG. 10D illustrates the channels 1030 being at a particular location (e.g., a handle) of the tray carriage 716, embodiments according to the present disclosure are not limited thereto. For example, in various embodiments, the channels 1030 may be located at any suitable location around the tray carriage 716.

Figure 10E:
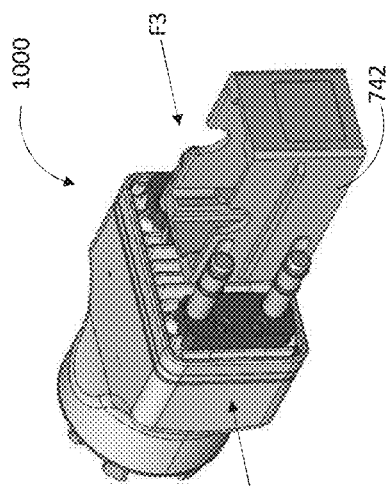
FIG. 10E illustrates an example of a gripper holding a rack carriage, according to some embodiments.
Figure 10F:
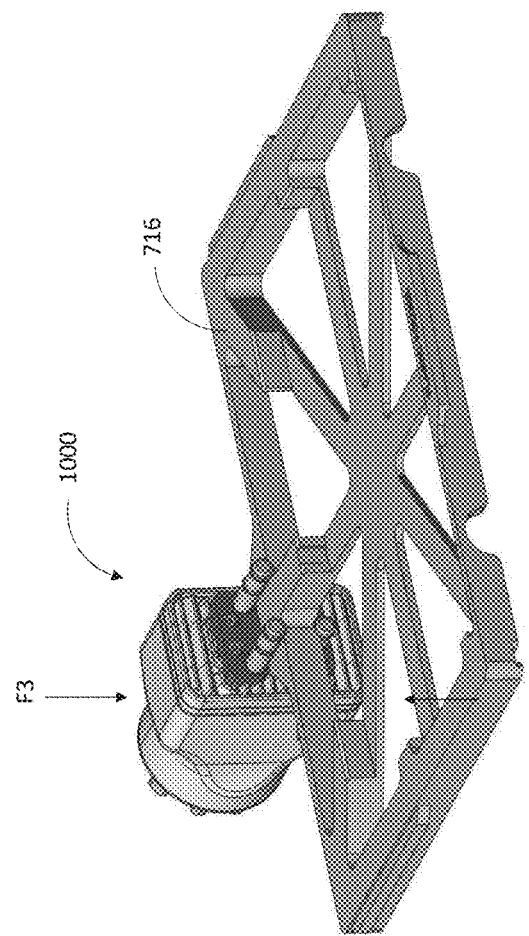
FIG. 10F illustrates and example of a gripper holding a tray carriage, according to some embodiments.

As shown in FIGS. 10E and 10F, the gripper 1000, utilizing the gripper finger brackets 1002, the gripper finger rods 1004 and the actuator 1006, may be utilized to grip, manipulate, and maneuver the rack carriage 744 and the tray carriage 716 in three-dimensional space. Depending on the object being picked up or maneuvered, the gripper 1000 may rotate to an appropriate direction to apply the pinching force F3 against the object. For example, as illustrated in FIG. 10E, the force F3 may be applied in a generally horizontal direction against opposite surfaces or edges of the rack carriage 744 in order to keep the rack carriage 744 upright and prevent a rack or slides from falling out of the rack carriage 744 during movement. The gripper 1000 may rotate (for example, by 90 degrees) in order to pick apply the force F3 against opposite surfaces or edges of the tray carriage 716 in order to keep the tray carriage 716 upright and to prevent a tray or slides from falling out of the tray carriage 716 during movement.

FIGS. 11A-11B illustrate a mechanical arm gripper according to some embodiments of the present disclosure. As described above with respect to FIGS. 2, 3, 6, and 7, according to some embodiments of the present disclosure, a mechanical arm with a gripper connected to an end of the mechanical arm may be configured to pick up and manipulate a slide in a slide processing or manufacturing environment and/or an automated histology storage system.

FIG. 11A illustrates an example of a gripper 1100 according to some embodiments. The gripper 1100 may be the same as or similar to (or one example of) the gripper 216 illustrated in the slide processing or manufacturing system 200 of FIG. 2A.

The gripper 1100 may be configured to grip or manipulate a slide in various positions and orientations, in order to enable the slide to interface with various different carriages, racks, machines, and the like, in the process of manufacturing or storing a pathology slide. Thus, embodiments according to the present disclosure may reduce the need to change grippers or tools and/or utilize multiple mechanical arms to manipulate slides.

The gripper 1100 may be formed of any suitable material that is solid enough to support a glass slide 204, without a substantial risk of the glass slide or the gripper 1100 being damaged. For example, in some embodiments, the gripper 1100 may be formed of a plastic or polymer material, but embodiments according to the present disclosure are not limited thereto.

As shown in FIG. 11A, the gripper 1100 may include two gripper fingers 1102 and 1104 that are configured to engage with each other to pick up a slide 204. The first gripper finger 1102 and the second gripper finger 1104 may be configured to be coupled to an actuator of a mechanical arm (e.g., the actuator 904 in FIG. 9A and/or the mechanical arm 620) at mounting locations 1106 and 1108, respectively.

The gripper 1100, using the gripper fingers 1102 and 1104, may be configured to apply a pinching or inward force F4 toward a center line CENTER, which bisects the slide 204. The gripper finger 1102 may have a vertical portion 1110 extending in the Z-direction, and a horizontal portion 1112 extending in the Y-direction. Similarly, the gripper finger 1104 may have a vertical portion 1114 extending in the Z-direction, and a horizontal portion 1116 extending in the Y-direction. The horizontal portion 1112 of the first gripper finger 1102 may be configured to slide along (e.g., in contact with) the horizontal portion 1116 of the second gripper finger 1104, as the vertical portions 1110 and 1114 move toward and away from each other when gripping or releasing a slide.

FIG. 11B shows a rear view of the first gripper finger 1102 when viewed in the Y-direction. As shown in FIG. 11B, the first gripper finger 1102 may have a prong or protrusion 1120 that extends vertically below the horizontal portion 1112. Similarly, referring to FIG. 11A, the second gripper finger 1104 may have a prong or protrusion 1122 that extends vertically below the horizontal portion 1112 of the first gripper finger 1102. Thus, as illustrated in FIG. 11A, the protrusion 1120 of the first gripper finger 1102 and the protrusion 1122 of the second gripper finger 1104 may operate together to apply the pinching force F4 against the slide 204 in a position in which the front or rear face of the slide 204 faces in the Z-direction.

Additionally, an edge 1130 at the end of the horizontal portion 1112 of the first gripper finger 1102, and an interior edge 1132 of the protrusion 1122 that faces the edge 1130, may collectively operate together to apply the pinching force F4 against the front and rear faces of the slide in a position in which the front or rear face of the slide 204 faces the Y-direction.

According to some embodiments, the surface of the edge 1130, the interior edge 1132, the interior edge of the prong 1120 and/or the prong 1122, and/or the bottom of the horizontal portion 1112 may have one or more pads (e.g., rubber pads) that may provide compliancy when gripping slides that have varying thicknesses and/or varying label thicknesses. Additionally, the pads may provide additional friction or gripping retention strength. In some embodiments, the pads may be small balls (e.g., rubber balls) inserted into pre-formed or machined cavities conforming to the shape of the balls. Alternatively, the pads may be rubber material that is adhered to the surface of the gripper fingers 1102 and 1104 using a suitable adhesive material.

Figure 12A:
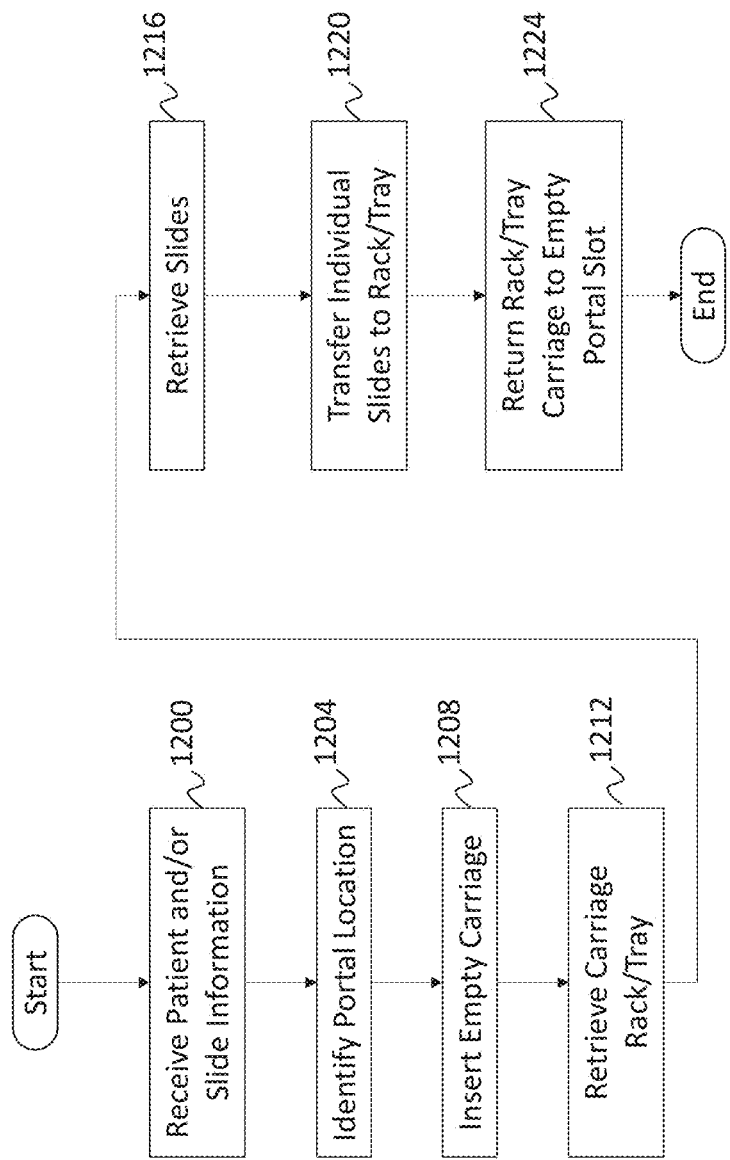
FIG. 12A illustrates an example process for an automated histology storage system to receive slides from a user or technician, according to some embodiments.
Figure 12B:
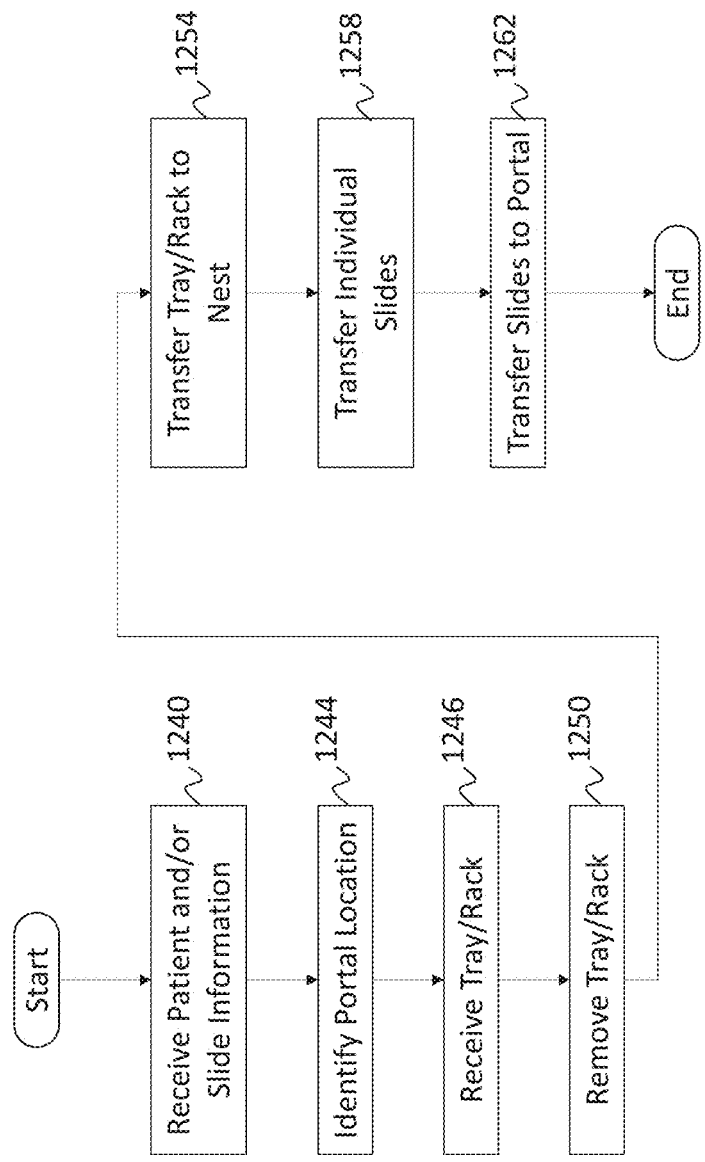
FIG. 12B illustrates an example process for an automated histology storage system to retrieve slides from storage and transfer them to a user or technician, according to some embodiments.

FIGS. 12A-12B illustrate aspects of a method for operating an automated histology storage system according to some embodiments.

FIG. 12A illustrates an example process for an automated histology storage system to receive slides from a user or technician. Although various operations are illustrated in FIG. 12A, embodiments according to the present disclosure are not limited to the particular operations illustrated in FIG. 12A. For example, according to some embodiments, there may be additional operations or fewer operations without departing from the spirit and scope of embodiments according to the present disclosure. Additionally, according to some embodiments, the order of operations may vary, unless otherwise stated or implied, without departing from the spirit and scope of embodiments according to the present disclosure.

The operations illustrated in FIG. 12A may be initiated and/or controlled by various elements of the automated histology storage system 602 including, for example, the control system 650, the mechanical arm 620, etc. Unless otherwise stated, any suitable components within the automated histology storage system 602 may be utilized to execute the operations described in FIG. 12A, and for convenience of description, the various components of the automated histology storage system 602 that perform the operations of the process illustrated in FIG. 12A may be collectively referred to as "the system."

As illustrated in FIG. 12A, the process starts and then, at operation 1200, the system receives patient and/or slide information about slides to be received and/or stored by the automated histology storage system 602. For example, in some instances, a user or technician may desire to store individual slides, once processed or during the manufacturing process (e.g., in between staining operations, etc.), in the automated histology storage system 602. The user may, using a user interface (e.g., a graphical user interface displayed on the display panel 614 and one or more input devices) may provide information about a patient and individual slides. The information may be input manually using the user interface, or in some embodiments, an imaging sensor or barcode scanner may be configured to scan unique identifying information (e.g., in the form of a barcode, QR code, characters or numbers, etc.) that may be, for example, affixed to slides and/or a tray or rack. In some embodiments, identifying information may be retrieved from a database (e.g., the database 662) in response to receiving the unique identifying information. For example, certain patient data or slide data may be stored in the database, and in response to scanning a code or other data corresponding to the slides and/or a tray or rack, the system may retrieve the patient or slide data from the database and match it to the slides and/or the tray/rack.

Additionally, at operation 1200, the user may provide further information about the type of storage mechanism being used. For example, using the user interface, the user may indicate whether the slides are currently in a tray or rack, and also what the user intends for the automated histology storage system 602 to do with the slides.

At operation 1204, the system may identify a portal location for the slides to be inserted into the automated histology storage system 602. For example, in some embodiments, the system may display, on the user interface, information about which portal and/or portal slot the user should deposit the slides. Alternatively, or additionally, the system may display, for example, at the front of one of the portal slots, a light indicating to the user that the adjacent portal slot is where the user should deposit the slides.

At operation 1208, the system may insert an empty tray or rack carriage into the identified portal slot. According to some embodiments, the empty tray or rack may be selected according to the user input. For example, depending on which type of tray or rack is to be inserted, the system may select a corresponding carriage that has an interior cavity that corresponds to the shape of the tray or rack. The user may then insert the slide tray or rack into the empty carriage.

In some embodiments, the user may push the carriage back into the portal. In some embodiments, one or more sensors (e.g., mechanical buttons, lasers, cameras, pressure sensors, magnets, etc.) may identify the presence of the carriage with the tray or rack successfully inserted. Then, at operation 1212, the system may retrieve the carriage from the portal from the back side (interior side) of the portal. In some embodiments, the carriage may be transferred (e.g., by the mechanical arm 620) without human involvement to a nest.

At operation 1216, the system may retrieve individual slides from the carriage in the nest and, at operation 1220, the system may transfer the individual slides to a storage location. The retrieval and transferring operations 1216 and 1220 may be executed, for example, by the mechanical arm 620, using any suitable gripper or gripping operation as described above. For example, according to some embodiments, the retrieval and transferring operations 1216 and 1220 may utilize one or more operations as described above with respect to FIGS. 3J, 4M, and 5J. For example, in some embodiments, the slides may be transferred individually from the carriage to a carrier cassette (e.g., a carrier cassette 500), and the carrier cassette may then be transferred to a slide carrier queue 530 for storage. When removing slides from the carriage, some embodiments may utilize one or more sensors (e.g., the slide position detection sensor) to identify whether or not a slide is present at any given slide position in a tray or rack, prior to attempting to pick up a slide, for example, as described above with respect to FIGS. 8D and 8E.

Once each of the slides are removed from the carriage and transferred to a storage location, at operation 1224, the system may return the carriage and the empty tray or rack to an empty portal slot.

Additionally, according to some embodiments, at or between various operations between 1208 and 1224, the system may cause the mechanical arm 620 to change grippers in order to perform a subsequent operation. For example, according to some embodiments, the system may utilize a first gripper (e.g., a gripper described with respect to FIGS. 10A-10E) to handle or manipulate a tray, rack, or carriage (e.g., in the process of removing a carriage from a portal slot, transferring a carriage to a carriage nest, etc.). Then, the system may cause the mechanical arm 620 to switch to a different gripper (e.g., the gripper described with respect to FIG. 4A-4L, 9A-9E, or 11A-11B) in order to pick up or manipulate individual slides, according to the design of the corresponding slide tray or slide rack.

Each of the operations 1200 through 1224 involving the movement, transferring, or storage of slides, carriages, trays, or racks may be executed automatically and without human involvement, other than that user providing input data about the patient or slides, and the type of rack or tray, and the user inserting the rack or tray into a portal.

FIG. 12B illustrates an example process for an automated histology storage system to retrieve slides from storage and transfer them to a user or technician. Although various operations are illustrated in FIG. 12B, embodiments according to the present disclosure are not limited to the particular operations illustrated in FIG. 12B. For example, according to some embodiments, there may be additional operations or fewer operations without departing from the spirit and scope of embodiments according to the present disclosure. Additionally, according to some embodiments, the order of operations may vary, unless otherwise stated or implied, without departing from the spirit and scope of embodiments according to the present disclosure.

The operations illustrated in FIG. 12B may be initiated and/or controlled by various elements of the automated histology storage system 602 including, for example, the control system 650, the mechanical arm 620, etc. Unless otherwise stated, any suitable components within the automated histology storage system 602 may be utilized to execute the operations described in FIG. 12B, and for convenience of description, the various components of the automated histology storage system 602 that perform the operations of the process illustrated in FIG. 12B may be collectively referred to as "the system."

As illustrated in FIG. 12B, the process starts and then, at operation 1240, the system receives patient and/or slide information about slides that are to be retrieved from storage by the automated histology storage system 602. For example, a user may desire for a slide or a group of slides be retrieved and delivered to the user for further processing or to transfer to a new step in the pathology process. The user may search, for example, using a user interface (including, for example, the display panel 614, and one or more input devices), for a patient, slide, or group of slides, to see if the corresponding slides are currently in storage by the automated histology storage system 602. The user may then, using the user interface, provide input to request certain slides be returned to the user.

At operation 1244, the system may identify a portal location or slot at which the slides are to be returned by the automated histology storage system 602. According to some embodiments, the system may display, on the user interface, information about which portal or portal slot the user should expect the slides. Additionally, or alternatively, the system may display a graphical indicator (e.g., a light) at the portal slot in order to direct the user to the proper portal slot.

According to some embodiments, at operation 1246, the identified portal slot may not include an empty tray or rack. Accordingly, in some embodiments, the system may prompt the user to insert a rack or tray into a carriage of the tray or rack portal slot. In some embodiments, once the empty tray or rack is inserted into the carriage of the tray or rack portal slot, the system may, using one or more sensors (e.g., mechanical buttons, switches, magnets, lasers, cameras, springs, etc.), identify that the empty tray or rack is inserted. In some embodiments, the user may be prompted to push the empty tray or rack and the carriage into the portal.

At operation 1250, the system may remove the empty tray or rack and/or the carriage, from the portal from the back or interior side of the portal. At operation 1254, the system may transfer the tray or rack and/or the carriage to a nest.

Then, at operation 1258, the system may, based on the user input and requested slides, retrieve each of the requested slides from storage. For example, the slides may be stored in one or more carrier cassettes (e.g., carrier cassettes 500) and in one or more slide carrier queues (e.g., slide carrier queues). The system may remove the slides, either individually, or as a group with an entire carrier cassette, and transfer each individual slide to the empty tray or rack in the nest. That is, the gripper of the mechanical arm 620 may pick up each slide and transfer it to a corresponding slide position in the tray or rack.

At operation 1262, the system may pick up the tray or rack and/or the corresponding carriage, and transfer it to an empty portal slot to be retrieved by the user.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although aspects of some example embodiments of a pathology slide manufacturing system and method have been described and illustrated herein, various modifications and variations may be implemented, as would be understood by a person having ordinary skill in the art, without departing from the spirit and scope of embodiments according to the present disclosure. Accordingly, it is to be understood that a pathology slide manufacturing system and method according to the principles of the present disclosure may be embodiment other than as specifically described herein. The disclosure is also defined in the following claims, and equivalents thereof.

What is claimed is:

1. A slide carrier comprises:
a base support; and
a slide platform having a surface that is parallel to a first plane defined by a first vector and a second vector, wherein a vector extending in a direction opposite to the direction of gravity is normal with respect to a second plane defined by a third vector and a fourth vector, an angle between the first vector and the third vector is greater than zero degrees and less than 90 degrees such that the first vector is tilted relative to the third vector, and an angle between the second vector and the fourth vector is greater than zero degrees and less than 90 degrees such that the second vector is tilted relative to the fourth vector.

2. The slide carrier of claim 1, further comprising a first long edge and a second long edge, wherein an elevation of the first long edge is higher than an elevation of the second long edge.

3. The slide carrier of claim 2, further comprising a barrier protruding from the slide platform at the second long edge.

4. The slide carrier of claim 3, further comprising a protrusion extending from the barrier.

5. The slide carrier of claim 1, wherein the slide platform further comprises a first elongated support portion extending in a length direction of the slide platform.

6. The slide carrier of claim 5, wherein the slide platform further comprises a second elongated support portion extending in the length direction of the slide platform, wherein the first elongated support portion and the second elongated support portion are separated from each other by a gap.

7. The slide carrier of claim 6, further comprising a crossmember support portion extending between and connecting the first elongated support portion and the second elongated support portion.

8. The slide carrier of claim 7, further comprising a first narrow support portion connected to a top of the first elongated support portion, wherein a top surface of the first narrow support portion is coplanar with a top surface of the first elongated support portion.

9. The slide carrier of claim 8, further comprising a second narrow support portion connected to a top of the second elongated support portion, wherein a top surface of the second narrow support portion is coplanar with a top surface of the second elongated support portion.

10. The slide carrier of claim 9, wherein a width between the first narrow support portion and the second narrow support portion is less than a width between the first elongated support portion and the second elongated support portion.

11. The slide carrier of claim 1, wherein the surface of the slide platform is configured to enable a slide to shift locations on the slide platform due to a force of gravity to cause the slide to register at a predetermined location on the slide platform.

* * * * *